(12) United States Patent
Kito et al.

(10) Patent No.: US 10,437,680 B2
(45) Date of Patent: Oct. 8, 2019

(54) RELAY APPARATUS, RELAY METHOD, AND COMPUTER PROGRAM PRODUCT

(71) Applicant: Kabushiki Kaisha Toshiba, Minato-ku (JP)

(72) Inventors: Toshiyuki Kito, Kodaira (JP); Takeshi Kawabata, Kawasaki (JP); Kentaro Umesawa, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 99 days.

(21) Appl. No.: 15/347,387

(22) Filed: Nov. 9, 2016

(65) Prior Publication Data

US 2017/0139778 A1     May 18, 2017

(30) Foreign Application Priority Data

Nov. 13, 2015 (JP) .................................. 2015-223106
Sep. 20, 2016 (JP) .................................. 2016-183123

(51) Int. Cl.
  *G06F 11/14* (2006.01)
  *G06F 8/71* (2018.01)
  (Continued)

(52) U.S. Cl.
  CPC ............ *G06F 11/1433* (2013.01); *G06F 8/66* (2013.01); *G06F 8/71* (2013.01); *H04L 63/126* (2013.01);
  (Continued)

(58) Field of Classification Search
  CPC ............... G06F 11/0751; G06F 11/079; G06F 11/1448; G06F 11/1456; G06F 11/1433; G06F 11/1438; G06F 11/1451
  See application file for complete search history.

(56) References Cited

U.S. PATENT DOCUMENTS 7,343,239 B2   3/2008  Tanabe
8,768,537 B2 * 7/2014  Kim ........................ H04Q 9/00
                                                    701/2
(Continued)

FOREIGN PATENT DOCUMENTS

JP         2004-287993 A      10/2004
JP         2006-268554 A      10/2006
(Continued)

OTHER PUBLICATIONS

Takizawa Takafumi, "Immediate Application! Security Measures, The Ninth Security of the Package Management System", Nikkei Linux, Nikkei BP, May 8, 2010, vol. 12, No. 6, pp. 157-162 w/English Machine Translation.

(Continued)

*Primary Examiner* — Nadeem Iqbal
(74) *Attorney, Agent, or Firm* — Oblon, McClelland, Maier & Neustadt, L.L.P.

(57) ABSTRACT

A relay apparatus according to an embodiment includes a request transmitting unit, a response receiving unit, and a data transmitting unit. The request transmitting unit transmits an acquisition request to a provision apparatus. The response receiving unit receives the second data from the provision apparatus in response to the acquisition request. The data transmitting unit transmits, to the electronic control unit, the second data received from the provision apparatus, thereby causing the electronic control unit to update the first data firstly stored therein with the second data. When the updating has failed, the data transmitting transmits the first data to the electronic control unit, thereby causing the electronic control unit to restore the first data.

21 Claims, 35 Drawing Sheets

(51) Int. Cl.
*H04L 29/08* (2006.01)
*G06F 8/65* (2018.01)
*H04L 29/14* (2006.01)
*H04L 29/06* (2006.01)

(52) U.S. Cl.
CPC .............. *H04L 67/34* (2013.01); *H04L 69/40* (2013.01); *G06F 2201/805* (2013.01)

(56) References Cited

U.S. PATENT DOCUMENTS

| | | | | |
|---|---|---|---|---|
| 8,893,107 | B2* | 11/2014 | Nagao | G06F 8/65 717/170 |
| 2007/0189718 | A1* | 8/2007 | Kobayashi | G11B 20/00086 386/230 |
| 2012/0124568 | A1* | 5/2012 | Fallon | G06F 9/453 717/169 |
| 2012/0204166 | A1 | 8/2012 | Ichihara | |
| 2012/0239242 | A1 | 9/2012 | Uehara | |
| 2013/0205288 | A1* | 8/2013 | Sohm | G05B 15/02 717/168 |
| 2013/0227540 | A1* | 8/2013 | Ruster | G06F 8/65 717/170 |
| 2014/0229707 | A1 | 8/2014 | Futami | |
| 2015/0242201 | A1* | 8/2015 | Kim | G06F 8/665 717/168 |
| 2015/0301822 | A1 | 10/2015 | Takahashi et al. | |

FOREIGN PATENT DOCUMENTS

| | | |
|---|---|---|
| JP | 2006-298260 A | 11/2006 |
| JP | 2008-189125 A | 8/2008 |
| JP | 2010-218070 A | 9/2010 |
| JP | 2011-079496 A | 4/2011 |
| JP | 2014-516850 A | 7/2014 |
| JP | 2014-153964 A | 8/2014 |
| JP | 2015-103163 A | 6/2015 |
| WO | WO 2011/055447 A1 | 5/2011 |
| WO | WO 2012/125193 A1 | 9/2012 |
| WO | WO 2014/083775 A1 | 6/2014 |

OTHER PUBLICATIONS

Toshio Gomi, "Security of the Internet Business", CardWave, Kabushiki Kaisha C Media, Apr. 10, 1999, vol. 12, No. 5, pp. 56-60 w/English Machine Translation.

* cited by examiner

FIG.3

| ITEM | CONTENT |
|---|---|
| ECUID | IDENTIFIER FOR ELECTRONIC CONTROL UNIT |
| FWID | IDENTIFIER FOR FIRMWARE |
| CURRENT-FW MAC VALUE | MAC VALUE FOR CURRENT FW DATA PREVIOUSLY WRITTEN INTO AND CURRENTLY PRESENT IN ELECTRONIC CONTROL UNIT |
| CURRENT-FW VERSION NUMBER | INFORMATION INDICATING VERSION OF CURRENT FW DATA PREVIOUSLY WRITTEN INTO AND CURRENTLY PRESENT IN ELECTRONIC CONTROL UNIT |
| ECU DOMAIN | FUNCTION OF TARGET DEVICE |
| CURRENT-FW DEVELOPER ID | INFORMATION IDENTIFYING DEVELOPER OF CURRENT FW DATA PREVIOUSLY WRITTEN INTO AND CURRENTLY PRESENT IN ELECTRONIC CONTROL UNIT |
| UPDATE-TIMING INFORMATION | INFORMATION INDICATING STATES OF ELECTRONIC CONTROL UNIT WHEN UPDATING OF FIRMWARE IS POSSIBLE |
| FW ACQUISITION STATUS INFORMATION | INFORMATION INDICATING STATUS ON ACQUISITION OF NEW FW DATA |

FIG.4

| ITEM | CONTENT |
|---|---|
| DEVELOPER ID | INFORMATION IDENTIFYING DEVELOPER OF FIRMWARE |
| SHARED-KEY DATA | DATA |

FIG.5

| ITEM | CONTENT |
|---|---|
| ECUID | IDENTIFIER FOR ELECTRONIC CONTROL UNIT |
| FWID | IDENTIFIER FOR FIRMWARE |
| CURRENT FW DATA | SUBSTANTIVE DATA OF FIRMWARE WRITTEN INTO AND PRESENT IN ELECTRONIC CONTROL UNIT |
| NEW FW DATA | SUBSTANTIVE DATA OF FIRMWARE TO BE WRITTEN INTO ELECTRONIC CONTROL UNIT AS REPLACEMENT FOR CURRENT FW DATA |
| NEW-FW MAC VALUE | MAC VALUE FOR NEW FW DATA |
| NEW-FW VERSION NUMBER | INFORMATION INDICATING VERSION OF NEW FW DATA |
| NEW-FW DEVELOPER ID | INFORMATION IDENTIFYING DEVELOPER OF NEW FW DATA |
| NUMBER OF TIMES OF ACQUISITION ERROR | NUMBER OF TIMES ANY ONE OF CURRENT FW DATA AND NEW FW DATA THAT HAVE BEEN RECEIVED FROM PROVIDING APPARATUS HAS BEEN DETERMINED TO BE INVALID |
| NUMBER OF TIMES OF UPDATING ERROR | NUMBER OF TIMES NEW FW DATA WRITTEN INTO ELECTRONIC CONTROL UNIT HAS BEEN DETERMINED TO BE INVALID |

FIG.6

| ITEM | CONTENT |
|---|---|
| ECUID | IDENTIFIER FOR ELECTRONIC CONTROL UNIT |
| ECU DOMAIN | FUNCTION OF TARGET DEVICE |
| ECU STATE INFORMATION | INFORMATION INDICATING CURRENT STATE OF ELECTRONIC CONTROL UNIT |

FIG.16

| ITEM | CONTENT |
|---|---|
| ECUID | IDENTIFIER FOR IDENTIFYING ELECTRONIC CONTROL UNIT |
| FWID | IDENTIFIER FOR IDENTIFYING FIRMWARE |
| NEWEST FW DATA | MAC VALUE FOR NEWEST FW DATA |

FIG.21

| ITEM | CONTENT |
|---|---|
| ECUID | IDENTIFIER FOR ELECTRONIC CONTROL UNIT |
| ECU DOMAIN | FUNCTION OF TARGET DEVICE |
| ECU STATE INFORMATION | INFORMATION INDICATING CURRENT STATE OF ELECTRONIC CONTROL UNIT |
| VERIFICATION EXECUTOR INFORMATION | INFORMATION INDICATING EXECUTOR OF VERIFICATION OF WHETHER DATA WRITTEN IS VALID (ELECTRONIC CONTROL UNIT OR RELAY APPARATUS) |

| ITEM | CONTENT |
|---|---|
| ECUID | IDENTIFIER FOR ELECTRONIC CONTROL UNIT |
| FWID | IDENTIFIER FOR FIRMWARE |
| CURRENT FW DATA | SUBSTANTIVE DATA SUPPOSED TO HAVE BEEN WRITTEN INTO AND CURRENTLY PRESENT IN ELECTRONIC CONTROL UNIT |

| ITEM | CONTENT |
|---|---|
| SYSTEM IDENTIFIER | IDENTIFIER FOR CONTROLLED SYSTEM |
| SYSTEM VERSION INFORMATION | INFORMATION INDICATING VERSION OF SYSTEM LIST |

RELAY APPARATUS, RELAY METHOD, AND COMPUTER PROGRAM PRODUCT

CROSS-REFERENCE TO RELATED APPLICATIONS

This application is based upon and claims the benefit of priority from Japanese Patent Application No. 2015-223106, filed on Nov. 13, 2015; and Japanese Patent Application No. 2016-183123, filed Sep. 20, 2016; the entire contents of which are incorporated herein by reference.

FIELD

Embodiments described herein relate generally to a relay apparatus, a relay method, and a computer program product.

BACKGROUND

A vehicle includes an electronic control unit (ECU) for, for example, controlling components such as an engine. The electronic control unit controls components such as an engine by executing firmware. In recent years, vehicles capable of connecting to networks have been proposed. The electronic control unit provided in such a vehicle can download data via a network to update firmware. When vulnerability is found in the firmware, the electronic control unit can update the firmware without returning the vehicle to a factory or the like.

Conventionally, when firmware update has failed, an electronic control unit needs downloading a current version of firmware and writing it into a memory. For this reason, an electronic control unit needs accessing a server or the like again when the firmware update has failed, and it takes a long period between when the update has been started and when the firmware becomes executable.

In some cases, to solve such an inconvenience, an electronic control unit includes two buffers, which temporarily store data. When updating firmware, the thus configured electronic control unit causes one of the buffers to retain a current version of the firmware and downloads a new version of the firmware using the other buffer. When the firmware update has failed, the electronic control unit writes, back into the memory, the current version of the firmware stored in one of the buffers. However, the need to include two buffers makes the cost for the thus configured electronic control unit high. In addition, a vehicle that includes a plurality of electronic control units needs to include two buffers for each of the electronic control units, which increases the cost of the entire vehicle.

BRIEF DESCRIPTION OF THE DRAWINGS

FIG. 3 is a diagram illustrating a piece of management data;

FIG. 4 is a diagram illustrating a piece of key-related information;

FIG. 5 is a diagram illustrating a piece of acquired information;

FIG. 6 is a diagram illustrating a piece of state information;

FIG. 16 is a diagram illustrating a piece of newest-version information;

FIG. 21 is a diagram illustrating a piece of state information according to the third modification;

DETAILED DESCRIPTION

According to one embodiment, a relay apparatus includes a request transmitting unit, a response receiving unit, and a data transmitting unit. The request transmitting unit transmits an acquisition request to a provision apparatus. The response receiving unit receives the second data from the provision apparatus in response to the acquisition request. The data transmitting unit transmits, to the electronic control unit, the second data received from the provision apparatus, thereby causing the electronic control unit to update the first data currently stored therein with the second data. When the updating has failed, the data transmitting transmits the first data to the electronic control unit, thereby causing the electronic control unit to restore the first data.

A network system 10 according to an embodiment is described in detail below with reference to the drawings. The network system 10 is intended to reduce the cost of an electronic control unit (ECU) and to curtail the time necessary for updating data stored in an electronic control unit.

Figure 1:
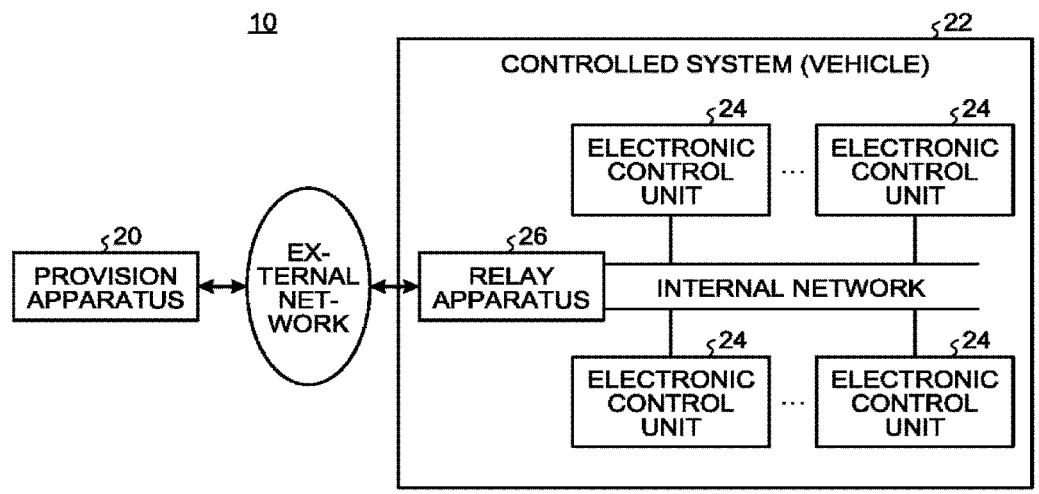
FIG. 1 is a diagram illustrating a network system according to an embodiment.

FIG. 1 is a diagram illustrating the network system 10 according to the embodiment. The network system 10 includes a provision apparatus 20 and a controlled system 22.

The provision apparatus 20 is an information processing apparatus such as a server. The provision apparatus 20 is connected to the controlled system 22 via an external network such as the Internet.

The controlled system 22 includes at least one electronic control unit 24 and a relay apparatus 26. In this embodiment, the controlled system 22 is a vehicle. The controlled system 22 is not limited to a vehicle and may be, for example, a robot system, an air plane, or a home network system.

Each electronic control unit 24 controls a target device. The target device is a device installed in the controlled system 22. In this embodiment, the target device is, for example, a device related to movement of the vehicle such as an engine, an energy-related device such as a fuel feeding device, a body-related device such as a window or a door, or an entertainment-related device such as an audio device.

The electronic control unit 24 includes, for example, the following unites as hardware: a processing unit such as a central processing unit (CPU); a storage unit such as a read only memory (ROM), a random access memory (RSM), or a non-volatile storage device; an interface unit for being connected to the target device; and a communication unit for communicating with the relay apparatus 26.

The storage unit in the electronic control unit 24 stores therein firmware. Each piece of firmware is a computer program to be executed by the processing unit such as a CPU or is data to be read out by the processing unit such as a CPU. The electronic control unit 24 controls the target device with the firmware and the hardware operating in cooperation with each other. The electronic control unit 24 may store therein one piece of firmware or a plurality of pieces of firmware.

The electronic control unit 24 updates each piece of firmware. When substantive data of the firmware of a newer version than currently stored substantive data thereof is provided by a developer (such as a developer, a group of developers, or a provider) of the firmware, the electronic control unit 24 updates the currently stored substantive data of the firmware with the substantive data thereof of the newer version. For example, the electronic control unit 24 performs the updating by deleting the currently stored substantive data of the firmware and then newly storing therein the substantive data of the newer version or by overwriting, with the substantive data of the newer version, a storage area having the currently stored substantive data of the firmware. Upon receiving the substantive data of the firmware of the newer version and an update instruction from the outside, the electronic control unit 24 executes the update processing.

Here, in this embodiment, currently stored substantive data of a piece of firmware is referred to as "current FW data". Substantive data of the firmware of a newer version than the currently stored substantive data thereof is referred to as "new FW data".

The relay apparatus 26 is an apparatus for updating current FW data stored in each electronic control unit 24 to new FW data. The relay apparatus 26 is an information processing apparatus having the same hardware configuration as a computer or the like. The relay apparatus 26 connects to the provision apparatus 20 via the external network. In this embodiment, the controlled system 22 is a vehicle, and the relay apparatus 26 therefore uses radio communication to connect to the external network.

The relay apparatus 26 connects to each electronic control unit 24 via an internal network. The external network and the internal network are connected to each other via the relay apparatus 26, and are not connected directly to each other.

Figure 2:
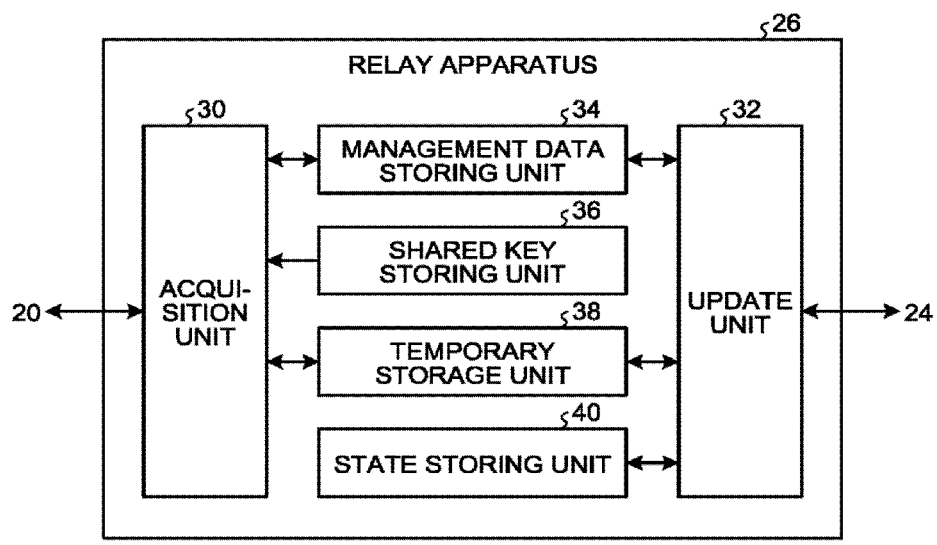
FIG. 2 is a configuration diagram illustrating a relay apparatus.

FIG. 2 is a diagram illustrating a functional configuration of the relay apparatus 26. The relay apparatus 26 includes an acquisition unit 30, an update unit 32, a management data storing unit 34, a shared key storing unit 36, a temporary storage unit 38, and a state storing unit 40.

The acquisition unit 30 receives, for example, current FW data and new FW data from the provision apparatus 20. The update unit 32 transmits, to the electronic control unit 24, the new FW data received from the provision apparatus 20, thereby causing the electronic control unit 24 to update the current FW data with the new FW data. In addition, when update processing for updating the current data with the new FW data has failed, the update unit 32 transmits, to the electronic control unit 24, the current FW data received from the provision apparatus 20, thereby causing the electronic control unit 24 to restore the current FW data.

The management data storing unit 34 stores therein pieces of management data for current FW data stored in the respective electronic control units 24. The shared key storing unit 36 stores therein pieces of key-related information each containing a piece of shared-key data for verifying whether corresponding current FW data and corresponding new FW data are valid. The piece of shared-key data is shared with the developer of a corresponding piece of firmware, and is kept confidential from a third party. The temporary storage unit 38 stores therein pieces of acquired information each including current EW data and new FW data that are received by the acquisition unit 30. The state storing unit 40 stores therein pieces of state information each indicating the state of a corresponding one of the electronic control units 24.

FIG. 3 is a diagram illustrating the contents of the piece of management data stored in the management data storing unit 34. The management data storing unit 34 stores therein the piece of management data illustrated in FIG. 3 with respect to each piece of firmware stored in each electronic control unit 24 included in the controlled system 22.

The piece of management data contains ECUID, FWID, a current-FW message authentication code (MAC) value, a current-FW version number, an ECU domain, a current-FW developer ID, update-timing information, and FW acquisition status information.

ECUID is an identifier for the electronic control unit 24 that stores therein the piece of firmware. FWID is an identifier for the piece of firmware. The current-FM MAC value is a MAC value for current FM data previously written into and currently present in the electronic control unit 24.

Here, a MAC value is data for verifying that data has not been falsified. Calculation of and verification with MAC values are executed using the tar data and data of a key (hereinafter "key data"). The same key data is used in generation of and verification with MAC values. For example, a transmitter and a receiver are supposed to have the same key data. This key data is kept confidential from a third party. In this case, the transmitter calculates a MAC value from target data and the key data that is retained by the transmitter. The transmitter then transmits the target data and the MAC value to the receiver. The receiver calculates a MAC value from the transmitted data thus received and the key data that is retained by the receiver. The receiver then compares the calculated MAC value and the MAC value received from the transmitter. When these values are equal to each other, the receiver can determine that the received target data is data generated by the transmitter (that is, it is valid).

The current-FW version number indicates the version of the current FW data previously written into and currently present in the electronic control unit 24. The version number may be a number or a character that is increased each time the version of the substantive data of the firmware is updated.

The ECU domain indicates the function of the target device. For example, the ECU domain indicates whether the target device is a movement-related device, an energy-related device, a body-related device, or an entertainment-related device.

The current-FW developer ID is information identifying the developer of the current FW data. The shared-key data is assigned to each developer ID.

The update-timing information indicates timings at which the firmware can be updated. For example, the update-timing information indicates, for example, whether updating while the vehicle is being driven is possible, whether updating while the vehicle is being stopped by brakes is possible, whether updating during idling of the vehicle is possible, and whether updating while the engine of the vehicle is stopped is possible.

The FW acquisition status information indicates status of acquisition of new FW data by the relay apparatus 26. For example, the FW acquisition status information indicates status of performing nothing, a status of making an inquiry to the provision apparatus 20, a status of receiving data, and a status of executing verification.

FIG. 4 is a diagram illustrating the contents of the piece of key-related information stored in the shared key storing unit 36. The shared key storing unit 36 stores therein the piece of key-related information illustrated in FIG. 4 with respect to each of the developers of the respective pieces of firmware.

The piece of key-related information contains a developer ID and shared-key data. The developer ID is information identifying the developer of the firmware. The shared-key data is data to be used for calculating a MAC value.

The developer ID may be different by version of the corresponding piece of firmware. For example, the developer ID of current FW data may be different from or the same as the developer ID of new FW data. When the developer ID of current FW data is different from the developer ID of new FW data, the pieces of shared-key data that correspond to the respective developer IDs are different.

FIG. 5 is a diagram illustrating the contents of the piece of acquired information stored in the temporary storage unit 38. Each time current FW data and new FW data that have been received from the provision apparatus 20 are determined to be valid, the temporary storage unit 38 stores therein the piece of acquired information illustrated in FIG. 5.

The piece of acquired information contains ECUID, FWID, the current FW data, the new FW data, a new-FW MAC value, a new-FW version number, a new-FW developer ID, the number of times of acquisition error, and the number of times of updating error.

ECUID is an identifier for the electronic control unit 24 that is to execute the updating. FWID is an identifier for a piece of firmware to be updated.

The current FW data and the new FW data are each substantive data of firmware received from the provision apparatus 20. Note that the current FW data is data supposed to be identical with current FW data previously written into and currently present in the electronic control unit 24.

The new-FW MAC value is a MAC value for the new FW data received from the provision apparatus 20. The new-FW MAC value is generated by, for example, the developer of the new FW data. The new-FW version number indicates the version of the new FW data. The new-FW developer ID is information identifying the developer of the new FW data.

The number of times of acquisition error indicates the number of times it has been determined that any of current FW data and new FW data that have been received from the provision apparatus 20 is invalid. The number of times of updating error indicates the number of times it has been determined that new FW data written into the electronic control unit 24 is invalid.

FIG. 6 is a diagram illustrating the contents of one of the pieces of state information stored in the state storing unit 40. The state storing unit 40 stores therein the piece of state information illustrated in FIG. 6 with respect to the corresponding electronic control units 24.

The piece of state information contains ECUID, an ECU domain, and ECU state information. ECUID is an identifier for the electronic control unit 24. The ECU domain indicates the function of the target device controlled by the electronic control unit 24.

The piece of ECU state information indicates which state the electronic control unit 24 is currently in. For example, the piece of ECU state information indicates which of the following states it is in: normally operating; waiting for updating; receiving data for use in updating; having a writing process underway; having verification underway; and enabling data.

Figure 7:
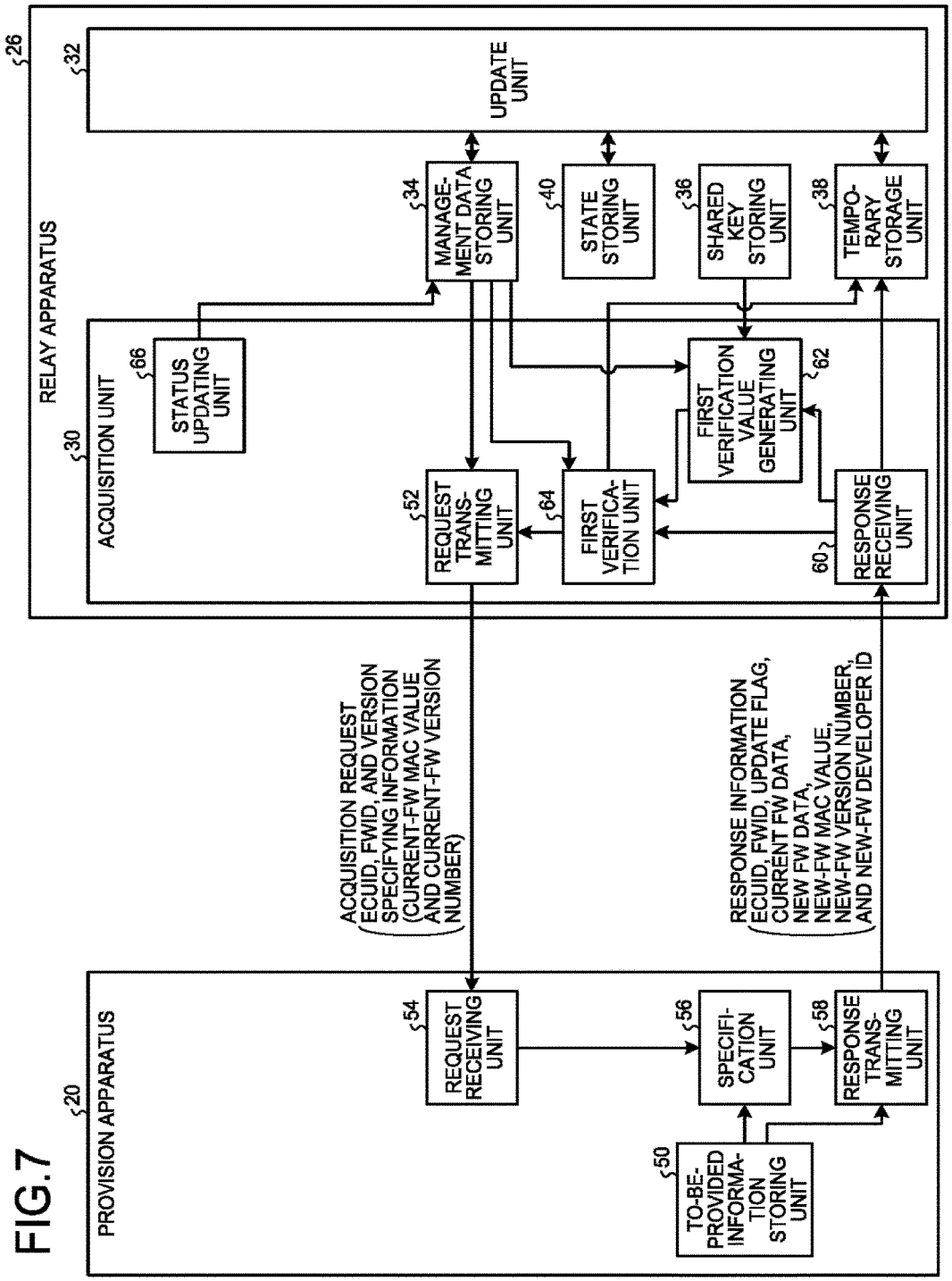
FIG. 7 is a configuration diagram illustrating a provision apparatus and a relay apparatus.

FIG. 7 is a diagram illustrating functional configurations of the provision apparatus 20 and the relay apparatus 26. The provision apparatus 20 includes a to-be-provided information storing unit 50, a request receiving unit 54, a specification unit 56, and a response transmitting unit 58. The acquisition unit 30 in the relay apparatus 26 includes a request transmitting unit 52, a response receiving unit 60, a first verification value generating unit 62, a first verification unit 64, and a status updating unit 66.

The to-be-provided information storing unit 50 stores therein information supposed to be provided to the relay apparatus 26. The to-be-provided information storing unit 50 stores therein ECUID, FWID, individual versions of substantive data, MAC values for the respective versions of substantive data, the version numbers of the respective versions, and the developer IDs of the respective versions with respect to each piece of firmware. These versions may have the same developer ID.

The request transmitting unit 52 transmits an acquisition request to the provision apparatus 20 with respect to each piece of firmware stored in each electronic control unit 24 included in the controlled system 22. The request transmitting unit 52 transmits the acquisition request, for example, at timings (for example, at regular intervals) that are previously determined with respect to each piece of firmware.

The request transmitting unit 52 transmits, to the provision apparatus 20, the acquisition request containing ECUID (a unit identifier) identifying the electronic control unit 24, EWID (a data identifier) identifying current FW data, and version specifying information with which the version of the current FW data can be specified. The request transmitting unit 52 reads out management data on the corresponding piece of firmware from the management data storing unit 34 to generate the acquisition request.

The version specifying information is a MAC value for the current FW data (a verification value with which to verify the current FW data currently stored in the electronic control unit 24). The version specifying information may be a version number for the current FW data instead of the MAC value.

The request receiving unit 54 receives the acquisition request from the relay apparatus 26. The specification unit 56 reads out, from the to-be-provided information storing unit 50, information on a piece of firmware that corresponds to ECUID and FWID contained in the acquisition request. Based on the information read out, the specification unit 56 determines whether substantive data the version of which is newer than the version specified with the version specifying information has been provided from a developer. That is, the specification unit 56 determines whether substantive data (new FW data) the version of which is newer than the version of the current FW data currently stored in the electronic control unit 24 is present with respect to the piece of firmware specified by the acquisition request.

The response transmitting unit 58 transmits, to the relay apparatus 26, a piece of response information that responds to the received acquisition request. When the new FW data is not present, the response transmitting unit 58 transmits the response information that contains ECUID, FWID, and an update flag. When the new FW data is present, the response transmitting unit 58 transmits the response information that contains ECUID, FWID, an update flag, current FW data, the new FW data, a new-FW MAC value, a new-FW version number, and a new-FW developer ID.

ECUID and FWID contained in the response information are the same as ECUID and FWID contained in the acquisition request. Each of the update flags is a flag indicating whether FW data (new FW data) the version of which is newer than the version specified with the version specifying information is present. In this embodiment, the update flag is set to: 0 when the new FW data is not present; and a value other than 0 when the new FW data is present. When these versions have the same developer ID, it is not necessary for the response transmitting unit 58 to transmit the developer ID.

The response receiving unit 60 receives, from the provision apparatus 20, the response information that responds to the acquisition request. When the new FW data is not present, the response receiving unit 60 receives the response information that contains ECUID, FWID, and the update flag. When the new FW data is present, the response receiving unit 60 receives the response information that contains ECUID, FWID, an update flag, current FW data, the new FW data, a new-FW MAC value, a new-FW version number, and a new-FW developer ID.

The first verification value generating unit 62 calculates a MAC value (a second verification value) for the current FW data received from the provision apparatus 20. Specifically, the first verification value generating unit 62 reads out, from the shared key storing unit 36, shared-key data that corresponds to the current-FW developer ID. The first verification value generating unit 62 calculates the MAC value from the shared-key data read out and the current FW data received from the provision apparatus 20.

The first verification value generating unit 62 further calculates a MAC value (a fourth verification value) for the new FW data received from the provision apparatus 20. Specifically, the first verification value generating unit 62 reads out, from the shared key storing unit 36, shared-key data that corresponds to the new-FW developer ID. The first verification value generating unit 62 calculates the MAC value using the shared-key data read out and the new FW data received from the provision apparatus 20.

The first verification unit 64 determines whether the current FW data received from the provision apparatus 20 is valid. Specifically, when a first verification value with which to verify the current FW data currently stored in the electronic control unit 24 is equal to the second verification value with which to verify the current FW data received from the provision apparatus 20, the first verification unit 64 determines that the current FW data received from the provision apparatus 20 is valid.

Here, the first verification value is the current-FW MAC value currently stored in the management data storing unit 34. The second verification value is the MAC value for the current FW data that has been calculated by the first verification value generating unit 62. That is, the first verification unit 64 verifies whether the current FW data received from the provision apparatus 20 is identical with the current FW data currently stored in the electronic control unit 24.

The first verification unit 64 further determines whether the new FW data received from the provision apparatus 20 is valid. Specifically, when a third verification value received from the provision apparatus 20 is equal to the fourth verification value calculated from the shared-key data and the new FW data received from the provision apparatus 20, the first verification unit 64 determines that the new FW data received from the provision apparatus 20 is valid.

Here, the third verification value is the MAC value (the new-FW MAC value) received from the provision apparatus 20 for the new FW data in response to the acquisition request. The fourth verification value is the MAC value for the new FW data that has been calculated by the first verification value generating unit 62. That is, the first verification unit 64 verifies whether the developer of the new FW data received from the provision apparatus 20 retains the same shared-key data as the relay apparatus 26.

When any of the current FW data and the new FW data that have been received from the provision apparatus 20 is invalid, the first verification unit 64 causes the request transmitting unit 52 to transmit the acquisition request again. When any of the current FW data and the new FW data is still invalid after the same acquisition request is transmitted a certain number of times, the first verification unit 64 stops transmission of the acquisition request.

On condition that the current FW data and the new FW data that have been received from the provision apparatus 20 are valid, the first verification unit 64 stores, in the temporary storage unit 38, information received by the response receiving unit 60. Specifically, the first verification unit 64 stores, in the temporary storage unit 38, ECUID, FWID, the current FW data, the new FW data, the new-FW MAC value, the new-FW version number, and the new-FW developer ID that have been received from the provision apparatus 20. When these versions have the same developer ID, it is not necessary for the first verification unit 64 to store the new-FW developer ID in the temporary storage unit 38. The first verification unit 64 may further store, in the temporary storage unit 38, the number of times any of the current FW data and the new FW data has been determined to be invalid (the number of times of error).

The status updating unit 66 writes the FW acquisition status information into the management data storing unit 34 with respect to each piece of firmware.

The above-described configuration enables the relay apparatus 26 to receive current FW data and new FW data from the provision apparatus 20. The relay apparatus 26 is further enabled to determine whether the current FW data and the new FW data that have been received are valid. The relay apparatus 26 is further enabled to store the current FW data and the new FW data in the temporary storage unit 38 on condition that the current FW data and the new FW data that have been received are valid.

Figure 8:
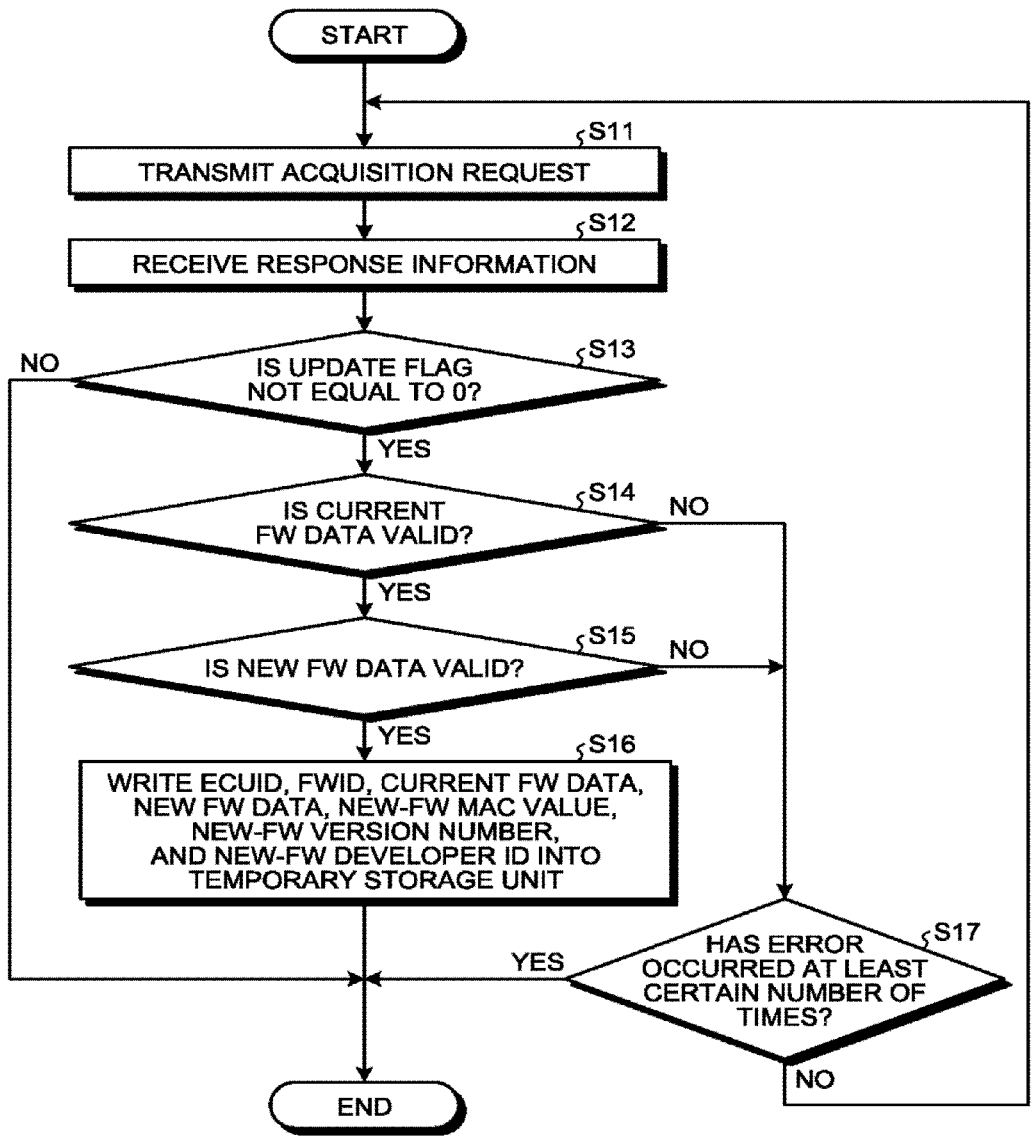
FIG. 8 is a flowchart illustrating a procedure for acquisition processing.

FIG. 8 is a flowchart illustrating a procedure for acquisition processing to be executed by the relay apparatus 26. The acquisition unit 30 executes acquisition processing illustrated in FIG. 8.

First, at Step S11, the acquisition unit 30 transmits the acquisition request with respect to any piece of firmware to the provision apparatus 20 at a previously determined timing. At this step, the acquisition unit 30 transmits the acquisition request, which contains ECUID, FWID, and version specifying information (a current-FW MAC value or a current-FW version number), to the provision apparatus 20.

In response to the acquisition request, the provision apparatus 20 transmits the response information on the corresponding piece of firmware to the relay apparatus 26. Specifically, when new FW data corresponding to the request is not present, the provision apparatus 20 transmits the response information that contains ECUID, FWID, and the update flag set to a value of 0. When the new FW data is present, the provision apparatus 20 transmits the response information that contains ECUID, FWID, the update flag set to a value other than 0, the current FW data, the new FW data, the new-FW MAC value, the new-EW version number, and the new-FW developer ID.

Subsequently, the acquisition unit 30 receives the response information at Step S12. Subsequently, the acquisition unit 30 determines at Step S13 whether the update flag contained in the response information is a value other than 0. If the update flag is 0 (No at S13), the acquisition unit 30 ends this procedure. If the update flag is a value other than 0 (Yes at S13), the processing is passed to Step S14.

At Step S14, the acquisition unit 30 determines whether the current FW data received is valid. Processing at Step S14 is described later in detail with reference to a procedure in FIG. 9. The acquisition unit 30 passes the processing: to Step S15 if the data is valid (Yes at S14); and to Step S17 if the data is invalid (No at S14).

At Step S15, the acquisition unit 30 determines whether the new FW data received is valid. Processing at Step S15 is described later in detail with reference to a procedure in FIG. 10. The acquisition unit 30 passes the processing: to Step S16 if the data is valid (Yes at S15); and to Step S17 if the data is invalid (No at S15).

At Step S16, the acquisition unit 30 writes ECUID, FWID, the current FW data, the new FW data, the new-FW MAC value, the new-FW version number, and the new-FW developer ID that have been received from the provision apparatus 20, into the temporary storage unit 38. Upon completing Step S16, the acquisition unit 30 ends this procedure. In this case, the acquisition unit 30 has been able to receive current FW data and new FW data that are valid.

At Step S17, the acquisition unit 30 determines whether the number of times any of the current FW data and the new FW data has been determined to be invalid (the number of times of error) when the same acquisition request is transmitted at least a certain number of times. If the number of times of error is less than the certain number of times (No at S17), the acquisition unit 30 returns the processing to Step S11. The step enables the acquisition unit 30 to have a next opportunity to receive valid data even when having failed to receive the valid data because of a communication error or the like.

When the number of times of error is at least the certain number of times (Yes at S17), the acquisition unit 30 ends this procedure.

Figure 9:
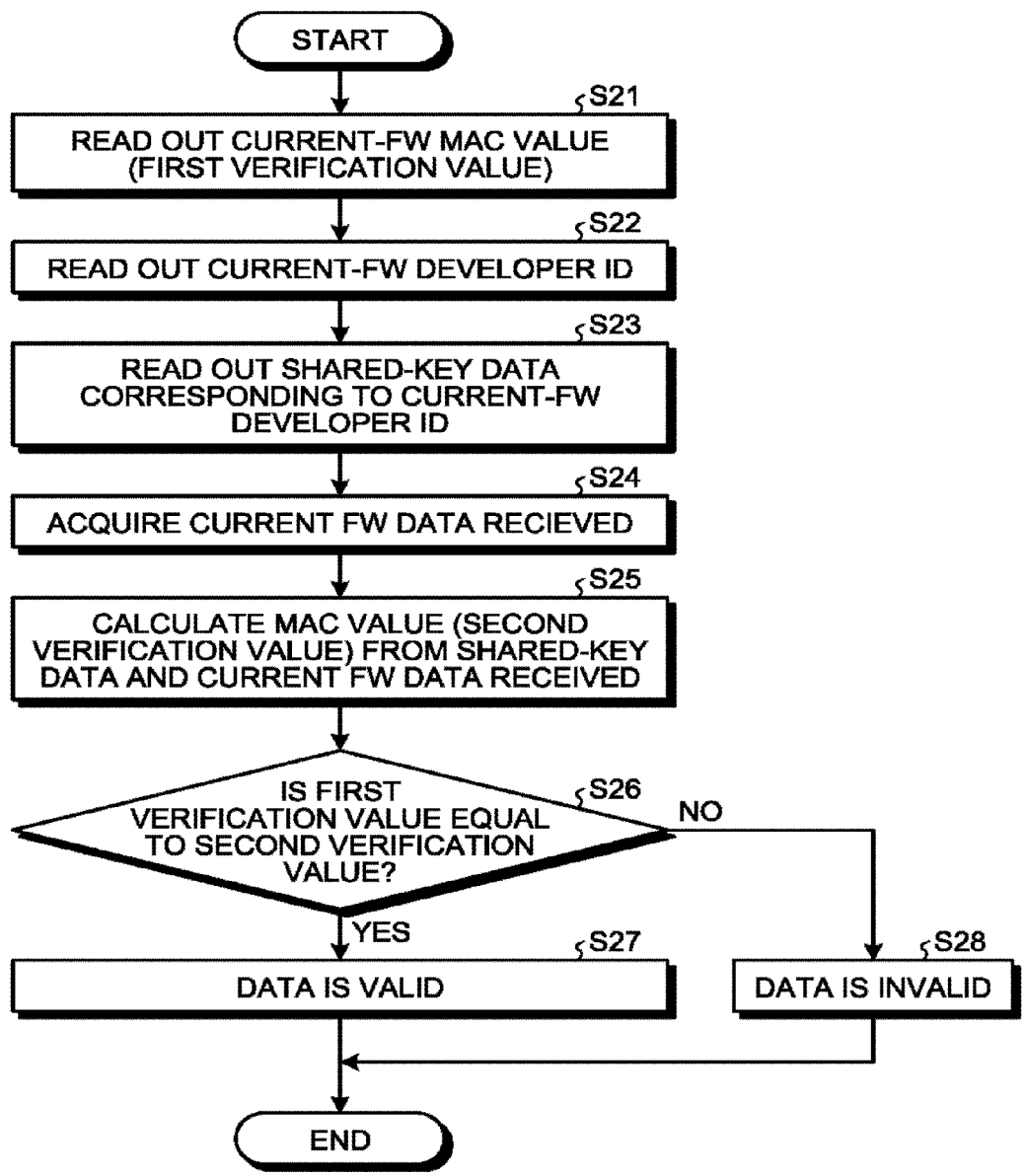
FIG. 9 is a flowchart illustrating a procedure for determining the validity of current FW data received.

FIG. 9 is a diagram illustrating the procedure for determining the validity of the current FW data received from the provision apparatus 20. At Step S14, the acquisition unit 30 executes the processing illustrated in FIG. 9.

First, the acquisition unit 30 reads out the current-FW MAC value (the first verification value) having been stored in the management data storing unit 34 (S21). Subsequently, the acquisition unit 30 reads out the current-FW developer ID from the management data storing unit 34 (S22). The acquisition unit 30 then reads out the shared-key data that corresponds to the current-FW developer ID, from the shared key storing unit 36 (S23). Subsequently, the acquisition unit 30 acquires the current FW data received from the provision apparatus 20 (S24). The acquisition unit 30 then calculates a MAC value (the second verification value) from the shared-key data read out and the current FW data received from the provision apparatus 20 (S25).

Subsequently, the acquisition unit 30 then determines whether the first verification value is equal to the second verification value (S26). If the first verification value is equal to the second verification value (Yes at S26), the acquisition unit 30 ends the processing after determining that the current FW data received from the provision apparatus 20 is valid (S27). If the first verification value is not equal to the second verification value (No at S26), the acquisition unit 30 ends the processing after determining that the current FW data received from the provision apparatus 20 is invalid (S28).

Figure 10:
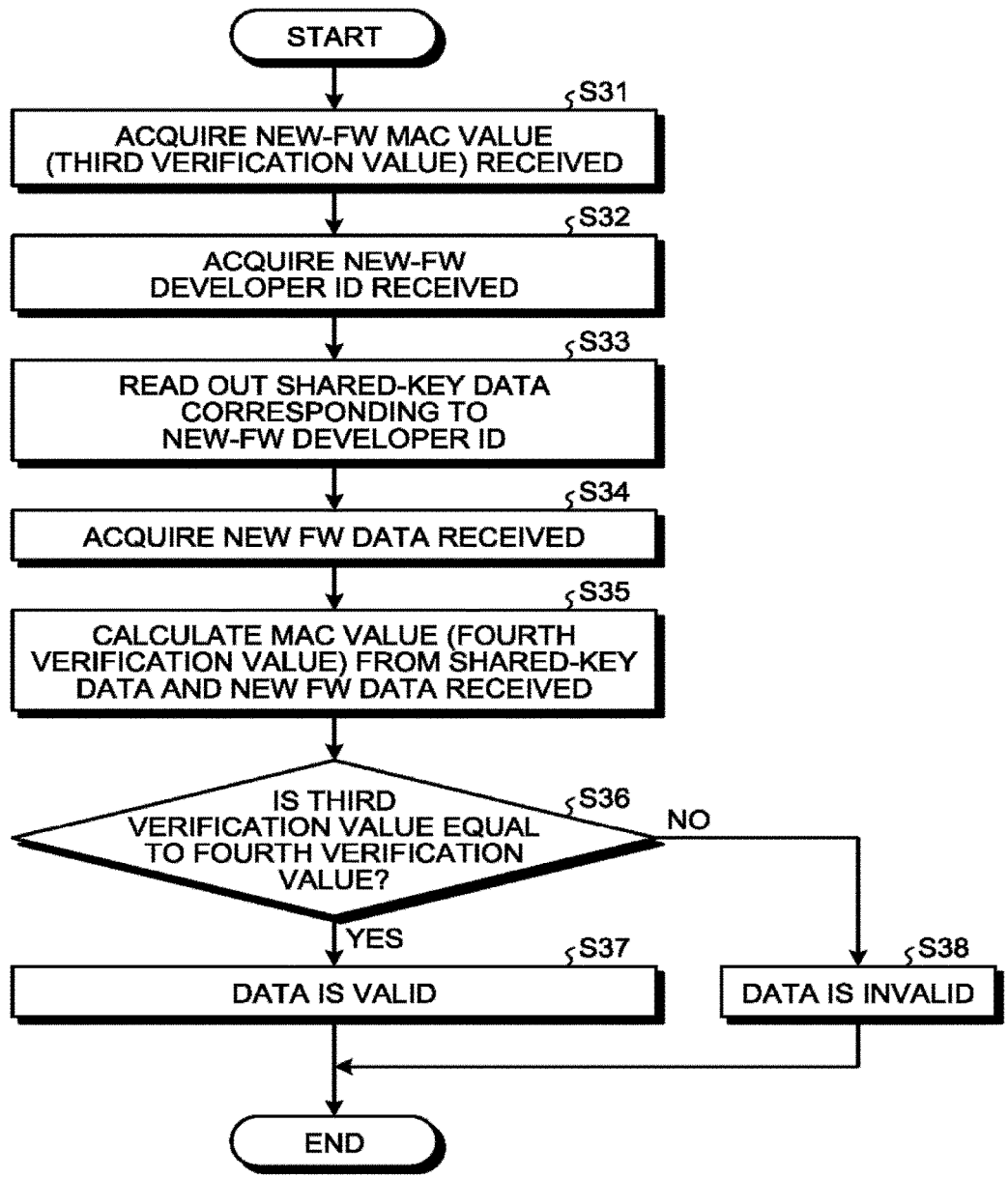
FIG. 10 is a flowchart illustrating a procedure for determining the validity of new FW data received.

FIG. 10 is a flowchart illustrating the procedure for determining the validity of the new FW data received from the provision apparatus 20. At Step S15, the acquisition unit 30 executes the processing illustrated in FIG. 10.

First, the acquisition unit 30 acquires the new-FW MAC value (the third verification value) received from the provision apparatus 20 (S31). Subsequently, the acquisition unit 30 acquires the new-FW developer ID received from the provision apparatus 20 (S32). The acquisition unit 30 then reads out the shared-key data that corresponds to the new-FW developer ID, from the shared key storing unit 36 (S33). Subsequently, the acquisition unit 30 acquires the new FW data received from the provision apparatus 20 (S34). The acquisition unit 30 then calculates a MAC value (the fourth verification value) from the shared-key data read out and the new FW data received from the provision apparatus 20 (S35).

Subsequently, the acquisition unit 30 determines whether the third verification value is equal to the fourth verification value (S36). If the third verification value is equal to the fourth verification value (Yes at S36), the acquisition unit 30 ends the processing after determining that the new FW data received from the provision apparatus 20 is valid (S37). If the third verification value is not equal to the fourth verification value (No at S36), the acquisition unit 30 ends the processing after determining that the new FW data received from the provision apparatus 20 is invalid (S38).

Figure 11:
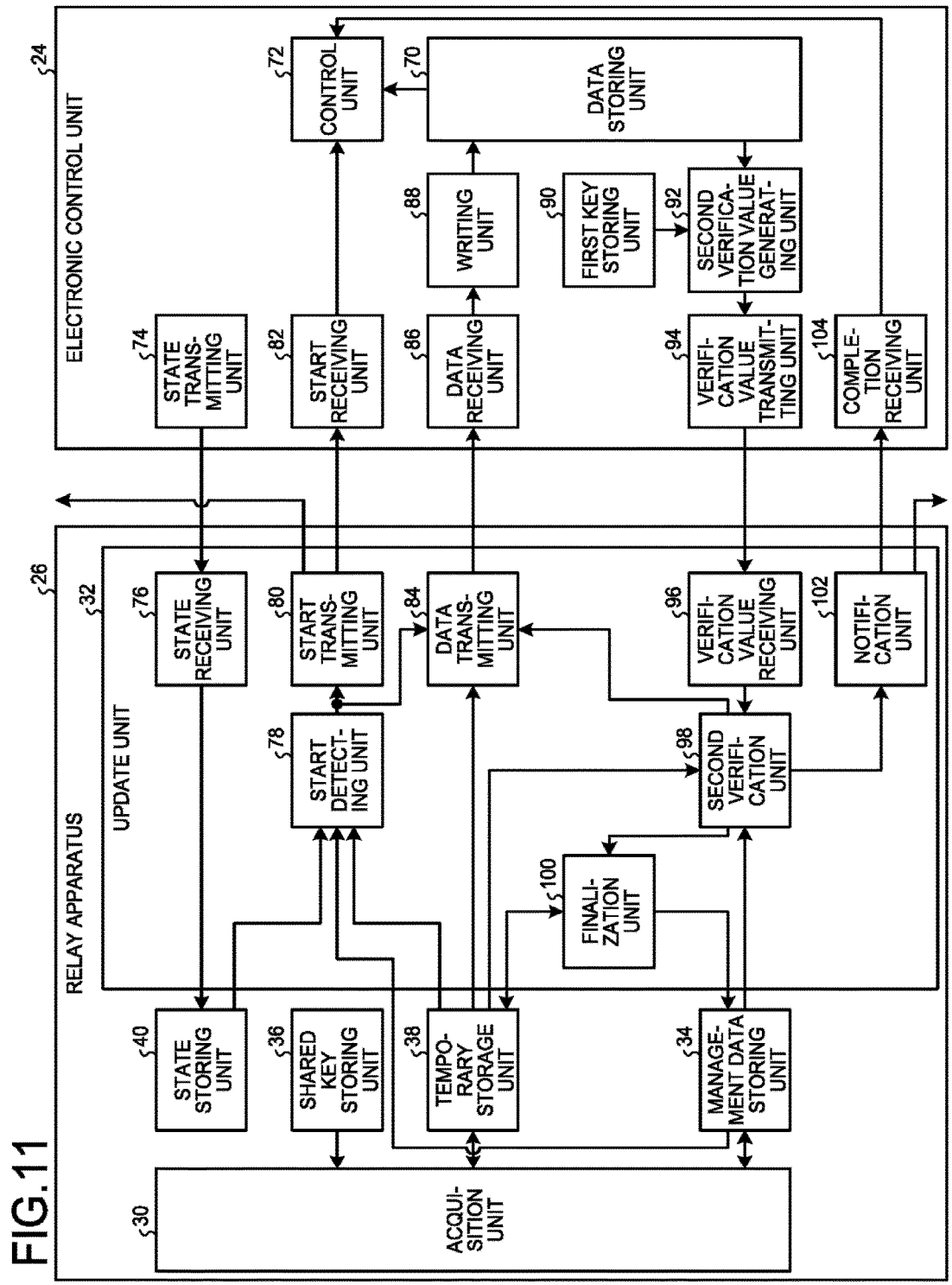
FIG. 11 is a configuration diagram illustrating a relay apparatus and an electronic control unit.

FIG. 11 is a diagram illustrating functional configurations of the relay apparatus 26 and each electronic control unit 24. The electronic control unit 24 includes a data storing unit 70, a control unit 72, a state transmitting unit 74, a start receiving unit 82, a data receiving unit 86, a writing unit 88, a first key storing unit 90, a second verification value generating unit 92, a verification value transmitting unit 94, and a completion receiving unit 104. The update unit 32 in the relay apparatus 26 includes a state receiving unit 76, a start detecting unit 78, a start transmitting unit 80, a data transmitting unit 84, a verification value receiving unit 96, a second verification unit 98, a finalization unit 100, and a notification unit 102.

The data storing unit 70 stores therein substantive data (current FW data) of a piece of firmware. The control unit 72 controls a target device based on the current FW data stored in the data storing unit 70.

The state transmitting unit 74 detects a state in which the electronic control unit 24 is. For example, the state transmitting unit 74 detects which of the following states it is in: normally operating; waiting for updating; receiving data for use in updating; having a writing process underway; having verification underway; and enabling data. The state transmitting unit 74 transmits ECU state information, which indicates the detected state, to the relay apparatus 26.

The state receiving unit 76 receives the ECU state information from the electronic control unit 24. The state receiving unit 76 stores the received ECU state information in the state storing unit 40.

The start detecting unit 78 determines whether a piece of firmware for which verification of new FW data and current FW data received from the provision apparatus 20 that are valid has been completed and for which the new FW data has not yet been written into the corresponding electronic control unit 24 can be updated. For example, when a state that the controlled system 22 is in coincidence with the update-timing information stored in the management data storing unit 34 while the ECU state information indicates the normally operating state, the start detecting unit 78 determines that the updating is possible. When the updating is possible, the start detecting unit 78 provides a start instruction to the start transmitting unit 80 and the data transmitting unit 84.

Upon receiving the start instruction, the start transmitting unit 80 transmits, to the electronic control unit 24 to execute the updating, information indicating that the updating is to be started. The electronic control unit 24 to execute the updating is thus enabled to, for example, make preparation for data reception. In addition, to the other electronic control units 24, the start transmitting unit 80 transmits information indicating that the electronic control unit 24 to execute the updating is to start updating the firmware. The other electronic control units 24 are thus enabled to limit the operation thereof or give a warning to a user so that occurrence of a failure in the operation can be prevented during the updating.

From the relay apparatus 26, the start receiving unit 82 receives the information indicating that the updating is to be started. Upon receiving the information indicating that the updating is to be started, the start receiving unit 82 limits the operation of the control unit 72. The start receiving unit 82 is thus enabled to perform control so that occurrence of a failure in the operation of a corresponding target device can be prevented during the updating.

Upon receiving the start instruction from the start detecting unit 78, the data transmitting unit 84 transmits, to the electronic control unit 24, the new FW data received from the provision apparatus 20, thereby causing the electronic control unit 24 to update the current FW data currently stored therein with the new FW data. Specifically, the data transmitting unit 84 transmits new FW data stored in the temporary storage unit 38 to the electronic control unit 24 and transmits the update instruction thereto at the same time.

In the temporary storage unit 38, new FW data determined to be valid is stored. Consequently, the data transmitting unit 84 can transmit the new FW data determined to be valid to the electronic control unit 24. In addition, the data transmitting unit 84 transmits the new FW data upon receiving the start instruction from the start detecting unit 78, and therefore can transmit the new FW data after a target device controlled by the electronic control unit 24 becomes a previously determined state.

The data receiving unit 86 receives new FW data and the update instruction from the relay apparatus 26. Upon receiving the update instruction, the writing unit 88 updates the current FW data stored in the data storing unit 70 with the new FW data received from the relay apparatus 26. For example, the writing unit 88 performs either of the following: overwriting, with the new FW data, an area where the current FW data has been stored within the data storing unit 70; and writing the new FW data in a previously determined area in the data storing unit 70 after deleting the current FW data stored in the data storing unit 70.

The first key storing unit 90 stores therein key data to be used for verifying data written into the data storing unit 70. In this embodiment, the first key storing unit 90 stores therein one of the pieces of shared-key data that corresponds to the current-FW developer ID and another one of the pieces of shared-key data that corresponds to the new-FW developer ID. When the current-FW developer ID and the new-FW developer ID are the same, the first key storing unit 90 stores therein one of the pieces of shared-key data.

The first key storing unit 90 may store therein key data that is different from the shared-key data, which is shared by the relay apparatus 26 and the provision apparatus 20. In this case, the first key storing unit 90 shares this key data with the relay apparatus 26 and keeps this key data confidential from a third party. The update unit 32 includes a storage unit that stores therein this key data and a verification value generating unit that generates a MAC value from this key data. In addition, this key data may be updated at regular intervals or may be newly generated each time the relay apparatus 26 and the electronic control unit 24 perform confidential communication with each other.

The second verification value generating unit 92 calculates a MAC value (a fifth verification value) with which to verify the new FW data written into the data storing unit 70 in the update processing. Specifically, the second verification value generating unit 92 reads out the piece of shared-key data that corresponds to the new-FW developer ID, from the first key storing unit 90. The second verification value generating unit 92 then calculates the MAC value from the shared-key data read out and the new FW data written into the data storing unit 70 in the update processing.

The verification value transmitting unit 94 transmits, to the relay apparatus 26, the MAC value with which to verify the new FW data written into the data storing unit 70 in the update processing. The verification value receiving unit 96 receives, from the electronic control unit 24, the MAC value with which to verify the new FW data written into the data storing unit 70 in the update processing.

The second verification unit 98 verifies whether the new FW data written into the electronic control unit 24 in the update processing is valid. Specifically, when a fifth verification value with which to verify the new FW data written into the electronic control unit 24 in the update processing is not equal to a sixth verification value with which to verify the new FW data transmitted to the electronic control unit 24, the second verification unit 98 determines that the new FW data written into the electronic control unit 24 is invalid.

Here, the fifth verification value is a MAC value calculated by the second verification value generating unit 92 for the new FW data written into the data storing unit 70. The sixth verification value is the MAC value received from the provision apparatus 20 for the new FW data. That is, the second verification unit 98 verifies whether the new FW data received from the provision apparatus 20 has been written into the electronic control unit 24 without being falsified.

Upon determining that the new FW data written into the electronic control unit 24 in the update processing is valid, the second verification unit 98 notifies the finalization unit 100 and the notification unit 102.

Upon receiving notification that the new FW data written into the electronic control unit 24 in the update processing is valid, the finalization unit 100 reads out information stored in the temporary storage unit 38 and stores the information in the management data storing unit 34. Specifically, the finalization unit 100 reads out the new-FW MAC value, the new-FW version number, and the new-FW developer ID from the temporary storage unit 38 and writes, into the management data storing unit 34, these pieces of data as the current-FW MAC value, the current-FW version number, and the current-FW developer ID contained in the management data on the same piece of firmware. The relay apparatus 26 is thus enabled to update the management data stored in the management data storing unit 34. The finalization unit 100 may delete the pieces of information stored in the temporary storage unit 38 after storing necessary information in the management data storing unit 34.

Upon receiving notification from the second verification unit 98 that the new FW data is valid, the notification unit 102 transmits, to the other electronic control units 24 and to the electronic control unit 24 to execute the updating, information indicating that updating the firmware has been completed. The other electronic control units 24 are thus enabled to stop limiting the operation thereof or call off a warning to the user.

From the relay apparatus 26, the completion receiving unit 104 receives the information indicating that updating the firmware has been completed. Upon receiving the information indicating that the updating has been completed, the completion receiving unit 104 stops limiting the operation of the control unit 72. The control unit 72 is thus enabled to control the target device based on the new FW data.

On the other hand, upon determining that the new FW data written into the electronic control unit 24 in the update processing is invalid, the second verification unit 98 notifies the data transmitting unit 84 that the update processing has failed.

When the update processing has failed, the data transmitting unit 84 transmits, to the electronic control unit 24, the current FW data received from the provision apparatus 20, thereby causing the electronic control unit 24 to restore the current FW data. Specifically, the data transmitting unit 84 transmits the current FW data stored in the temporary storage unit 38 to the electronic control unit 24 and transmits a restoration instruction thereto at the same time. In the temporary storage unit 38, the current FW data determined to be valid is stored. Consequently, the data transmitting unit 84 can transmit the current FW data determined to be valid to the electronic control unit 24.

The data receiving unit 86 receives the current FW data and the restoration instruction from the relay apparatus 26. Upon receiving the restoration instruction, the writing unit 88 restores current FW data that has been stored in the data storing unit 70. For example, the writing unit 88 overwrites, with the current FW data received, an area where current FW data originally has been stored within the data storing unit 70. In addition, the writing unit 88 may write the current FW data after deleting new FW data written in the update processing.

The second verification value generating unit 92 calculates a MAC value (a seventh verification value) with which to verify the current FW data written into the data storing unit 70 in the restoration processing. Specifically, the second verification value generating unit 92 reads out, from the first key storing unit 90, the piece of shared-key data that corresponds to the current-FW developer ID stored in the first key storing unit 90. The second verification value generating unit 92 then calculates the MAC value from the shared-key data read out and the current FW data written into the data storing unit 70 in the restoration processing.

To the relay apparatus 26, the verification value transmitting unit 94 transmits the MAC value with which to verify the current FW data written into the data storing unit 70 in the restoration processing. From the electronic control unit 24, the verification value receiving unit 96 receives the MAC value with which to verify the current FW data written into the data storing unit 70 in the restoration processing.

The second verification unit 98 verifies whether the current FW data written into the electronic control unit 24 in the restoration processing is valid. Specifically, when the seventh verification value with which to verify the current FW data written into the electronic control unit 24 in the restoration processing is not equal to an eighth verification value with which to verify the current FW data transmitted to the electronic control unit 24, the second verification unit 98 determines that the current FW data written into the electronic control unit 24 in the restoration processing is invalid.

Here, the seventh verification value is a MAC value calculated by the second verification value generating unit 92 and corresponding to the current FW data written into the data storing unit 70. The eighth verification value is a MAC value for current FW data stored in the management data storing unit 34. That is, the second verification unit 98 verifies whether the same data as the current FW data originally stored in the management data storing unit 34 has been written into the electronic control unit 24.

Upon determining that the current FW data written into the electronic control unit 24 in the restoration processing is valid, the second verification unit 98 notifies the notification unit 102. Upon receiving a notification from the second verification unit 98 that the current FW data is valid, the notification unit 102 transmits, to the other electronic control units 24 and to the electronic control unit 24 to execute the updating, information indicating that the processing has been completed. The other electronic control units 24 are thus enabled to stop limiting the operation thereof or call off a warning to the user.

From the relay apparatus 26, the completion receiving unit 104 receives the information indicating that the processing has been completed. Upon receiving information indicating that the processing has been completed, the completion receiving unit 104 stops limiting the operation of the control unit 72. The control unit 72 is thus enabled to control the target device based on the current FW data.

On the other hand, upon determining that the current FW data written into the electronic control unit 24 in the restoration processing is invalid, the second verification unit 98 notifies the data transmitting unit 84 that the restoration processing has failed. When the restoration processing has failed, the data transmitting unit 84 again transmits, to the electronic control unit 24, the current FW data received from the provision apparatus 20, thereby causing the electronic control unit 24 to restore the current FW data. The second verification unit 98 is thus enabled to cause the electronic control unit 24 to repeatedly perform the restoration processing.

However, when the number of times the current FW data written into the electronic control unit 24 has been determined to be invalid (the number of times of error) in the restoration processing is at least a certain number of times, the second verification unit 98 causes the data transmitting unit 84 to stop retransmission of the current FW data. The second verification unit 98 may additionally store, in the temporary storage unit 38, the number of times the current FW data has been determined to be invalid (the number of times of error).

The second verification unit 98 then notifies the notification unit 102 that the valid data has not been written into the electronic control unit 24. Upon receiving a notification from the second verification unit 98 that the valid data has not been written, the notification unit 102 transmits, to the other electronic control units 24 and to the electronic control unit 24 to execute the updating, information indicating that the valid data has not been written. The other electronic control units 24 is thus enabled to limit the operation thereof related to the electronic control unit 24 that is to execute the updating or enabled to give a warning to the user, for example.

Upon receiving the notification that the valid data has not been written, the notification unit 102 transmits, to the electronic control unit 24 to execute the updating, information indicating that the valid data has not been written. Upon receiving information that valid data has not been written, the completion receiving unit 104 limits the operation of the control unit 72. The control unit 72 is thus enabled to prevent the target device from being controlled based on invalid data.

The above-described configuration enables the relay apparatus 26 to update, with new FW data received from the provision apparatus 20, the current FW data stored in the electronic control unit 24. When the new FW data written into the electronic control unit 24 in the update processing is invalid, the configuration further enables the relay apparatus 26 to restore, from the current FW data received from the provision apparatus 20, the current FW data stored in the electronic control unit 24.

Figure 12:
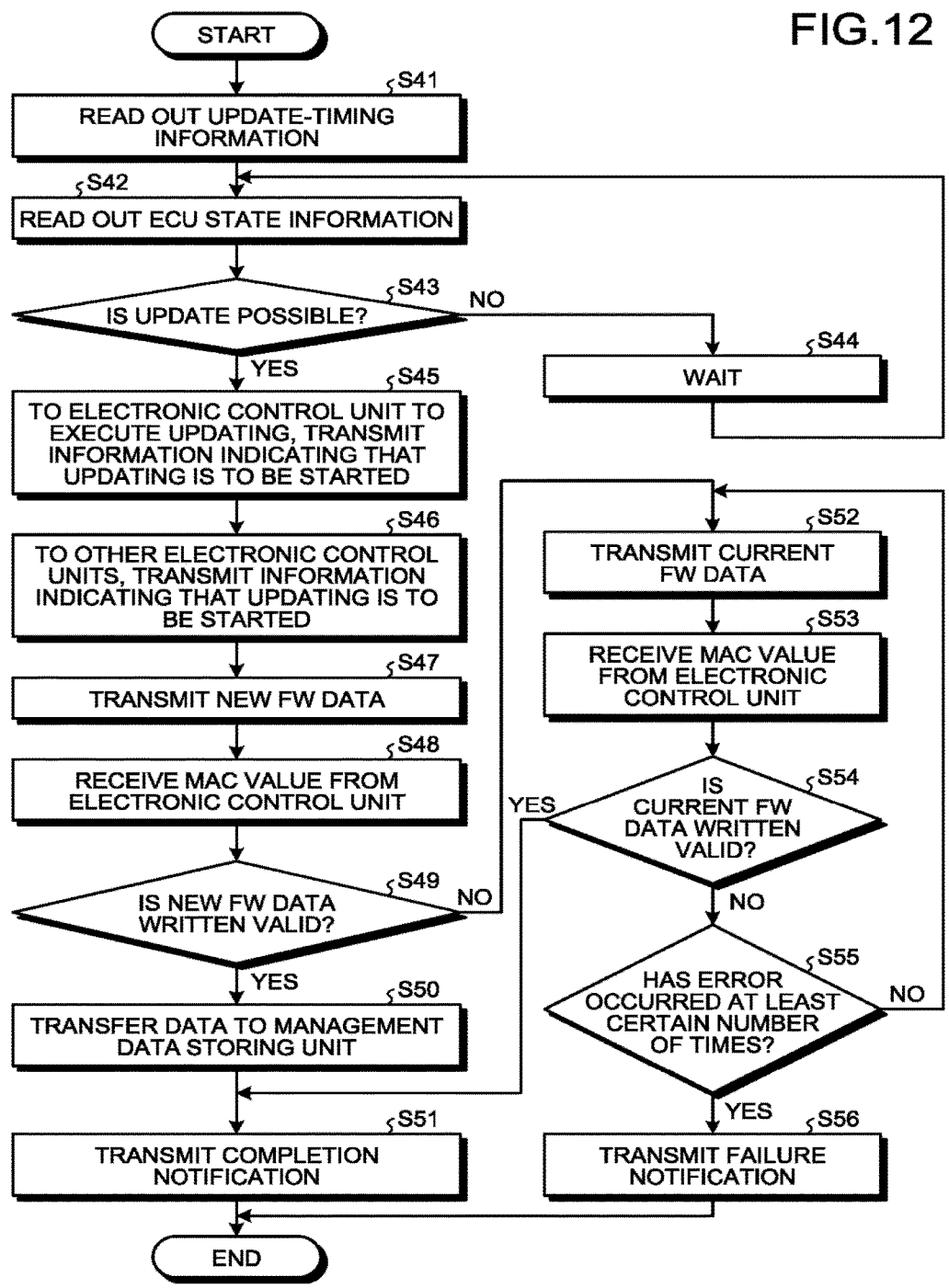
FIG. 12 is a flowchart illustrating a procedure for update processing to be executed by a relay apparatus.

FIG. 12 is a flowchart illustrating a procedure for the update processing by the relay apparatus 26. The update unit 32 executes the update processing illustrated in FIG. 12.

First, at Step S41, the update unit 32 reads out update-timing information on a piece of firmware to be updated, from the management data storing unit 34. Subsequently, at Step S42, the update unit 32 reads out, from the state storing unit 40, the ECU state information on the electronic control unit 24 to execute the updating.

Subsequently, at Step S43, the update unit 32 determines whether to start the update processing. Specifically, on conditions that a state of the controlled system 22 is in coincidence with the update-timing information and that the ECU state information indicates the normally operating state, the update unit 32 determines the updating is possible. If the updating is not possible (No at S43), the update unit 32 passes the processing to Step S44 and waits for a certain time period and then repeats the processing from Step S42. If the updating is possible (Yes at S43), the update unit 32 passes the processing to Step S45.

At Step S45, the update unit 32 transmits, to the electronic control unit 24 to execute the updating, information indicating that the updating is to be started. Subsequently, at Step S46, the update unit 32 transmits, to the other electronic control units 24, information indicating that updating of the firmware in the electronic control unit 24 to execute the updating is to be started.

Subsequently, at Step S47, to the electronic control unit 24, the update unit 32 transmits the new FW data received from the provision apparatus 20, thereby causing the electronic control unit 24 to update the current FW data currently stored therein with the new FW data. Specifically, the update unit 32 transmits, together with the update request, the new FW data stored in the temporary storage unit 38 and determined to be valid, to the electronic control unit 24.

Here, upon receiving the new FW data and the update instruction from the relay apparatus 26, the electronic control unit 24 to execute the updating updates the currently stored current FW data with the new FW data received from the relay apparatus 26. The electronic control unit 24 then calculates a MAC value (the fifth verification value) with which to verify the new FW data written into the data storing unit 70 in the update processing.

Subsequently, at Step S48, from the electronic control unit 24 to execute the updating, the update unit 32 receives the MAC value (the fifth verification value) with which to verify the new FW data written.

Subsequently, at Step S49, the update unit 32 verifies whether the new FW data written into the electronic control unit 24 in the update processing is valid. Processing at Step S49 is described later in detail with reference to a flowchart in FIG. 13. The update unit 32 passes the processing: to Step S50 if the data is valid (Yes at S49); and to Step S52 if the data is invalid (No at S49).

At Step S50, the update unit 32 reads out information stored in the temporary storage unit 38 and transfers the information to the management data storing unit 34. Specifically, the update unit 32 reads out the new-FW MAC value, the new-FW version number, and the new-FW developer ID from the temporary storage unit 38, and stores these pieces of data as the current-FW MAC value, the current- FW version number, and the current-FW developer ID in the management data storing unit 34.

Subsequently, at Step S51, to the electronic control unit 24 to execute the updating and to the other electronic control units 24, the update unit 32 transmits the completion notification indicating that updating the firmware in the electronic control unit 24 to execute the updating has been completed. The update unit 32 then ends the update processing for this piece of firmware.

On the other hand, at Step S52, to the electronic control unit 24, the update unit 32 transmits current FW data transmitted from the provision apparatus 20, thereby causing the electronic control unit 24 to restore the current FW data. Specifically, to the electronic control unit 24, the update unit 32 transmits, together with the restoration instruction, current FW data stored in the temporary storage unit 38 and determined to be valid.

Here, upon receiving the current FW data and the restoration instruction from the relay apparatus 26, the electronic control unit 24 to execute the updating stores therein the current FW data received from the relay apparatus 26. Specifically, the electronic control unit 24 deletes the new FW data written in the update processing and overwrites, with the current FW data received, an area where the current FW data originally has been stored within the data storing unit 70. The electronic control unit 24 then calculates a MAC value (the seventh verification value) with which to verify the current FW data written into the data storing unit 70 in the restoration processing.

Subsequently, at Step S53, from the electronic control unit 24 to execute the updating, the update unit 32 receives the MAC value (the seventh verification value) with which to verify the current FW data newly written.

Subsequently, at Step S54, the update unit 32 verifies whether the current FW data written into the electronic control unit 24 in the restoration processing is valid. Processing at Step S54 is described later in detail with reference to a flowchart in FIG. 14. If the data is valid (Yes at S54), the update unit 32 passes the processing to Step S51 to transmit the completion notification, and ends the update processing for this piece of firmware. If the data is invalid (No at S54), the update unit 32 passes the processing to Step S55.

At Step S55, the update unit 32 determines whether the number of times that the current FW data written into the electronic control unit 24 is invalid (the number of times of error) in the restoration processing is at least a certain number of times. If the number of times of error is less than the certain number of times (No at 355), the update unit 32 returns the processing to Step S52 and repeats the processing staring from transmission of the current FW data. If the number of times of error is at least the certain number of times (Yes at S55), the processing is passed to Step S56.

At Step S56, to the electronic control unit 24 to execute the updating and the other electronic control units 24, the update unit 32 transmits a failure notification indicating that valid data has not been written into the electronic control unit 24 to execute the updating. The update unit 32 then ends the update processing for this piece of firmware.

Figure 13:
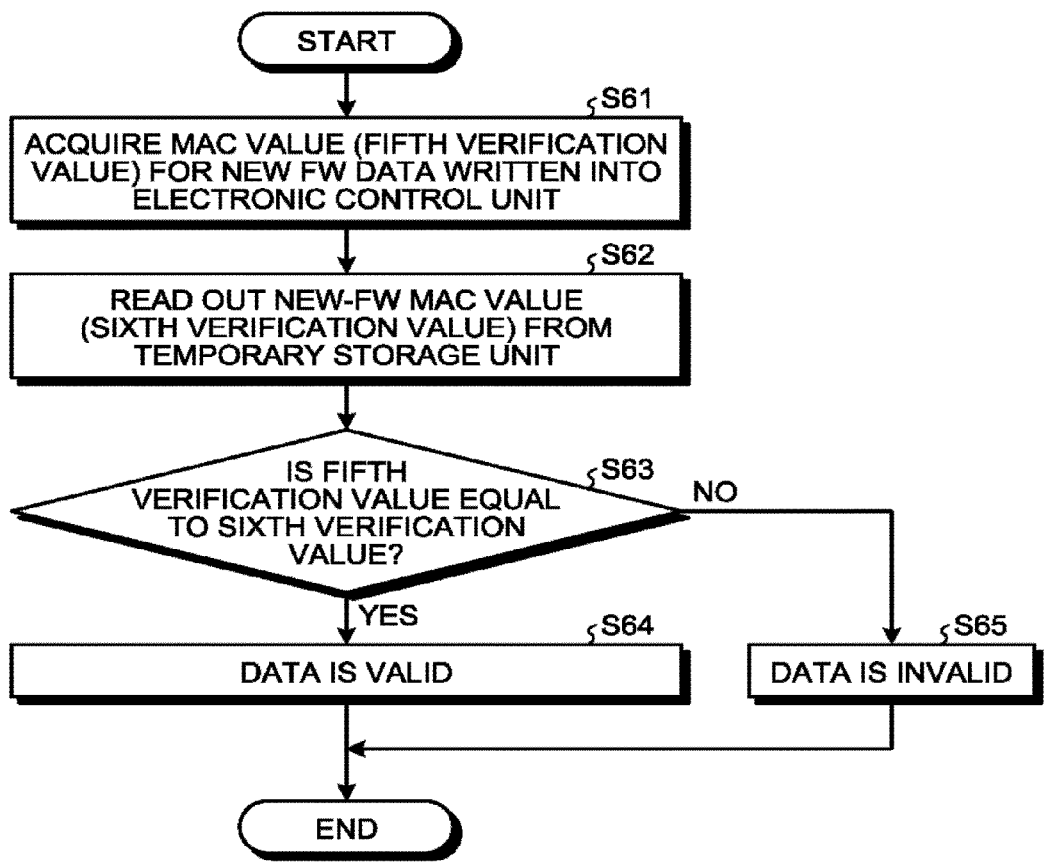
FIG. 13 is a flowchart illustrating a procedure for determining the validity of new FW data written.

FIG. 13 is a flowchart illustrating the procedure for determining the validity of new FW data written into the electronic control unit 24 in the update processing. At Step S49, the update unit 32 executes the processing illustrated in FIG. 13.

First, the update unit 32 acquires the fifth verification value with which to verify the new FW data written into the electronic control unit 24 in the update processing (S61).

The fifth verification value is a MAC value calculated by the electronic control unit 24 for the new FW data written into the electronic control unit 24. Subsequently, the update unit 32 reads out the new-FW MAC value (the sixth verification value) from the temporary storage unit 38 (S62).

Subsequently, the update unit 32 determines whether the fifth verification value and the sixth verification value are equal to each other (S63). If the fifth verification value and the sixth verification value are equal to each other (Yes at S63), the update unit 32 ends the processing after determining that the new FW data written into the electronic control unit 24 is valid (S64). If the fifth verification value and the sixth verification value are not equal to each other (No at S63), the update unit 32 ends the processing after determining that the new FW data written into the electronic control unit 24 is invalid (S65).

Figure 14:
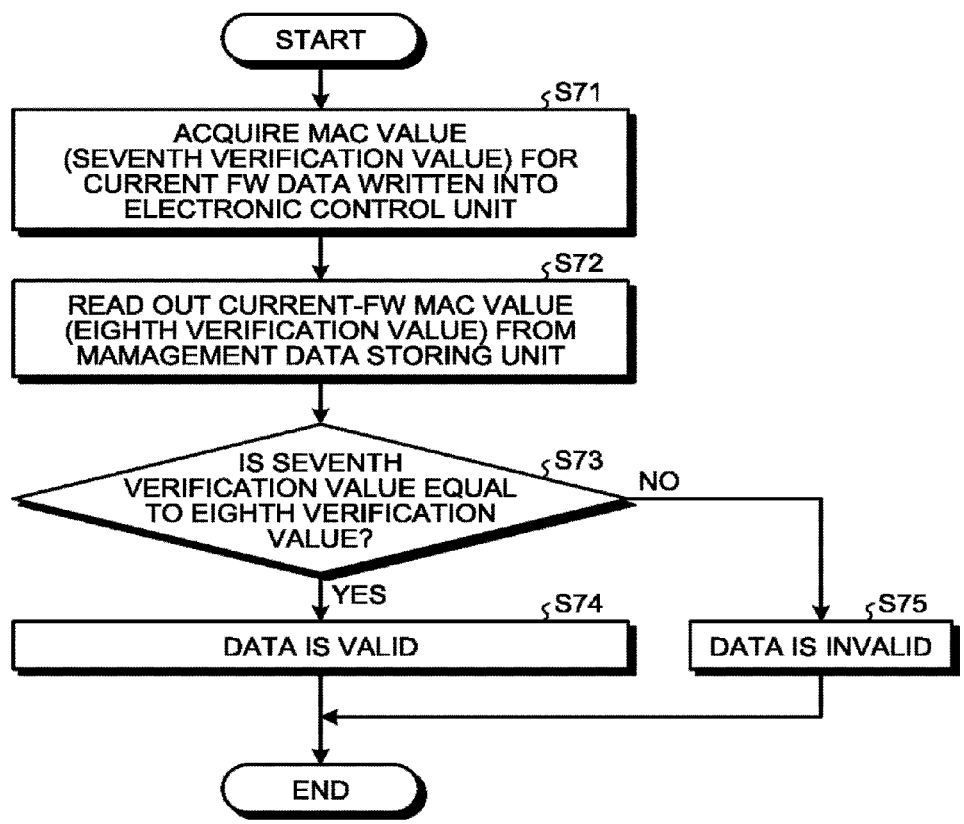
FIG. 14 is a flowchart illustrating a procedure determining the validity of current FW data written.

FIG. 14 is a flowchart illustrating the procedure for determining the validity of current FW data written into the electronic control unit 24 in the restoration processing. At Step S54, the update unit 32 executes the processing illustrated in FIG. 14.

First, the update unit 32 acquires the seventh verification value with which to verify current FW data written into the electronic control unit 24 in the restoration processing (S71). The seventh verification value is a MAC value calculated by the electronic control unit 24 for the current FW data written into the electronic control unit 24. Subsequently, the update unit 32 reads out the current-FW MAC value (the eighth verification value) from the management data storing unit 34 (S72).

Subsequently, the update unit 32 determines whether the seventh verification value and the eighth verification value are equal to each other (S73). If the seventh verification value and the eighth verification value are equal to each other (Yes at S73), the update unit 32 determines that the current FW data written into the electronic control unit 24 is valid (S74), and ends the processing. If the seventh verification value and the eighth verification value are not equal to each other (No at S73), the update unit 32 determines that the current FW data written into the electronic control unit 24 is invalid (S75), and ends the processing.

As described above, the network system 10 according to this embodiment does not need including, in each electronic control unit 24, a separate buffer to be used for updating data. Thus, the network system 10 according to this embodiment can reduce the cost of the electronic control unit 24.

In the network system 10 according to this embodiment, the relay apparatus 26 receives both the current FW data and the new FW data from the provision apparatus 20. In addition, when updating the current FW data with the new FW data in the electronic control unit 24 has failed, the relay apparatus 26 transmits the already received current FW data to the electronic control unit 24, thereby causing the electronic control unit 24 to restore the current FW data. Thus, the network system 10 according to this embodiment eliminates the need to access the provision apparatus 20 when the update processing has been failed, and therefore can shorten the total time necessary for updating.

First Modification

Figure 15:
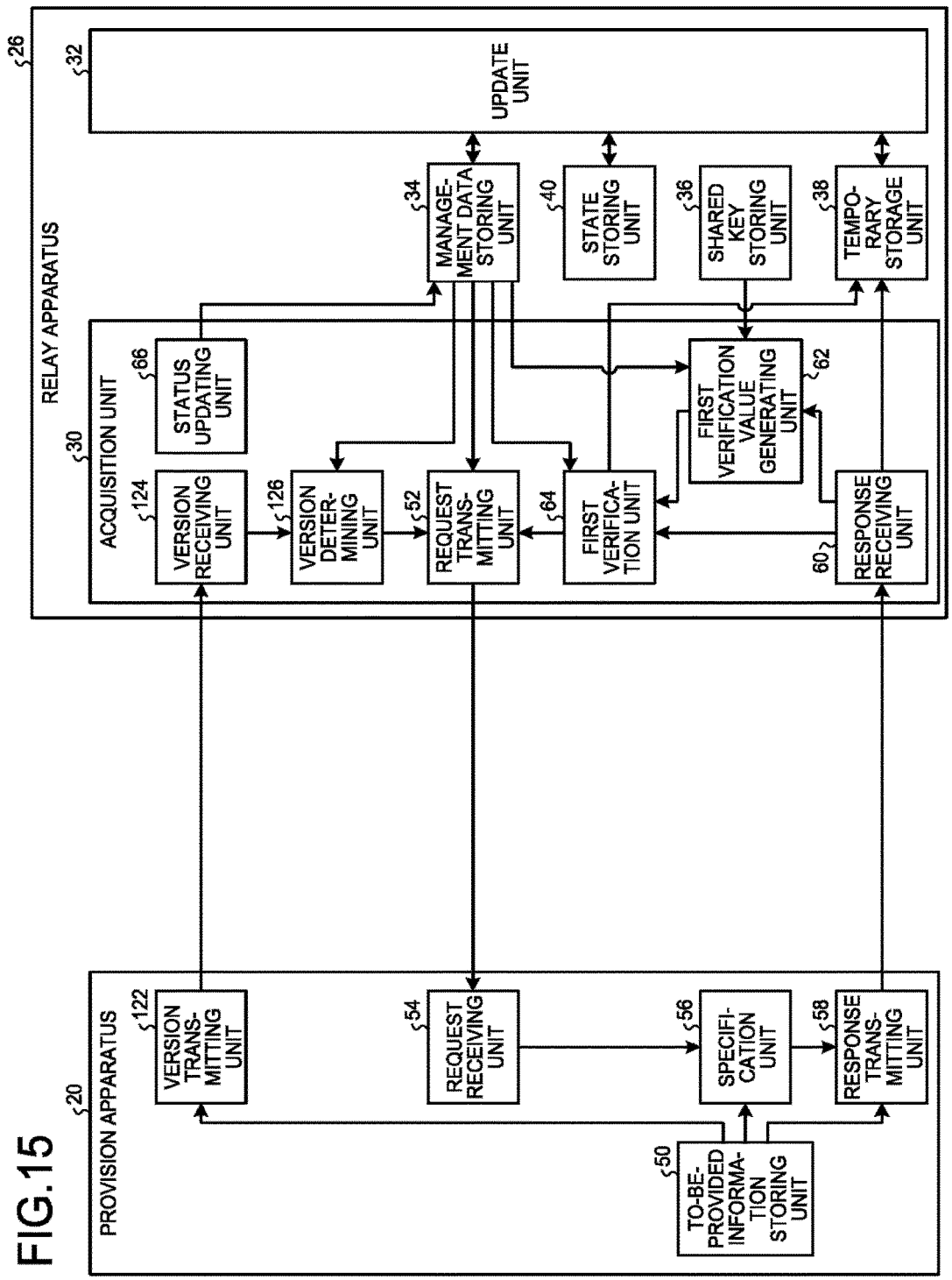
FIG. 15 is a configuration diagram illustrating a provision apparatus and a relay apparatus according to a first modification.

FIG. 15 is a diagram illustrating functional configurations of the provision apparatus 20 and the relay apparatus 26 according to a first modification. FIG. 16 is a diagram illustrating newest-version information.

In the following description of the first modification, blocks that each have the same function and configuration as any block in the description given with reference to FIG. 1 to FIG. 14 are assigned the same reference signs, and description thereof is omitted except for differences therebetween. The same applies to the description of second and other modifications.

The provision apparatus 20 according to the first modification further includes a version transmitting unit 122. The acquisition unit 30 in the relay apparatus 26 according to the first modification further includes a version receiving unit 124 and a version determining unit 126.

The version transmitting unit 122 transmits, to the relay apparatus 26, newest-version information indicating the version of new FW data that can be transmitted from the provision apparatus 20 with respect to each piece of firmware. The newest-version information contains ECUID, FWID, and a MAC value as illustrated in FIG. 16. The MAC value is a MAC value for the newest FW data. The version transmitting unit 122 may transmit a list that contains the newest-version information on a plurality of pieces of firmware. The version transmitting unit 122 transmits the newest-version information, for example, at certain time intervals.

The version receiving unit 124 receives the newest-version information indicating the version of new FW data that can be transmitted from the provision apparatus 20. Based on the received newest-version information, the version determining unit 126 determines whether the version of the new FW data that can be transmitted from the provision apparatus 20 is newer than the version of the current FW data stored in the corresponding electronic control unit 24.

When the version of new FW data that can be transmitted from the provision apparatus 20 is newer than the version of current FW data stored in the electronic control unit 24, the request transmitting unit 52 receives notification from the version determining unit 126. On condition that the version of the new FW data that can be transmitted from the provision apparatus 20 is newer than the version of current FW data stored in the electronic control unit 24, the request transmitting unit 52 then transmits an acquisition request regarding the corresponding piece of firmware to the provision apparatus 20.

Figure 17:
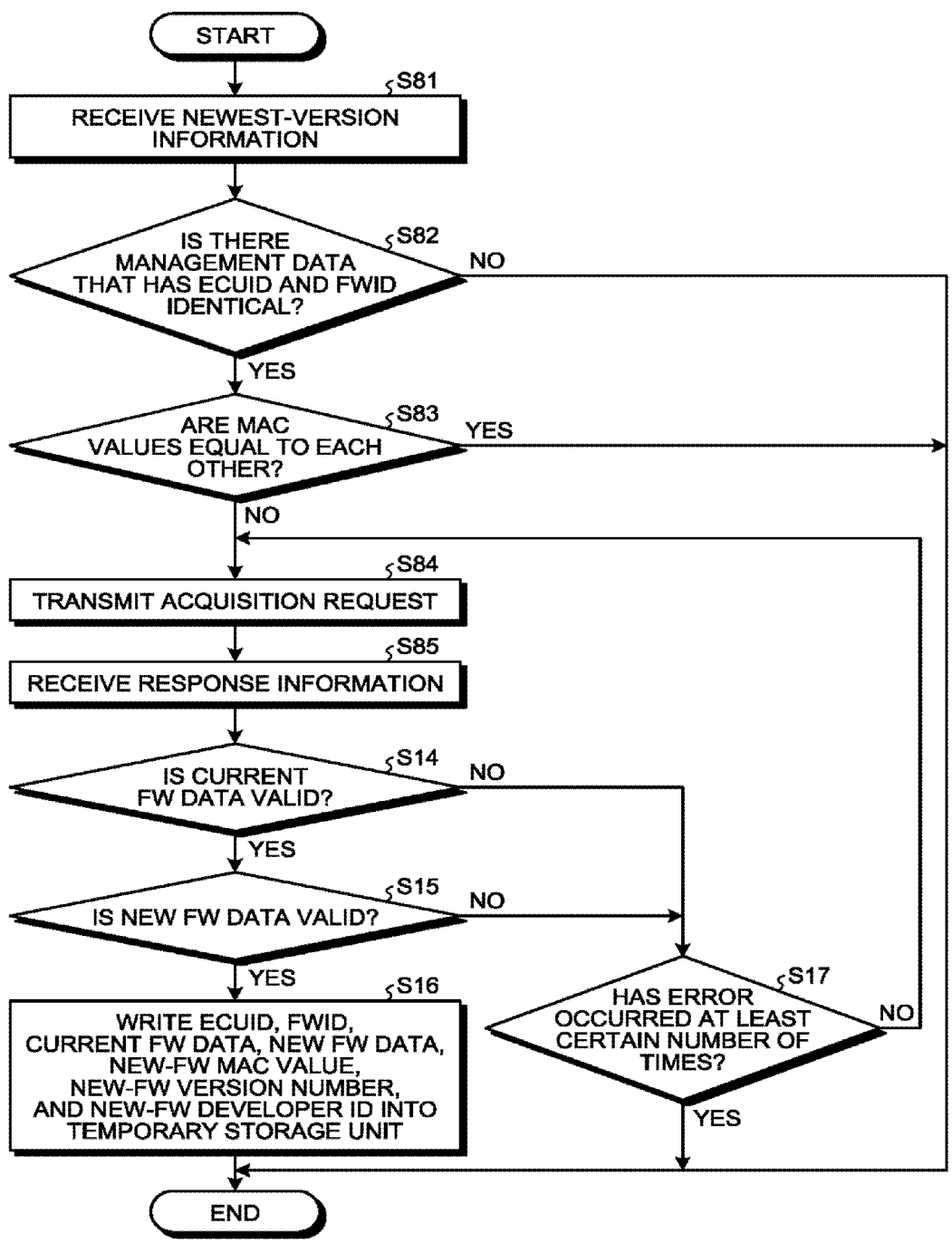
FIG. 17 is a flowchart illustrating a procedure for acquisition processing according to the first modification.

FIG. 17 is a flowchart illustrating a procedure for acquisition processing to be executed by the relay apparatus 26 according to the first modification. In the first modification, the acquisition unit 30 executes acquisition processing illustrated in FIG. 17.

First, at Step S81, the acquisition unit 30 receives the newest-version information from the provision apparatus 20. Subsequently, at Step S82, the acquisition unit 30 determines whether a piece of management data that has ECUID and FWID identical with ECUID and FWID in the newest-version information has been stored in the management data storing unit 34. If there is no piece of management data that has ECUID and FWID identical therewith (No at S82), the acquisition unit 30 ends this procedure. If there is any piece of management data that has ECUID and FWID identical therewith (Yes at S82), the acquisition unit 30 passes the processing to Step S83.

At Step S83, the acquisition unit 30 compares the MAC value contained in the newest-version information with the current-FW MAC value in the piece of management data that has ECUID and FWID identical with those items in the newest-version information. If these MAC values are equal to each other (Yes at S83), the acquisition unit 30 determines that the version of the current FW data stored in the electronic control unit 24 is the same as the newest version that can be transmitted from the provision apparatus 20, and ends this procedure. If these MAC values are not equal to each other (No at S83), the acquisition unit 30 determines that the version of new FW data that can be transmitted from the provision apparatus 20 is newer than the version of the current FW data stored in the electronic control unit 24, and passes the processing to Step S84.

At Step S84, the acquisition unit 30 transmits an acquisition request to the provision apparatus 20 with respect to a piece of firmware that is specified with ECUID and FWID contained in the newest-version information. Upon receiving the acquisition request from the relay apparatus 26, the provision apparatus 20 transmits response information to the relay apparatus 26 as in the case illustrated in FIG. 8.

Subsequently, at Step S85, the acquisition unit 30 receives the response information from the provision apparatus 20. Thereafter, the acquisition unit 30 executes the same processing as the processing from Step S14 to Step S17 in FIG. 8. However, at Step S17, if the number of times of error is less than the certain number of times (No at S17), the acquisition unit 30 returns the processing to Step S84.

The relay apparatus 26 according to the first modification is enabled to transmit the acquisition request when the version of new FW data that can be transmitted from the provision apparatus 20 is newer than the version of current FW data stored in the corresponding electronic control unit 24. Consequently, the relay apparatus 26 enables efficient transmission of the acquisition request.

Second Modification

Figure 18:
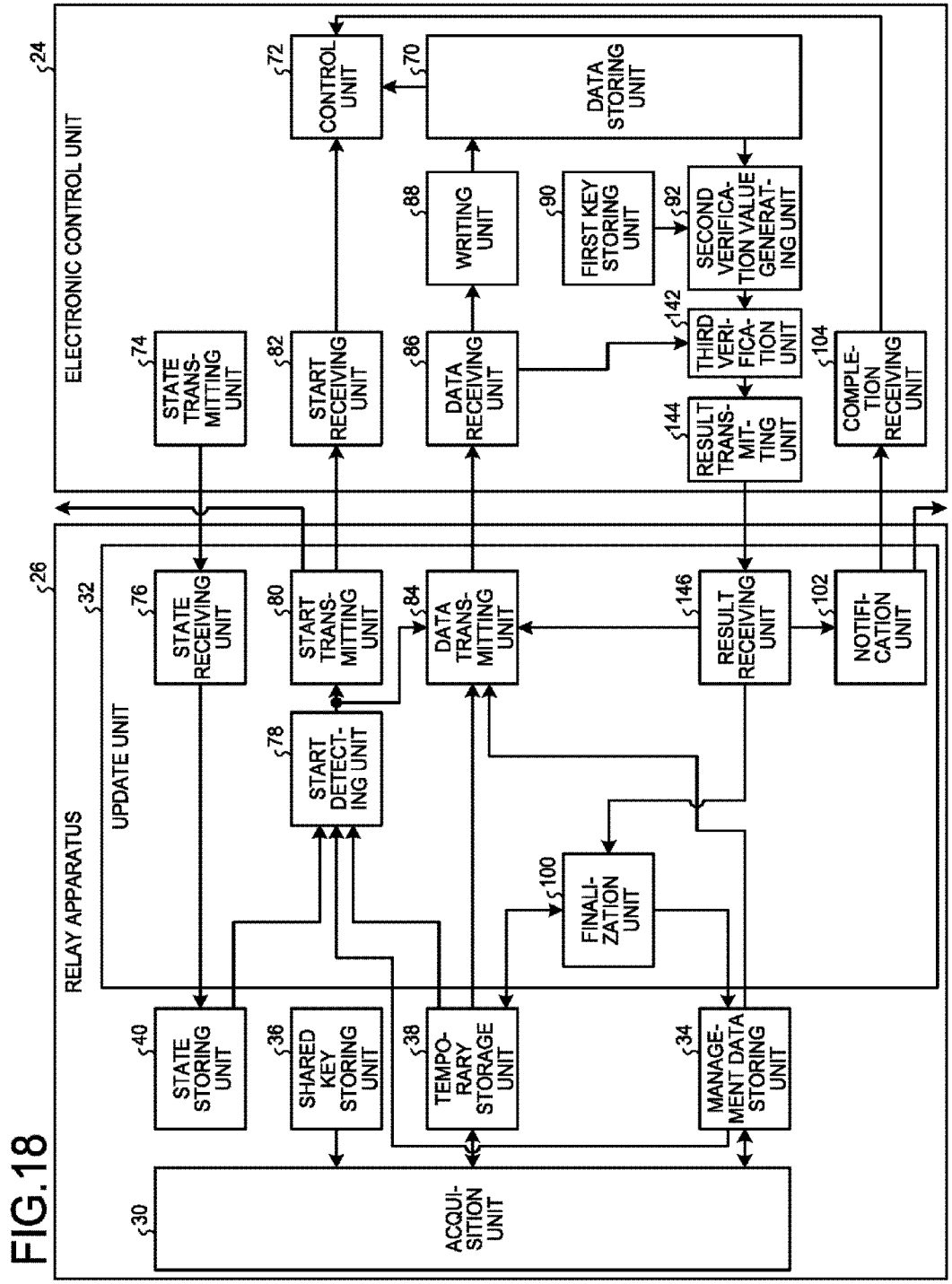
FIG. 18 is a configuration diagram illustrating a relay apparatus and an electronic control unit according to a second modification.

FIG. 18 is a diagram illustrating functional configurations of the relay apparatus 26 and each electronic control unit 24 according to a second modification. The electronic control unit 24 according to the second modification is capable of executing verification as to whether data stored therein is valid. Consequently, in the second modification, the electronic control unit 24 executes verification on new FW data and current FW data that have been written into the electronic control unit 24.

The electronic control unit 24 according to the second modification, as compared with the configuration thereof illustrated in FIG. 11, further includes a third verification unit 142 and a result transmitting unit 144, and does not include the verification value transmitting unit 94. The update unit 32 in the relay apparatus 26 according to the second modification, as compared with the configuration thereof illustrated in FIG. 11, further includes a result receiving unit 146 and does not include the verification value receiving unit 96 and the second verification unit 98.

In the second modification, upon receiving the start instruction from the start detecting unit 78, the data transmitting unit 84 transmits the new FW data received from the provision apparatus 20, and the sixth verification value with which to verify the new FW data received from the provision apparatus 20, together with the update instruction, to the electronic control unit 24. The sixth verification value is a MAC value for the new FW data received from the provision apparatus 20. Thus, the data transmitting unit 84 enables the electronic control unit 24 to update the current FW data with the new FW data and verify the validity of the new FW data written into the electronic control unit 24.

The third verification unit 142 verifies whether the new FW data written into the electronic control unit 24 in the update processing is valid. Specifically, when the fifth verification value with which to verify the new FW data written into the electronic control unit 24 in the update processing is not equal to the sixth verification value with which to verify the new FW data received from the relay apparatus 26, the third verification unit 142 determines that the new FW data written into the electronic control unit 24 in the update processing is invalid.

Here, the fifth verification value is a MAC value calculated by the second verification value generating unit 92 for the new FW data written into the data storing unit 70. The sixth verification value is the MAC value for the new FW data received from the relay apparatus 26.

The result transmitting unit 144 transmits a result of whether the new FW data written into the electronic control unit 24 in the update processing is valid, to the relay apparatus 26. The result receiving unit 146 receives the result of whether the new FW data written into the electronic control unit 24 in the update processing is valid, from the electronic control unit 24.

Upon receiving the result that indicates that the new FW data written into the electronic control unit 24 in the update processing is valid, the result receiving unit 146 notifies the finalization unit 100 and the notification unit 102 of the result. Upon receiving the notification from the result receiving unit 146 that the new FW data written is valid, the finalization unit 100 reads out information stored in the temporary storage unit 38 and stores the information in the management data storing unit 34. Upon receiving the notification from the result receiving unit 146 that the new FW data written is valid, the notification unit 102 transmits, to the other electronic control units 24 and to the electronic control unit 24 to execute the updating, information indicating that updating the firmware in the electronic control unit 24 to execute the updating has been completed.

On the other hand, upon receiving the result that indicates that the new FW data written into the electronic control unit 24 in the update processing is invalid, the result receiving unit 146 notifies the data transmitting unit 84 that the update processing has failed.

When the update processing has failed, the data transmitting unit 84 transmits the current FW data received from the provision apparatus 20, and the eighth verification value with which to verify the current FW data, together with the restoration instruction, to the electronic control unit 24. The eighth verification value is a MAC value for the current FW data currently stored in the management data storing unit 34. Thus, the data transmitting unit 84 enables the electronic control unit 24 to restore the current FW data and verify the validity of the current FW data written into the electronic control unit 24.

The third verification unit 142 verifies whether the current FW data written into the electronic control unit 24 in the restoration processing is valid. Specifically, when the seventh verification value with which to verify the current FW data written into the electronic control unit 24 in the restoration processing is not equal to the eighth verification value with which to verify the current FW data received from the relay apparatus 26, the third verification unit 142 determines that the current FW data written into the electronic control unit 24 in the restoration processing is invalid.

Here, the seventh verification value is a MAC value calculated by the second verification value generating unit 92 and corresponding to the current FW data newly written into the data storing unit 70. The eighth verification value is a MAC value for the current FW data received from the relay apparatus 26.

The result transmitting unit 144 transmits, to the relay apparatus 26, a result of whether the current FW data written into the electronic control unit 24 in the restoration processing is valid. The result receiving unit 146 receives the result of whether the current FW data written into the electronic control unit 24 in the restoration processing is valid, from the electronic control unit 24.

Upon receiving the result that indicates that the current FW data written into the electronic control unit 24 in the restoration processing is valid, the result receiving unit 146 notifies the notification unit 102 of the result. Upon receiving the notification from the result receiving unit 146 that the current FW data written is valid, the notification unit 102 transmits, to the other electronic control units 24 and to the electronic control unit 24 to execute the restoration, information indicating that the processing in the electronic control unit 24 to execute the updating has been completed.

On the other hand, upon receiving the result that indicates that the current FW data written into the electronic control unit 24 in the restoration processing is invalid, the result receiving unit 146 notifies the data transmitting unit 84 that the restoration processing has failed.

When the restoration processing has failed, the data transmitting unit 84 repeats the processing of transmitting the current FW data and the eighth verification value together with the restoration instruction to the electronic control unit 24. Thus, the data transmitting unit 84 can enable the electronic control unit 24 to repeatedly execute the restoration processing.

However, when the number of times that the current FW data written into the electronic control unit 24 in the restoration processing has been determined to be invalid (the number of times of error) is at least a certain number of times, the result receiving unit 146 causes the data transmitting unit 84 to end transmission of the current EW data. The result receiving unit 146 then notifies the notification unit 102 that valid data has not been written into the electronic control unit 24. Upon receiving notification from the result receiving unit 146 that valid data has not been written, the notification unit 102 transmits information indicating that valid data has not been written into the electronic control unit 24 to execute the updating, to the other electronic control units 24 and the electronic control unit 24 to execute the updating.

Figure 19:
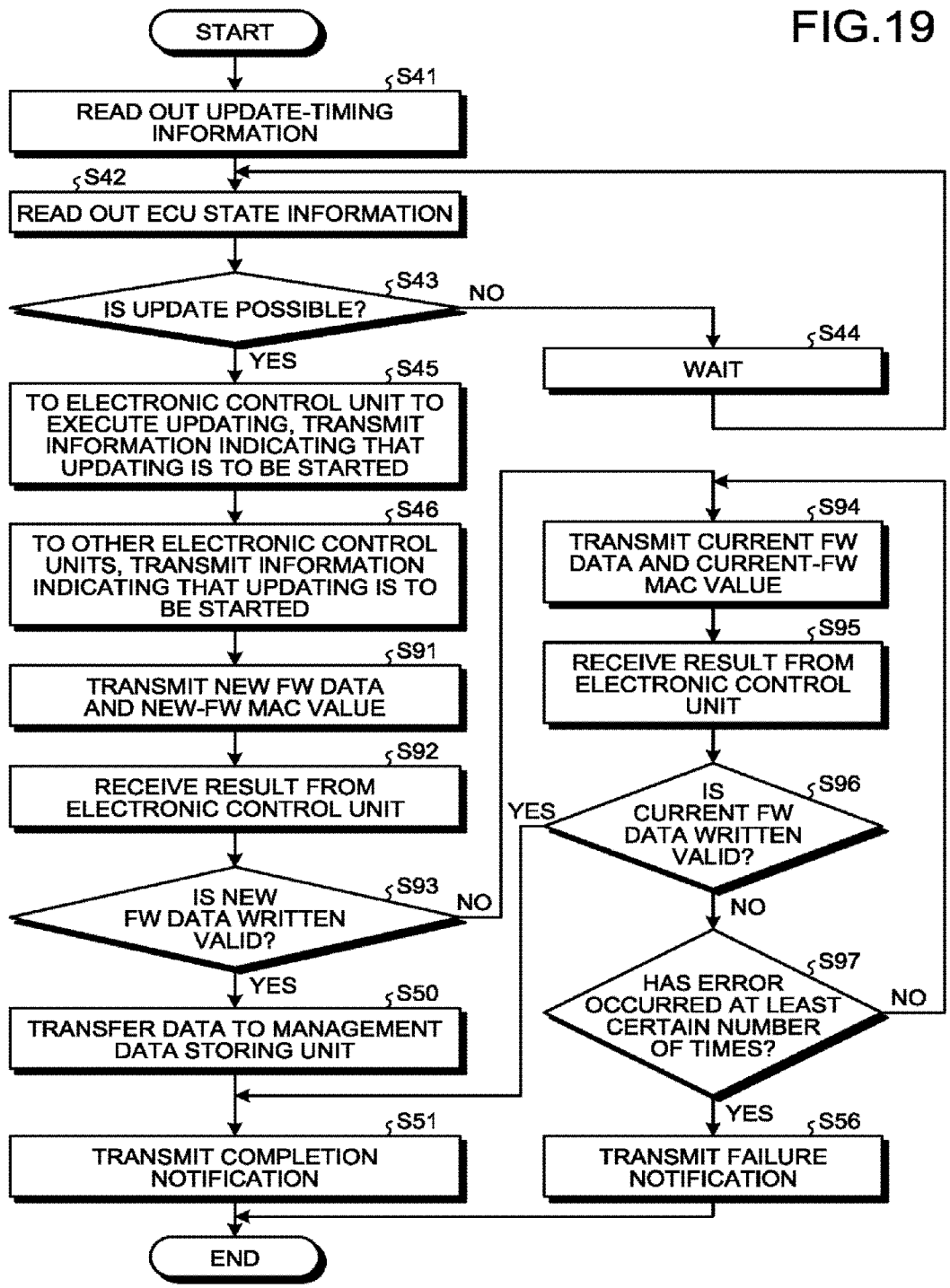
FIG. 19 is a flowchart illustrating a procedure for update processing according to the second modification.

FIG. 19 is a flowchart illustrating a procedure for update processing to be executed by the relay apparatus 26 according to the second modification. In the second modification, the update unit 32 executes update processing illustrated in FIG. 19.

First, the update unit 32 executes the same processing as the processing from Step S41 to Step S46 in FIG. 12. Upon completion of Step S46, the update unit 32 passes the processing to Step S91.

At Step S91, the update unit 32 transmits the new FW data received from the provision apparatus 20 and the MAC value (the sixth verification value) received from the provision apparatus 20 for the new FW data, together with an update instruction, to the electronic control unit 24. Subsequently, at Step S92, the update unit 32 receives a result of whether the new FW data written is valid, from the electronic control unit 24.

Subsequently, at Step S93, the update unit 32 determines whether the new FW data written into the electronic control unit 24 in the update processing is valid. The update unit 32 passes the processing: to Step S50 if the data is valid (Yes at S93); and to Step S94 if the data is invalid (No at S93).

At Step S50 and Step S51, the update unit 32 executes the processing in the same manner as in FIG. 12. Upon completion of Step S51, the update unit 32 ends the update processing for this piece of firmware.

At Step S94, the update unit 32 transmits the current FW data and the MAC value (the eighth verification value) for the current FW data that have been received from the provision apparatus 20, together with a restoration instruction, to the electronic control unit 24. Subsequently, at Step S95, the update unit 32 receives a verification result of whether the current FW data written in the restoration processing is valid, from the electronic control unit 24.

Subsequently, at Step S96, the update unit 32 determines whether the current FW data written into the electronic control unit 24 in the restoration processing is valid. The update unit 32 passes the processing: to Step S51 if the data is valid (Yes at S96); and to Step S97 if the data is invalid (No at S96).

At Step S97, the update unit 32 determines whether the number of times of error in the restoration processing is at least a certain number of times. If the number of times of error is less than the certain number of times (No at S97), the update unit 32 returns the processing to Step S94 and repeats the processing starting from transmission of current FW data. If the number of times of error is at least the certain number of times (Yes at S97), the processing is passed to Step S56.

At Step S56, the update unit 32 executes the processing in the same manner as in FIG. 12. Upon completion of Step S56, the update unit 32 ends the update processing for this piece of firmware.

The relay apparatus 26 as described above according to the second modification is capable of causing the electronic control unit 24 to verify the validity of data written into the electronic control unit 24.

Third Modification

Figure 20:
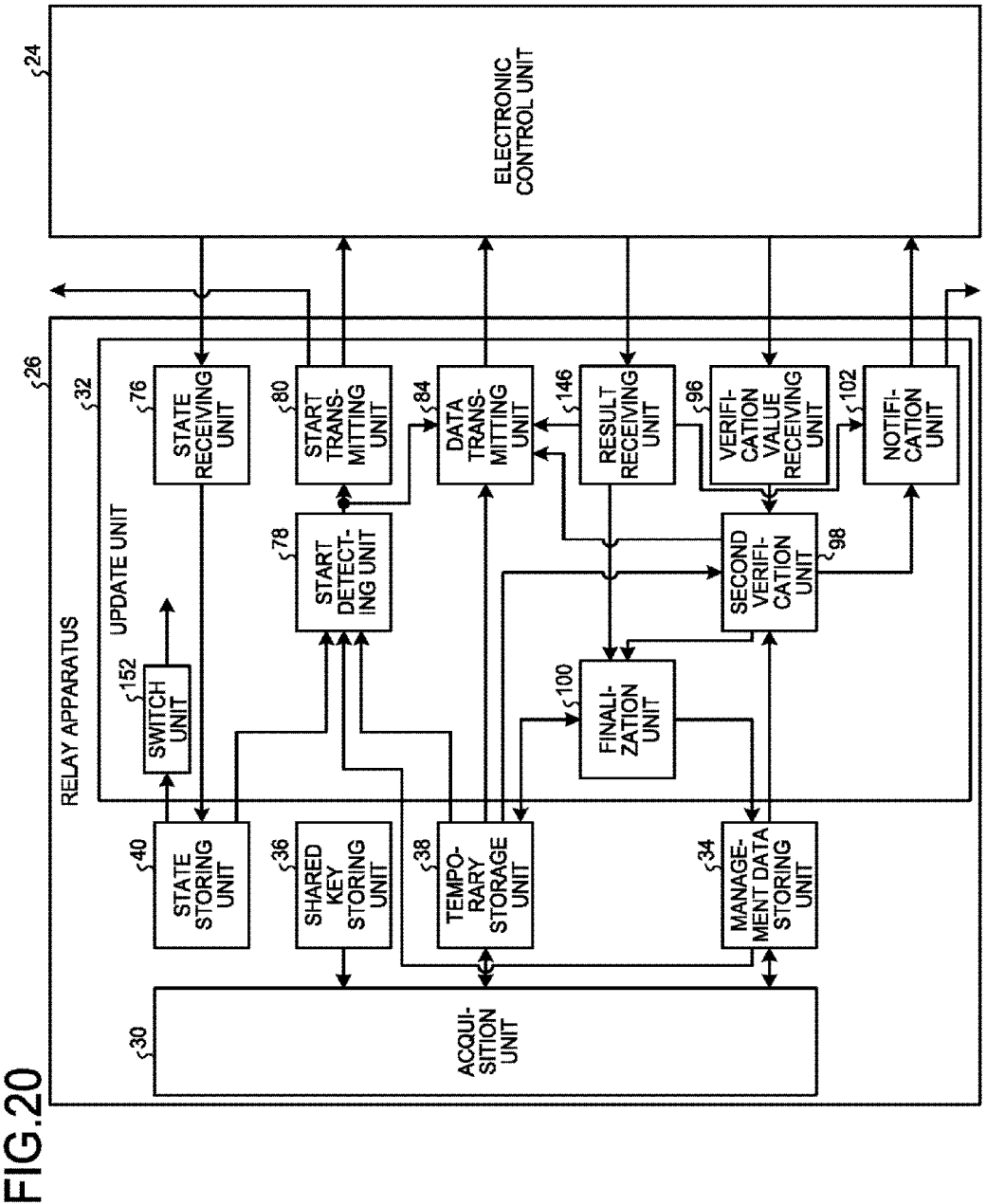
FIG. 20 is a configuration diagram illustrating a relay apparatus and an electronic control unit according to a third modification.

FIG. 20 is a diagram illustrating functional configurations of the relay apparatus 26 and each electronic control unit 24 according to a third modification. FIG. 21 is a diagram illustrating the contents of a piece of information stored in the state storing unit 40 according to the third modification.

The relay apparatus 26 according to the third modification can switch between each electronic control unit 24 and the relay apparatus 26 as an executor of verification of the validity of data written into the electronic control units 24. In the third modification, the electronic control unit 24 has the configuration illustrated in FIG. 11 or the configuration illustrated in FIG. 18. When the electronic control unit 24 has the configuration illustrated in FIG. 11, it is the relay apparatus 26 that verifies the validity of data written into the electronic control unit 24. When the electronic control unit 24 has the configuration illustrated in FIG. 18, the electronic control unit 24 verifies the validity of data written into the electronic control unit 24.

The update unit 32 in the relay apparatus 26 according to the third modification further includes the result receiving unit 146 and a switch unit 152 in addition to the configuration illustrated in FIG. 11. The result receiving unit 146 has the same function as the configuration illustrated in FIG. 18.

In the third modification, the state storing unit 40 stores therein a piece of verification executor information as illustrated in FIG. 21. The piece of verification executor information indicates which of the relay apparatus 26 and the electronic control unit 24 is to execute verification as to whether data written into the electronic control unit 24 is valid.

The switch unit 152 reads out a piece of verification executor information for the electronic control unit 24 to execute updating, from the state storing unit 40. Based on the verification executor information read out, the switch unit 152 switches between the electronic control unit 24 and the relay apparatus 26 as an executor of the verification.

When causing the relay apparatus 26 to execute the verification, the switch unit 152 enables the functions of the verification value receiving unit 96 and the second verification unit 98 and stops the function of the result receiving unit 146. When causing the electronic control unit 24 to execute the verification, the switch unit 152 stops the functions of the verification value receiving unit 96 and the second verification unit 98 and enables the function of the result receiving unit 146.

Figure 22:
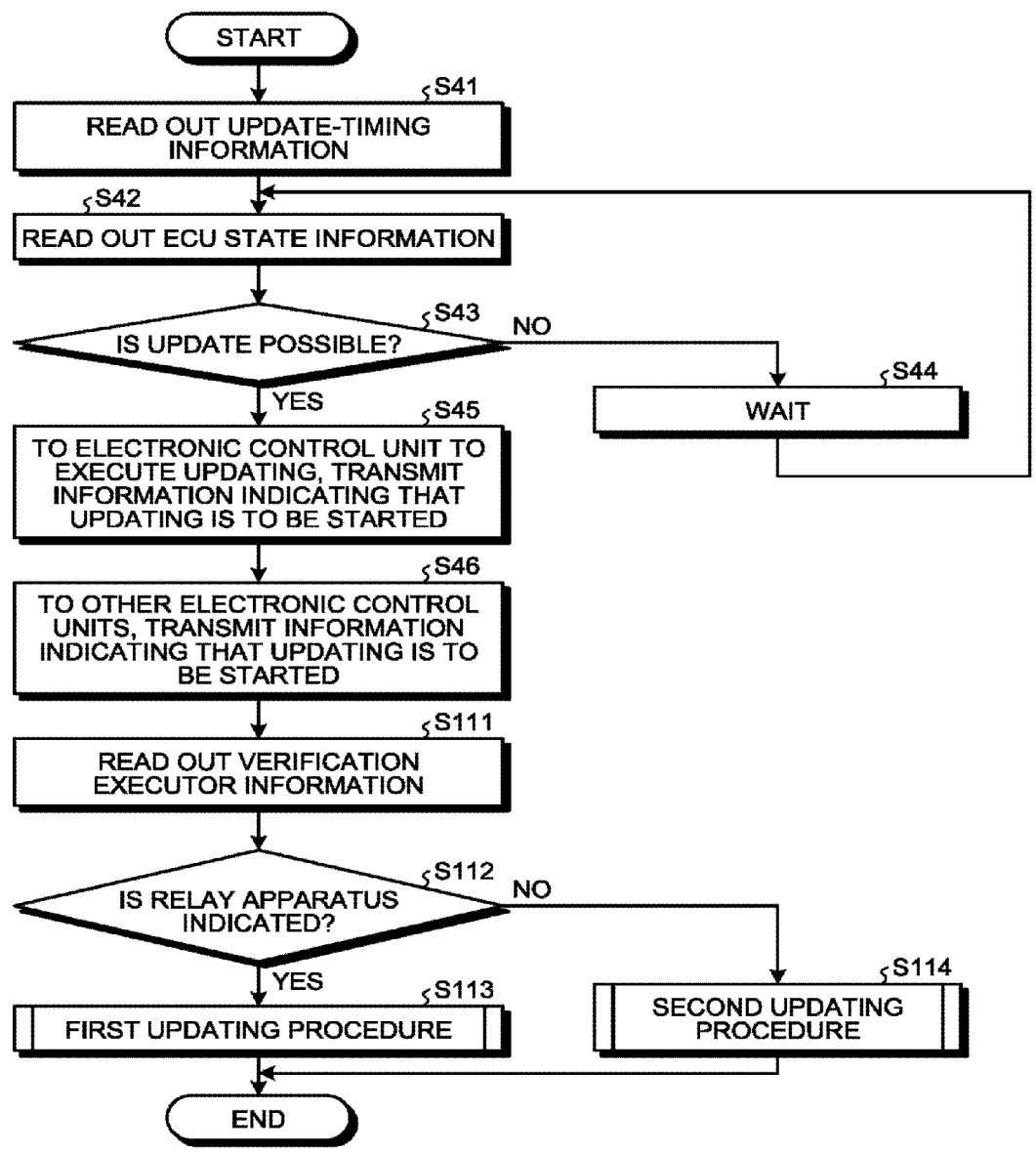
FIG. 22 is a flowchart illustrating a procedure for update processing according to the third modification.

FIG. 22 is a flowchart illustrating a procedure for update processing to be executed by the relay apparatus 26 according to the third modification. In the third modification, the update unit 32 executes update processing illustrated in FIG. 22.

First, the update unit 32 executes the same processing as the processing from Step S41 to Step S46 in FIG. 12. Upon completion of Step S46, the update unit 32 passes the processing to Step S111.

At Step S111, the update unit 32 reads out, from the state storing unit 40, a piece of verification executor information that corresponds to the electronic control unit 24 to execute the updating. Subsequently, at Step S112, the update unit 32 determines which of the relay apparatus 26 and the electronic control unit 24 is to be caused to execute the verification, based on the verification executor information read out.

If the relay apparatus 26 is to be caused to execute the verification (Yes at S112), the update unit 32 passes the processing to a first updating procedure at Step S113. If the electronic control unit 24 is to be caused to execute the verification (No at S112), the update unit 32 passes the processing to a second updating procedure at Step S114.

The first updating procedure at Step S113 is the same as the processing procedure at Step S47 and later steps illustrated in FIG. 12. The second updating procedure at Step S114 is the same as the processing procedure at Step S91 and later steps illustrated in FIG. 19.

By executing the above-described processing, the update unit 32 enables the relay apparatus 26 or a corresponding one of the electronic control units 24 to execute verification of data written into the electronic control unit 24.

Figure 23:
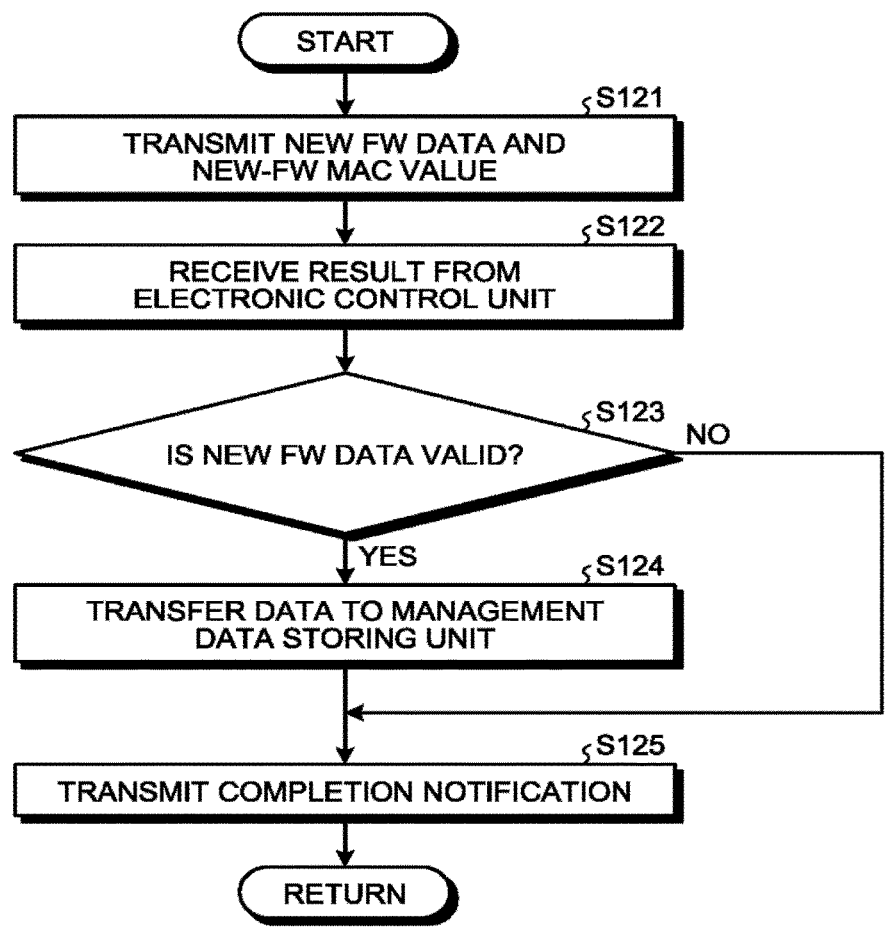
FIG. 23 is a flowchart illustrating another example of a second update processing procedure.

FIG. 23 is a diagram illustrating another example of the second update processing procedure. Any of the electronic control units 24 may include a buffer for temporarily storing therein data received from the outside when data stored in the electronic control unit 24 is updated. The electronic control unit 24 having the above-described configuration is capable of temporarily storing, in the buffer, new FW data received from the relay apparatus 26, and then verifying the validity of the new FW data while having the new FW data stored in the buffer.

Thereafter, upon determining that the new FW data stored in the buffer is valid, the electronic control unit 24 transfers the new FW data from the buffer to the data storing unit 70. Thus, the electronic control unit 24 can update current FW data stored therein with the new FW data.

On the other hand, upon determining that the new FW data stored in the buffer is invalid, the electronic control unit 24 deletes the new FW data stored in the buffer without transferring the new FW data to the data storing unit 70. In this case, the electronic control unit 24 does not need writing the current FW data into the data storing unit 70 again because the current FW data is left stored therein.

For this reason, when any of the electronic control units 24 includes such a buffer, the update unit 32 may execute processing illustrated in FIG. 23 in the second updating procedure at Step S114.

First, at Step S121, the update unit 32 transmits new FW data received from the provision apparatus 20 and a MAC value (the sixth verification value) received from the provision apparatus 20 for the new FW data, together with an update instruction, to the electronic control unit 24. Subsequently, at Step S122, the update unit 32 receives a result of verification as to whether the new FW data is valid, from the electronic control unit 24.

Subsequently, at Step S123, the update unit 32 determines whether the new FW data transmitted to the electronic control unit 24 is valid. The update unit 32 passes the processing: to Step S124 if the data is valid (Yes at S123); and to Step S125 if the data is invalid (No at S123).

At Step S124, the update unit 32 reads out information stored in the temporary storage unit 38 and transfers the information to the management data storing unit 34. Specifically, the update unit 32 reads out the new-FW MAC value, the new-FW version number, and the new-FW developer ID from the temporary storage unit 38, and stores these pieces of data as the current-FW MAC value, the current-FW version number, and the current-FW developer ID in the management data storing unit 34. Upon completion of Step S124, the update unit 32 passes the processing to Step S125.

At Step S125, to the electronic control unit 24 to execute the updating and to the other electronic control units 24, the update unit 32 transmits completion notification indicating that the electronic control unit 24 to execute the updating has completed updating the firmware. In this case, if the new FW data transmitted is valid, the electronic control unit 24 operates based on the new FW data. On the other hand, if the new FW data transmitted is invalid, the electronic control unit 24 operates based on the current FW data. The update unit 32 then ends the update processing for this piece of firmware.

Fourth Modification

Figures 24, 25:
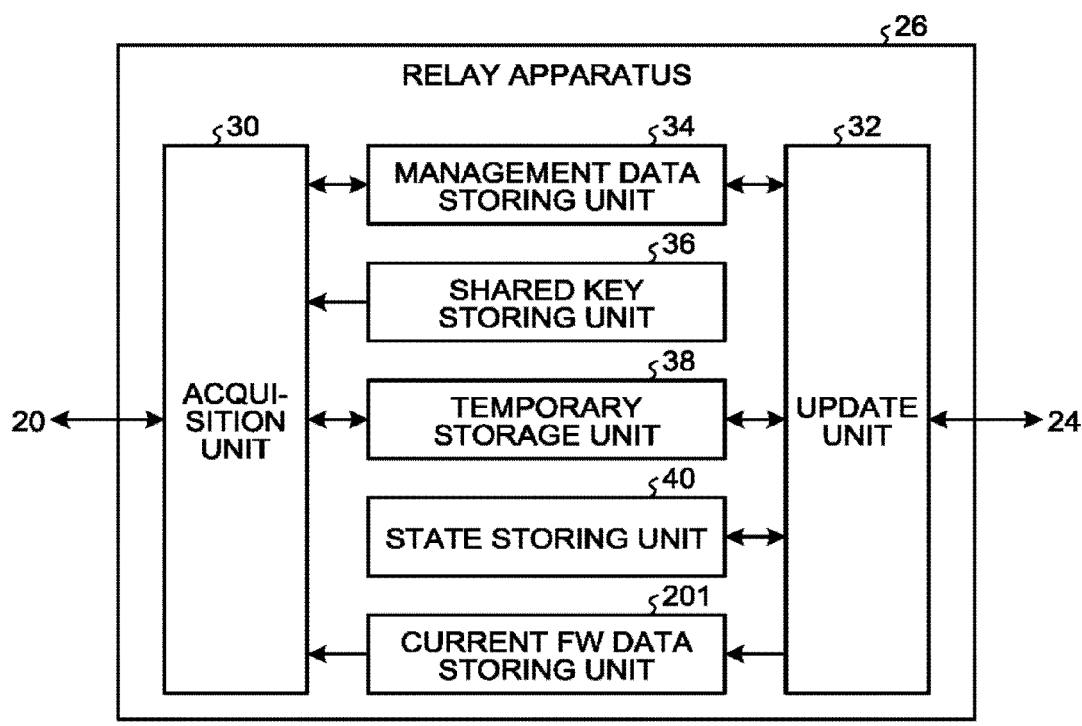
FIG. 24 is a configuration diagram illustrating a relay apparatus according to a fourth modification.
FIG. 25 is a diagram illustrating a piece of current firmware information.

FIG. 24 is a diagram illustrating a functional configuration of the relay apparatus 26 according to a fourth modification. The fourth modification is a configuration obtained by modifying the network system 10 described with reference to FIG. 1 to FIG. 14, and may be applied to the first modification, the second modification, and the third modification.

The relay apparatus 26 further includes a storing unit 201 (second data storing unit). The current FW data storing unit 201 stores therein the current FW data stored in each of the electronic control units 24 included in the controlled system 22.

The acquisition unit 30 receives the new FW data from the provision apparatus 20. Upon receiving the new FW data from the provision apparatus 20, the acquisition unit 30 determines whether the received new FW data is valid. The update unit 32 transmits, to the electronic control unit 24, the new FW data received from the provision apparatus 20 that is valid, thereby causing the electronic control unit 24 to update the current FW data with the new FW data. When update processing for updating the current FW data with the new FW data has been completed successfully, the update unit 32 transfers, to the current FW data storing unit 201, the new FW data transmitted to the electronic control unit 24, thereby storing therein the new FW data as the current FW data.

Upon receiving the new FW data from the provision apparatus 20, the acquisition unit 30 further determines whether current FW data stored in the current FW data storing unit 201 is valid. When the update processing has failed, the update unit 32 transmits, to the electronic control unit 24, the current FW data stored in the current FW data storing unit 201 that is valid, thereby causing the electronic control unit 24 to restore the current FW data.

Upon determining that the current FW data stored in the current FW data storing unit 201 is invalid, the acquisition unit 30 receives the current FW data from the provision apparatus 20. Upon receiving the current FW data from the provision apparatus 20, the acquisition unit 30 determines whether the received current FW data is valid. When the update processing has failed while the current FW data stored in the current FW data storing unit 201 is invalid, the update unit 32 transmits, to the electronic control unit 24, the received current FW data stored that is valid, thereby causing the electronic control unit 24 to restore the current FW data. When the restoration processing has been completed successfully, the update unit 32 transfers the current FW data transmitted to the electronic control unit 24 to the current FW data storing unit 201, thereby storing therein the current FW data.

FIG. 25 is a diagram illustrating the contents of a piece of current firmware information stored in the current FW data storing unit 201. The current FW data storing unit 201 stores therein a piece of current firmware information illustrated in FIG. 25 with respect to each piece of firmware stored in each of the electronic control units 24.

Each piece of current firmware information contains ECUID, FWID, and current FW data. ECUID is an identifier for the electronic control unit 24. FWID is an identifier for the piece of firmware.

The current FW data is substantive data of the piece of firmware. That is, the current FW data is substantive data of firmware supposed to have been written into and currently present in the electronic control unit 24.

Figure 26:
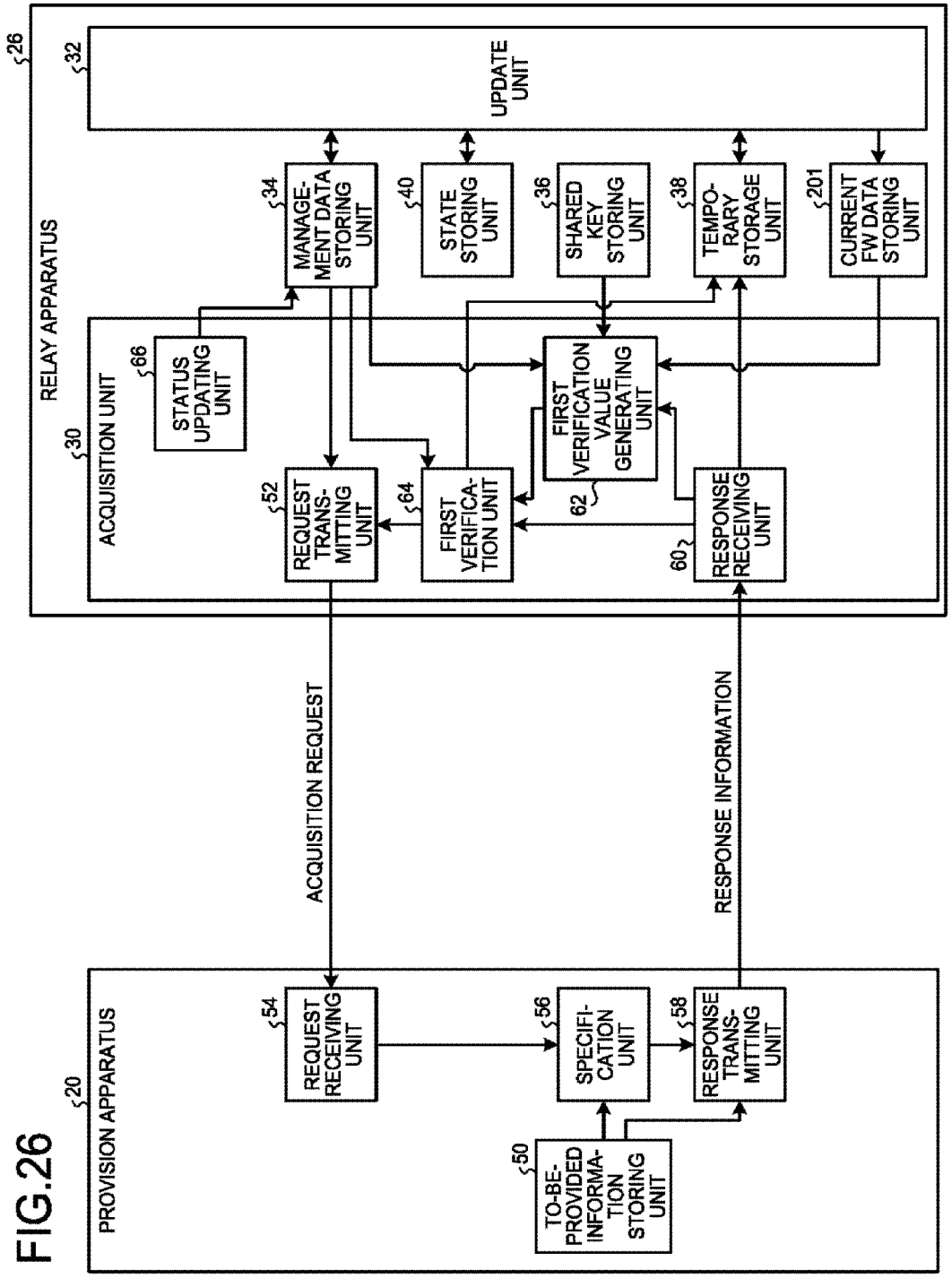
FIG. 26 is a configuration diagram illustrating a provision apparatus and the relay apparatus according to the fourth modification.

FIG. 26 is a diagram illustrating functional configurations of the provision apparatus 20 and the relay apparatus 26 according to the fourth modification.

The request transmitting unit 52 transmits, to the provision apparatus 20, an acquisition request containing a request identifier, ECUID, EWID, and version specifying information. The request identifier is information identifying whether the acquisition request requests transmission of new FW data or requests transmission of current FW data.

With respect to each piece of firmware and at previously determined timings (for example, at regular intervals), the request transmitting unit 52 transmits, to the provision apparatus 20, the acquisition request that requests transmission of the new FW data. When it is determined in update of firmware that the current FW data stored in the current FW data storing unit 201 is invalid, the request transmitting unit 52 transmits, to the provision apparatus 20, the acquisition request that requests transmission of the current FW data of the firmware.

Upon reception of the acquisition request for the new FW data, the specification unit 56 determines whether substantive data (new FW data) the version of which is newer than the version of the current FW data currently stored in the electronic control unit 24 is present with respect to a corresponding piece of firmware.

Upon reception of the acquisition request for the new FW data, when the new FW data is not present, the response transmitting unit 58 transmits the response information that contains ECUID, FWID, and an update flag. Upon reception of the acquisition request for the new FW data, when the new FW data is present, the response transmitting unit 58 transmits response information that contains ECUID, FWID, the update flag, the new FW data, a new-FW MAC value (the third verification value), a new-FW version number, and a new-FW developer ID. The update flag is set to: 0 when the new FW data is not present; and a value other than 0 when the new FW data is present.

Furthermore, upon reception of the acquisition request for the current FW data, the response transmitting unit 58 transmits the response information that contains ECUID, EWID, the update flag, the current FW data, a current-FW MAC value (a ninth verification value), a current-FW version number, and a current-FW developer ID. The update flag is set to a value other than 0.

Upon transmission of the acquisition request for the new FW data, when the new FW data is not present, the response receiving unit 60 receives the response information that contains ECUID, FWID, and the update flag. Upon transmission of the acquisition request for the new FW data, when the new FW data is present, the response receiving unit 60 receives the response information that contains ECUID, FWID, the update flag, the new FW data, the new-FW MAC value (the third verification value), the new-FW version number, and the new-FW developer ID. Furthermore, upon transmission of the acquisition request for the current FW data, the response receiving unit 60 receives the response information that contains ECUID, FWID, the update flag, the current FW data, the current-FW MAC value (the ninth verification value), the current-FW version number, and the current-FW developer ID.

Upon transmission of the acquisition request for the new FW data, the first verification value generating unit 62 calculates a MAC value (the fourth verification value) for the new FW data received from the provision apparatus 20. Upon transmission of the acquisition request for the new FW data, the first verification value generating unit 62 further calculates a MAC value (a tenth verification value) for the current FW data stored in the current FW data storing unit 201. Specifically, the first verification value generating unit 62 reads out, from the shared key storing unit 36, shared-key data that corresponds to the current-FW developer ID. The first verification value generating unit 62 then calculates the MAC value from the shared-key data read out and the current FW data stored in the current FW data storing unit 201.

Upon transmission of the acquisition request for the current FW data, the first verification value generating unit 62 calculates a MAC value (an eleventh verification value) for the current FW data received from the provision apparatus 20. Specifically, the first verification value generating unit 62 reads out, from the shared key storing unit 36, shared-key data that corresponds to the current-FW developer ID. The first verification value generating unit 62 calculates the MAC value from the shared-key data read out and the current FW data received from the provision apparatus 20.

The first verification unit 64 determines whether the new FW data received from the provision apparatus 20 is valid. Specifically, when the third verification value received from the provision apparatus 20 is equal to the fourth verification value calculated from the shared-key data and the new FW data received from the provision apparatus 20, the first verification unit 64 determines that the new FW data received from the provision apparatus 20 is valid. The first verification unit 64 can thus verify whether the developer of the new FW data received from the provision apparatus 20 retains the same shared-key data as the relay apparatus 26.

When the new FW data received from the provision apparatus 20 is invalid, the first verification unit 64 may cause the request transmitting unit 52 to transmit the acquisition request for the new FW data again. When the new FW data is still invalid after the same acquisition request is transmitted a certain number of times, the first verification unit 64 stops transmission of the acquisition request.

Upon transmission of the acquisition request for the new FW data, the first verification unit 64 determines whether the current FW data stored in the current FW data storing unit 201 is valid. Specifically, when the first verification value with which to verify the current FW data currently stored in the electronic control unit 24 is equal to the tenth verification value with which to verify the current FW data stored in the current FW data storing unit 201, the first verification unit 64 determines that the current FW data stored in the current FW data storing unit 201 is valid.

Here, the first verification value is the current-FW MAC value currently stored in the management data storing unit 34. The tenth verification value is a MAC value calculated by the first verification value generating unit 62 and corresponding to the current FW data stored in the current FW data storing unit 201. That is, the first verification unit 64 verifies whether the current FW data stored in the current FW data storing unit 201 is identical with the current FW data currently stored in the electronic control unit 24.

When the current FW data stored in the current FW data storing unit 201 is invalid, the first verification unit 64 causes the request transmitting unit 52 to transmit the acquisition request for the current FW data.

Upon transmission of the acquisition request for the current FW data, the first verification unit 64 determines whether the current FW data received from the provision apparatus 20 is valid. Specifically, when the ninth verification value received from the provision apparatus 20 is equal to the eleventh verification value calculated from the shared-key data and the current FW data received from the provision apparatus 20, the first verification unit 64 determines that the current FW data received from the provision apparatus 20 is valid.

Here, the ninth verification value is the MAC value (the current-FW MAC value) received from the provision apparatus 20 for the current FW data in response to the acquisition request for the current FW data. The eleventh verification value is a MAC value for the current FW data that is calculated by the first verification value generating unit 62. That is, the first verification unit 64 verifies whether the developer of the current FW data received from the provision apparatus 20 retains the same shared-key data as the relay apparatus 26.

When the current FW data received from the provision apparatus 20 is invalid, the first verification unit 64 may cause the request transmitting unit 52 to transmit the acquisition request for the current FW data again. When the current FW data is still invalid after the same acquisition request is transmitted a certain number of times, the first verification unit 64 stops transmission of the acquisition request.

On condition that the new FW data received from the provision apparatus 20 and the current FW data stored in the current FW data storing unit 201 (or the current FW data received from the provision apparatus 20) are valid, the first verification unit 64 stores information, including the information received by the response receiving unit 60, in the temporary storage unit 38. Specifically, the first verification unit 64 stores, in the temporary storage unit 38, ECUID, FWID, the new FW data, the new-FW MAC value, the new-FW version number, and the new-FW developer ID that have been received from the provision apparatus 20. The first verification unit 64 further stores, in the temporary storage unit 38, the current FW data stored in the current FW data storing unit 201 (or the current FW data received from the provision apparatus 20).

The above-described configuration enables the relay apparatus 26 to receive the new FW data from the provision apparatus 20. The relay apparatus 26 is further enabled to determine whether the current FW data stored in the current FW data storing unit 201 is valid. The relay apparatus 26 is further enabled to receive the current FW data from the provision apparatus 20 when the current FW data stored in the current FW data storing unit 201 is invalid. The relay apparatus 26 is enabled to determine whether the received current FW data is valid. The relay apparatus 26 is further enabled to store current FW data and new FW data in the temporary storage unit 38 on condition that the current FW data and the new FW data are valid.

The request transmitting unit 52 may transmit irrespectively of timing for update of firmware (for example, at regular intervals), to the provision apparatus 20, the acquisition request that requests transmission of current FW data. The acquisition unit 30 is thus enabled to acquire current FW data that is valid and store the current FW data in the current FW data storing unit 201 in advance. In this case, the update flag contained in the response information is set to 0.

In this case, the first verification unit 64 may determine whether the current-FW MAC value contained in the response information received from the provision apparatus 20 and the current-FW MAC value stored in the management data storing unit 34 are equal to each other. When these current-FW MAC values are not equal, it is likely that shared-key data used for generating the current-FW MAC value has been updated. For this reason, when these values are not equal, the first verification unit 64 notifies, for example, a user that these MAC values are not equal to each other. The first verification unit 64 is thus enabled to facilitate update of shared-key data.

Figure 27:
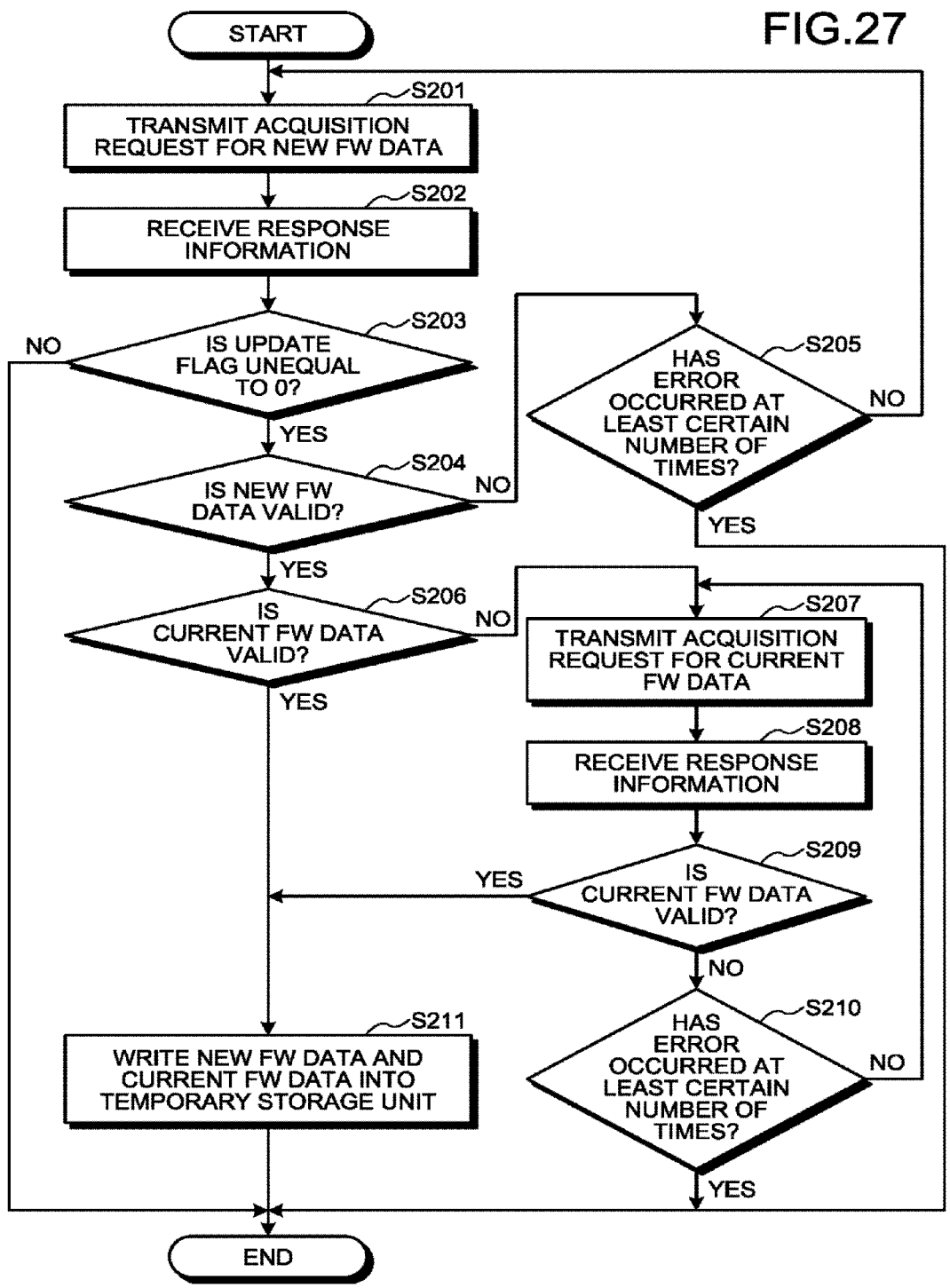
FIG. 27 is a flowchart illustrating a procedure for acquisition processing according to the fourth modification.

FIG. 27 is a flowchart illustrating a procedure for acquisition processing to be executed by the relay apparatus 26 according to the fourth modification. The acquisition unit 30 according to this modification executes acquisition processing illustrated in FIG. 27.

First, at Step S201, the acquisition unit 30 transmits the acquisition request for new FW data with respect to any piece of firmware to the provision apparatus 20 at a previously determined timing.

In response to the acquisition request for the new EW data, the provision apparatus 20 transmits the response information on the corresponding piece of firmware to the relay apparatus 26. Specifically, when the new FW data corresponding to the request is not present, the provision apparatus 20 transmits the response information that contains ECUID, FWID, and the update flag set to a value of 0. When the new FW data is present, the provision apparatus 20 transmits the response information that contains ECUID, FWID, the update flag set to a value other than 0, the new FW data, the new-FW MAC value, the new-FW version number, and the new-FW developer ID.

Subsequently, the acquisition unit 30 receives the response information at Step S202. Subsequently, at Step S203, the acquisition unit 30 determines whether the update flag contained in the response information is a value other than 0. If the update flag is 0 (No at S203), the acquisition unit 30 ends this procedure. If the update flag is a value other than 0 (Yes at S203), the processing is passed to Step S204.

At Step S204, the acquisition unit 30 determines whether the received new FW data is valid. The acquisition unit 30 passes the processing: to Step S206 if the data is valid (Yes at S204); and to Step S205 if the data is invalid (No at S204).

At Step S205, the acquisition unit 30 determines whether the number of times the new FW data has been determined to be invalid (the number of times of error) is at least a certain number of times. If the number of times of error is less than the certain number of times (No at S205), the acquisition unit 30 returns the processing to Step S201. When the number of times of error is at least the certain number of times (Yes at S205), the acquisition unit 30 ends this procedure.

At Step S206, the acquisition unit 30 determines whether the current FW data stored in the current FW data storing unit 201 is valid. The acquisition unit 30 passes the processing: to Step S211 if the data is valid (Yes at S206); and to Step S207 if the data is invalid (No at S206).

At Step S207, the acquisition unit 30 transmits the acquisition request for the current FW data with respect to the same piece of firmware to the provision apparatus 20. In response to the acquisition request for current FW data, the provision apparatus 20 transmits the response information on the corresponding piece of firmware to the relay apparatus 26. Specifically, the provision apparatus 20 transmits the response information that contains ECUID, FWID, the update flag set to a value other than 0, the current FW data, the current-FW MAC value, the current-FW version number, and the current-FW developer ID.

Subsequently, the acquisition unit 30 receives the response information at Step S208. At Step S209, the acquisition unit 30 determines whether the received current FW data is valid. The acquisition unit 30 passes the processing: to Step S211 if the data is valid (Yes at S209); and to Step S210 if the data is invalid (No at S209).

At Step S210, the acquisition unit 30 determines whether the number of times the current FW data has been determined to be invalid (the number of times of error) is at least a certain number of times. If the number of times of error is less than the certain number of times (No at S210), the acquisition unit 30 returns the processing to Step S207. If the number of times of error is at least the certain number of times (Yes at S210), the acquisition unit 30 ends this procedure.

At Step S211, the acquisition unit 30 writes ECUID, FWID, the new FW data, the new-FW MAC value, the new-FW version number, and the new-FW developer ID that have been received from the provision apparatus 20, into the temporary storage unit 38. The acquisition unit 30 further writes the current FW data stored in the current FW data storing unit 201 or the current FW data received from the provision apparatus 20 into the temporary storage unit 38.

Upon completing Step S211, the acquisition unit 30 ends this procedure. In this case, the acquisition unit 30 has been able to receive current FW data and new FW data that are valid.

Figure 28:
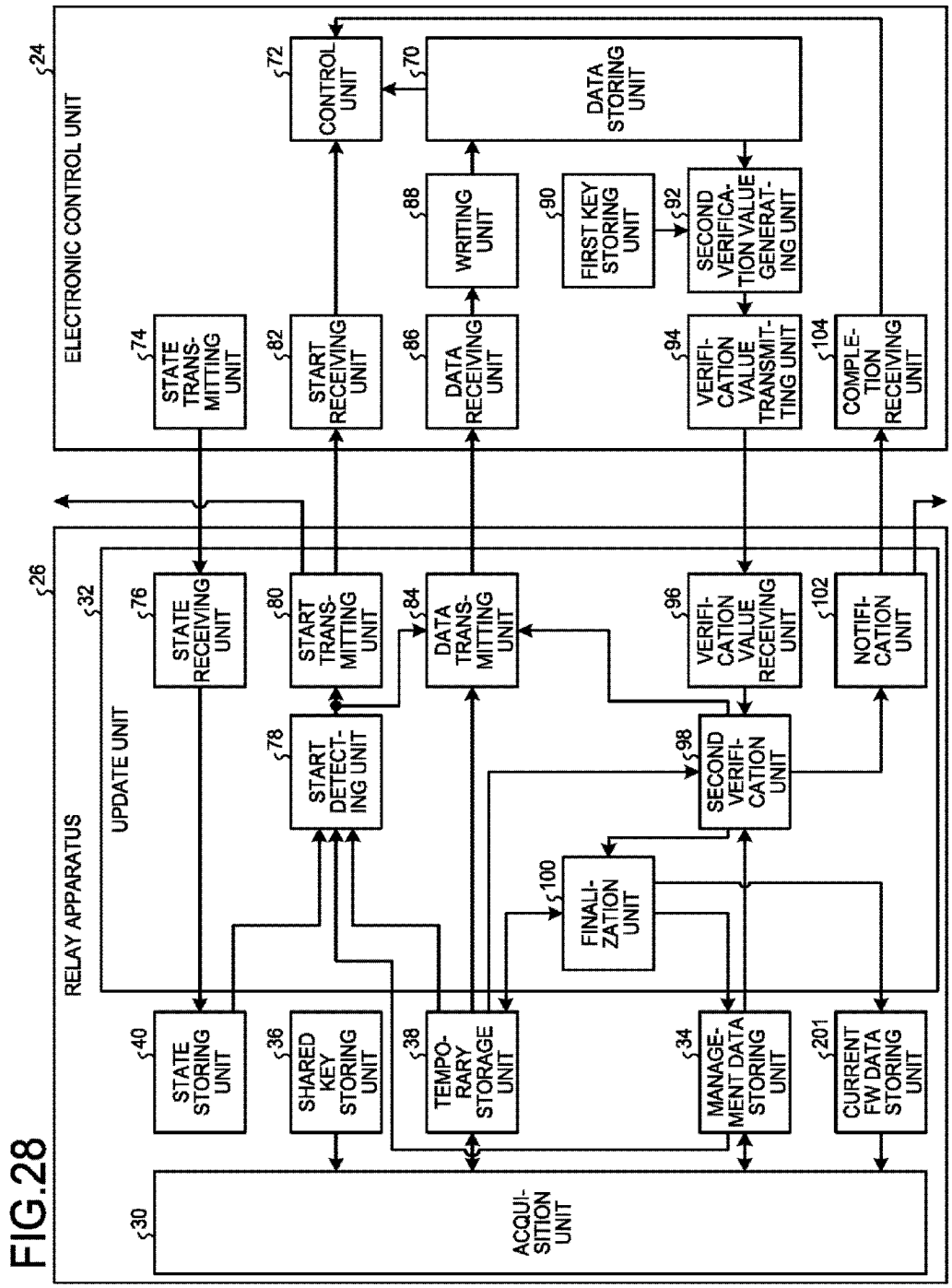
FIG. 28 is a configuration diagram illustrating the relay apparatus and an electronic control unit according to the fourth modification.

FIG. 28 is a diagram illustrating functional configurations of the relay apparatus 26 and each electronic control unit 24 according to the fourth modification.

Upon receiving notification that the new FW data written into the electronic control unit 24 in the update processing is valid, the finalization unit 100 reads out the new FW data stored in the temporary storage unit 38. The finalization unit 100 then transfers the read-out new FW data to the current FW data storing unit 201, thereby writing this new FW data into the current FW data storing unit 201. That is, upon successful completion of the update processing, the finalization unit 100 writes, as current FW data, the new FW data transmitted to the electronic control unit 24 into the current FW data storing unit 201.

In addition, upon determining that the new FW data written into the electronic control unit 24 in the update processing is invalid, the second verification unit 98 notifies the data transmitting unit 84 that the update processing has failed. When the update processing has failed, the data transmitting unit 84 transmits, to the electronic control unit 24, the current FW data stored in the temporary storage unit 38 that is valid, thereby causing the electronic control unit 24 to restore the current FW data. That is, the data transmitting unit 84 transmits, to the electronic control unit 24, the current FW data stored in the current FW data storing unit 201 that is valid, thereby causing the electronic control unit 24 to restore the current FW data. When the current FW data stored in the current FW data storing unit 201 is invalid, the data transmitting unit 84 transmits, to the electronic control unit 24, the current FW data received from the provision apparatus 20 that is valid, thereby causing the electronic control unit 24 to restore the current FW data.

Upon receiving notification that the current FW data written into the electronic control unit 24 in the restoration processing is valid, the finalization unit 100 reads out the current FW data stored in the temporary storage unit 38. The finalization unit 100 then transfers the read-out current FW data to the current FW data storing unit 201, thereby writing this current FW data into the current FW data storing unit 201. That is, upon successful completion of the restoration processing, the finalization unit 100 writes, into the current FW data storing unit 201, the current FW data transmitted to the electronic control unit 24.

The thus configured relay apparatus 26 according to this modification is enabled to update the current FW data stored in the electronic control unit 24 with the new FW data. The relay apparatus 26 is further enabled to restore, from the current FW data stored in the current FW data storing unit 201, the current FW data stored in the electronic control unit 24 when the new FW data written into the electronic control unit 24 in the update processing is invalid. The relay apparatus 26 is further enabled to restore current FW data stored in the electronic control unit 24 from current FW data received from the provision apparatus 20, which is valid, when the current FW data stored in the current FW data storing unit 201 is invalid.

Figure 29:
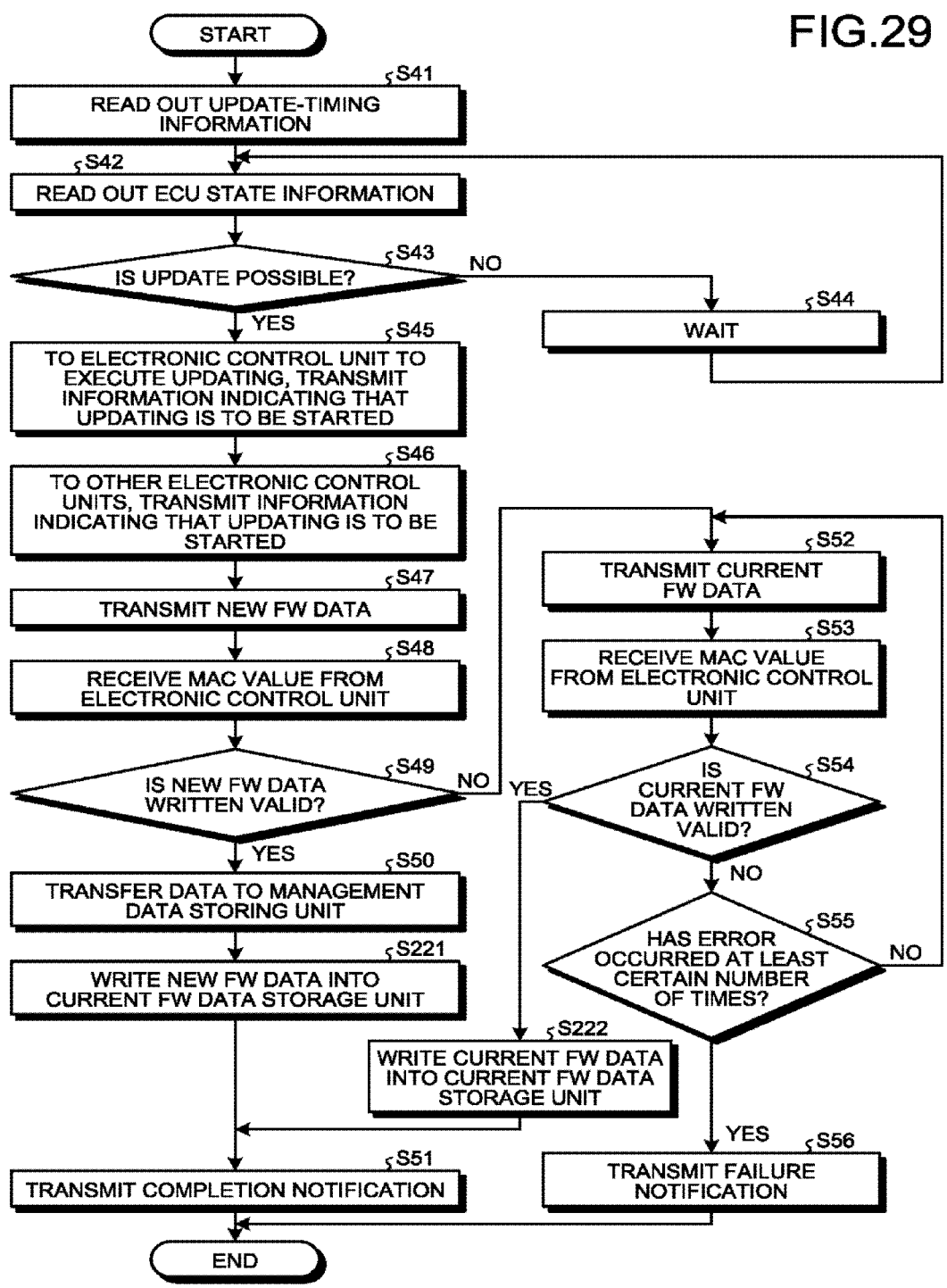
FIG. 29 is a flowchart illustrating a procedure for update processing according to the fourth modification.

FIG. 29 is a flowchart illustrating a procedure for update processing to be executed by the relay apparatus 26 according to the fourth modification. The update unit 32 according to this modification executes the update processing illustrated in FIG. 29.

The procedure executed by the update unit 32 according to this modification is different from the procedure illustrated in FIG. 12 in that it additionally executes processing at 3221 and S222.

Following Step S50, the update unit 32 passes the processing to 3221. At S221, the update unit 32 reads out the new FW data stored in the temporary storage unit 38 and writes the read-out new FW data, as current FW data, into the current FW data storing unit 201. Upon completion of S221, the update unit 32 passes the processing to S51.

Upon determining at S54 that the current FW data written into the electronic control unit 24 in the restoration processing is valid (Yes at S54), the update unit 32 passes the processing to Step S222. At S222, the update unit 32 reads out the current FW data stored in the temporary storage unit 38 and writes the read-out current FW data into the current FW data storing unit 201. Upon completion of S222, the update unit 32 passes the processing to S51.

As described above, the relay apparatus 26 according to the fourth modification is enabled to store the current FW data written into the electronic control unit 24 in the current FW data storing unit 201, and, when the processing for update to new FW data has failed, perform the restoration processing using the current FW data stored in the current FW data storing unit 201. The relay apparatus 26 according to the fourth modification thus allows for reduction in volume of communication with the provision apparatus 20. In addition, in the network system 10 according to the fourth modification, the relay apparatus 26 stores therein the current FW data, and there is no need to provide the respective electronic control units 24 with memories for backing up firmware. Consequently, the network system 10 according to the fourth modification allows for cost reduction.

When new FW data written is invalid, the update unit 32 executes the restoration processing for writing the current FW data into the corresponding electronic control unit 24. However, there is a possibility that the update unit 32 fails in the restoration processing a certain number of times or more. The current FW data storing unit 201 may store therein a piece of firmware for analyzing situations in which the restoration processing has failed, another firmware for causing the electronic control unit 24 to operate with minimal functions, or still another piece of firmware that has both functions of the first two pieces of firmware. The update unit 32, when having failed in the restoration processing at least the certain number of times, may transmit such firmware to the electronic control unit 24 to cause the electronic control unit 24 to store the firmware therein.

Furthermore, each of the electronic control units 24 may store a computer program for updating firmware, separately from the firmware, for example, in a ROM area having a boot loader or the like stored. The electronic control unit 24 may execute the update processing and the restoration processing by executing this computer program. The electronic control unit 24 thus allows it to be less likely that the computer program for updating firmware fails, for example, when having been restarted after power-off during the update processing or when firmware after overwriting malfunctions.

Furthermore, when notifying the provision apparatus 20 or the like of information such as a result of firmware update, the relay apparatus 26 may attach a MAC value calculated from a key shared by the corresponding electronic control unit 24 and the provision apparatus 20. The provision apparatus 20 is thus enabled to safely acquire results of update in the respective electronic control units 24.

Fifth Modification

Figure 30:
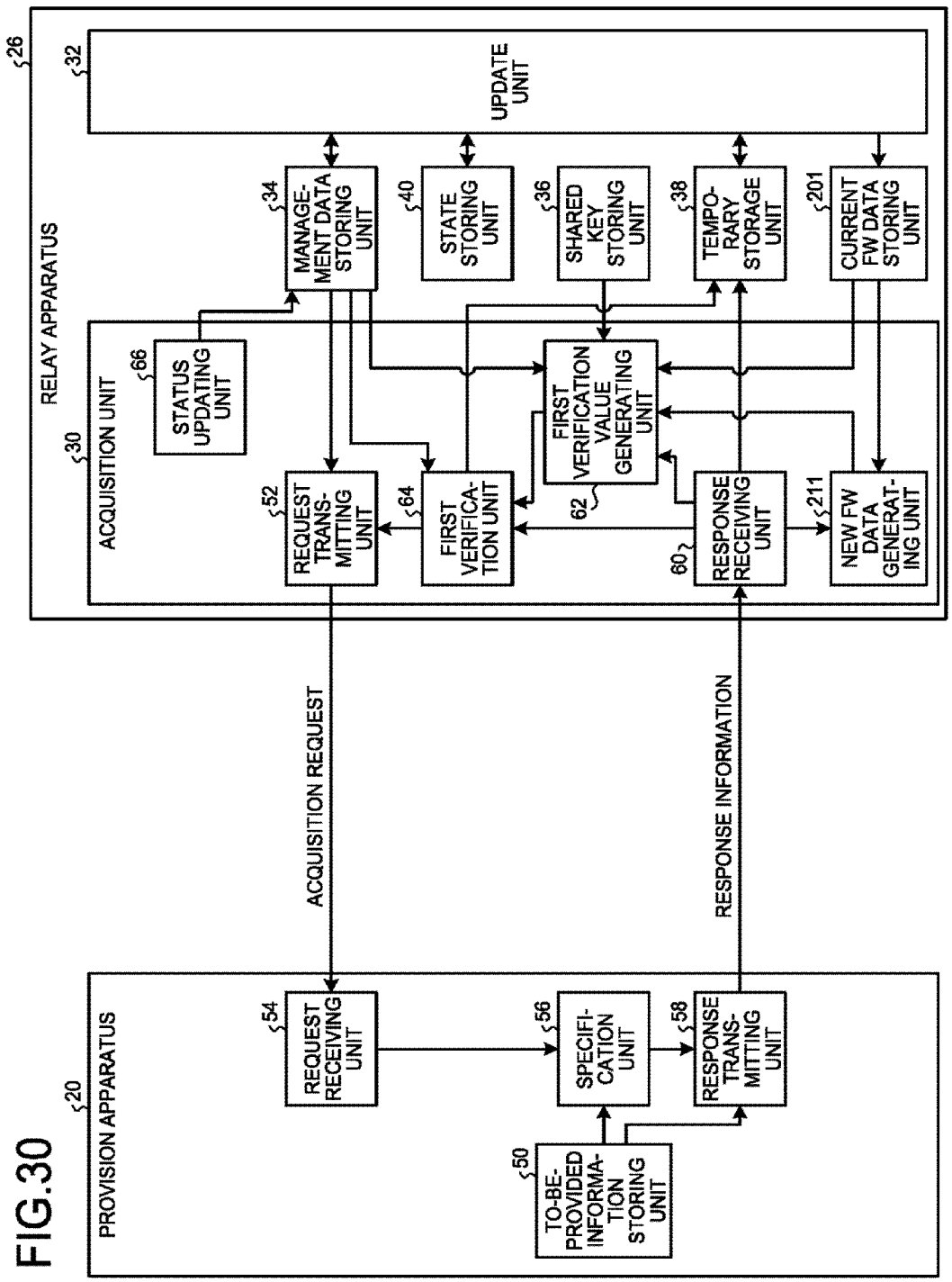
FIG. 30 is a configuration diagram illustrating a provision apparatus and a relay apparatus according to a fifth modification.

FIG. 30 is a diagram illustrating functional configurations of the provision apparatus 20 and the relay apparatus 26 according to a fifth modification. The fifth modification is a configuration obtained by further modifying the fourth modification, and may be applied to the network system 10 described with reference to FIG. 1 to FIG. 14, the first modification, the second modification, and the third modification.

The relay apparatus 26 further includes a new FW data generating unit 211 (a first data generating unit).

The to-be-provided information storing unit 50 further stores therein difference data with respect to each version of firmware. The difference data is data obtained by subtracting substantive data corresponding to a version immediately before the each version from substantive data corresponding to the each version.

Upon reception of the acquisition request for new FW data, when the new FW data is present, the response transmitting unit 58 transmits the response information containing new-FW difference data in place of the new FW data. That is, upon transmission of the acquisition request for the new FW data, when the new FW data is present, the response receiving unit 60 receives the response information that contains ECUID, FWID, the update flag, the new-FW difference data, the new-FW MAC value, the new-FW version number, and the new-FW developer ID.

Upon transmission of the acquisition request for the new FW data, when the new FW data is present, the new FW data generating unit 211 generates the new FW data. Specifically, the new FW data generating unit 211 generates the new FW data based on the difference data contained in the response information and corresponding current FW data stored in the current FW data storing unit 201.

Upon transmission of the acquisition request for the new FW data, the first verification value generating unit 62 calculates a MAC value (the fourth verification value) for the new FW data generated by the new FW data generating unit 211.

The first verification unit 64 determines whether the new FW data generated based on the difference data received from the provision apparatus 20 is valid. Specifically, when the third verification value received from the provision apparatus 20 is equal to the fourth verification value calculated from a shared-key data and the new FW data generated by the new FW data generating unit 211, the first verification unit 64 determines that the new FW data generated based on the difference data received from the provision apparatus 20 is valid.

On condition that the new FW data generated based on the difference data received from the provision apparatus 20 and the current FW data stored in the current FW data storing unit 201 are valid, the first verification unit 64 stores information, including the information received by the response receiving unit 60, in the temporary storage unit 38.

As described above, the relay apparatus 26 according to this modification receives difference data in place of new FW data from the provision apparatus 20. The relay apparatus 26 thus allows for reduction in an amount of data received from the provision apparatus 20.

Sixth Modification

Figures 31, 32:
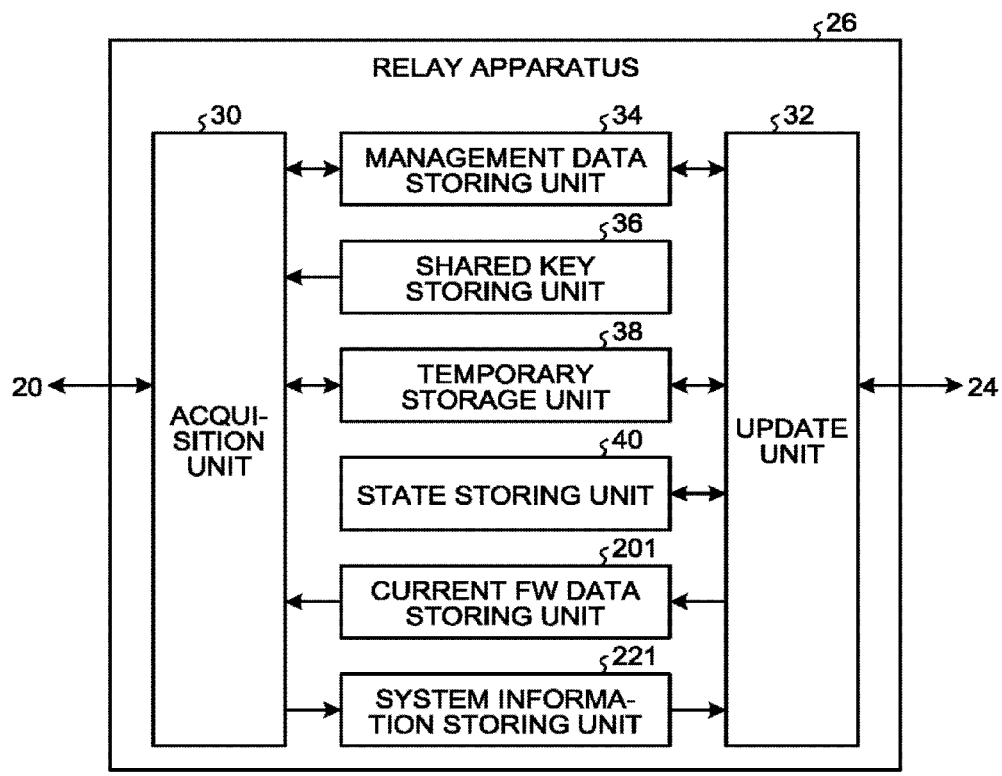
FIG. 31 is a configuration diagram illustrating a relay apparatus according to a sixth modification.
FIG. 32 is a diagram illustrating a piece of system information.

FIG. 31 is a diagram illustrating a functional configuration of the relay apparatus 26 according to a sixth modification. The sixth modification is a configuration obtained by further modifying the fourth modification, and may be applied to the network system 10 described with reference to FIG. 1 to FIG. 14, the first modification, the second modification, the third modification, and the fifth modification.

The relay apparatus 26 according to the sixth modification updates pieces of firmware of a plurality of electronic control units 24 included in the controlled system 22 in a coordinated manner. The relay apparatus 26 further includes a system information storing unit 221. The system information storing unit 221 stores therein system information.

The acquisition unit 30 receives new FW data and the like from the provision apparatus 20 for at least one electronic control unit 24 to execute the updating that is included among the electronic control units 24 included in the controlled system 22. The update unit 32 transmits, to the respective corresponding electronic control units 24, pieces of new FW data received from the provision apparatus 20, thereby causing the respective corresponding electronic control units 24 to update current FW data with the pieces of new FW data.

In addition, when the update processing has failed in any one of the electronic control units 24, the update unit 32 transmits the current FW data, to all of the electronic control units 24 to execute the updating, thereby causing the respective electronic control units 24 to restore the current FW data.

FIG. 32 is a diagram illustrating the contents of system information stored in the system information storing unit 221. The system information storing unit 221 stores therein the system information illustrated in FIG. 32.

The system information contains a system identifier and system version information. The system identifier is information identifying a set of a plurality of electronic control units 24 included in the controlled system 22. When the controlled system 22 is a vehicle, the system identifier may be information identifying a type of vehicle. For example, based on the system identifier, the provision apparatus 20 may specify the electronic control units 24 included in the controlled system 22.

The system version information indicates a version of a system list. The system version information may be a number or a character that is increased each time the system list is updated.

The system list indicates a set of versions of pieces of current FW data that have been stored in the respective electronic control units 24 included in the controlled system 22. For example, the system list may be a list that contains sets each consisting of ECUID, FWID, and a version number of the current FW data.

Figure 33:
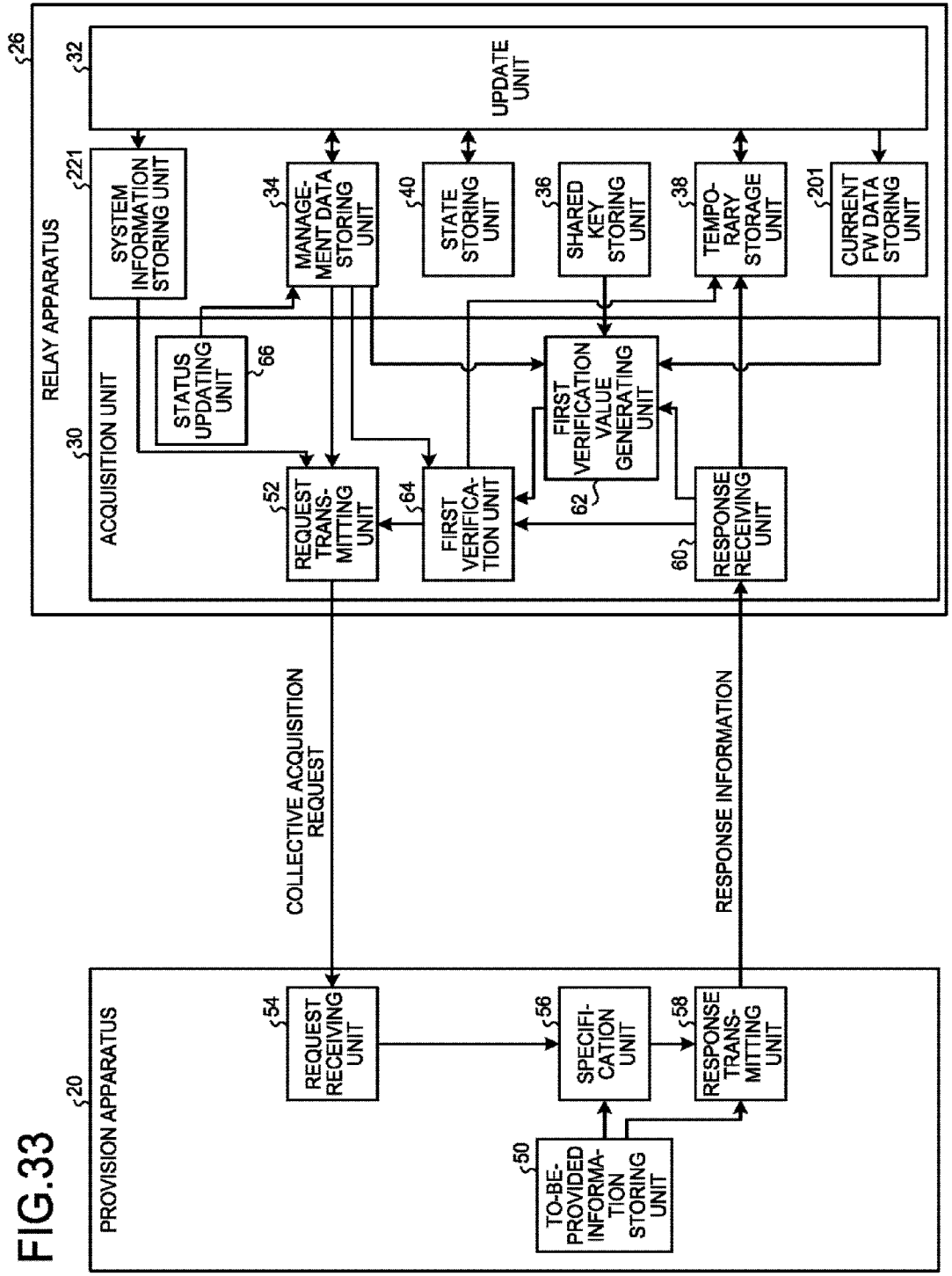
FIG. 33 is a configuration diagram illustrating a provision apparatus and the relay apparatus according to the sixth modification.

FIG. 33 is a diagram illustrating functional configurations of the provision apparatus 20 and the relay apparatus 26 according to the sixth modification. The to-be-provided information storing unit 50 stores therein the system list with respect to each version thereof.

For example, in some cases, even when firmware in one electronic control unit 24 of the electronic control units 24 included in the controlled system 22 has been updated to a newer version, operation is not stable without firmware in other electronic control units 24 updated. The system list indicates a set of versions of pieces of firmware that ensures that such unstable operation is avoided. The system list is updated to a newer version as appropriate. Different version numbers are assigned to the respective versions of the system list.

At previously determined timings (for example, at regular intervals), the request transmitting unit 52 transmits, to the provision apparatus 20, a collective acquisition request in place of the acquisition request for new FW data. The collective acquisition request contains the system identifier and the system version information that are stored in the system information storing unit 221.

Upon receiving the collective acquisition request from the request transmitting unit 52, the specification unit 56 determines whether the system list the version of which is newer than a version specified based on the system version information contained in the collective acquisition request has been provided. When the newer version of the system list has been provided, the specification unit 56 specifies at least one piece of firmware that needs to be updated to a newer version. Specifically, in the newer version of the system list, the specification unit 56 specifies any pieces of firmware the versions of which have been updated from the current version of the system list.

When a newer version of the system list is not present, the response transmitting unit 58 transmits the response information that contains the system identifier and the update flag. When a newer version of the system list is present, the response transmitting unit 58 transmits the response information that contains, for example, the update flag and pieces of new FW data corresponding to respective pieces of firmware specified as those to be updated. Here, the update flag is set to: 0 when a newer version of the system list is not present; and a value other than 0 when a newer version of the system list is present.

When a newer version of the system list is not present, the response receiving unit 60 receives the response information that contains the system identifier and the update flag. When a newer version of the system list is present, the response receiving unit 60 receives the response information that contains, for example, the update flag and pieces of new FW data corresponding to the respective pieces of firmware specified as those to be updated.

The first verification value generating unit 62 calculates MAC values (the fourth verification values) for pieces of new FW data for the respective pieces of firmware to be updated. The first verification value generating unit 62 further calculates MAC values (the tenth verification values) for pieces of current FW data stored in the current FW data storing unit 201 for the respective pieces of firmware to be updated.

The first verification unit 64 determines whether the pieces of new FW data received from the provision apparatus 20 are valid for the respective pieces of firmware to be updated. The first verification unit 64 further determines whether the pieces of current FW data stored in the current FW data storing unit 201 are valid for the respective pieces of firmware to be updated.

On condition that the pieces of new FW data received from the provision apparatus 20 and the pieces of current FW data stored in the current FW data storing unit 201 are valid for the respective pieces of firmware to be updated, the first verification unit 64 stores information, including the information received by the response receiving unit 60, in the temporary storage unit 38. Specifically, the first verification unit 64 stores, in the temporary storage unit 38, ECUID, FWID, the piece of new FW data, the new-FW MAC value, the new-FW version number, and the new-FW developer ID that have been received from the provision apparatus 20 for each of the pieces of firmware to be updated. The first verification unit 64 further stores, in the temporary storage unit 38, the pieces of current FW data stored in the current FW data storing unit 201 for the respective pieces of firmware to be updated.

The above-described configuration enables the relay apparatus 26 to collectively receive pieces of new FW data for respective pieces of firmware to be updated from the provision apparatus 20. The relay apparatus 26 is further enabled to collectively determine whether the received pieces of new FW data and pieces of current FW data stored in the current FW data storing unit 201 are valid for the respective pieces of firmware to be updated.

When any one of the pieces of new FW data received from the provision apparatus 20 is invalid, the first verification unit 64 may cause the request transmitting unit 52 to transmit the acquisition request for that piece of new FW data. When the piece of new FW data is still invalid after the same acquisition request is transmitted a certain number of times, the first verification unit 64 ends the acquisition processing for all of the pieces of firmware to be updated.

When any one of the pieces of the current FW data stored in the current FW data storing unit 201 is invalid, the first verification unit 64 causes the request transmitting unit 52 to transmit the acquisition request for that piece of current FW data. When the piece of current FW data is still invalid after the same acquisition request is transmitted a certain number of times, the first verification unit 64 ends the acquisition processing for all of the pieces of firmware to be updated.

Figure 34:
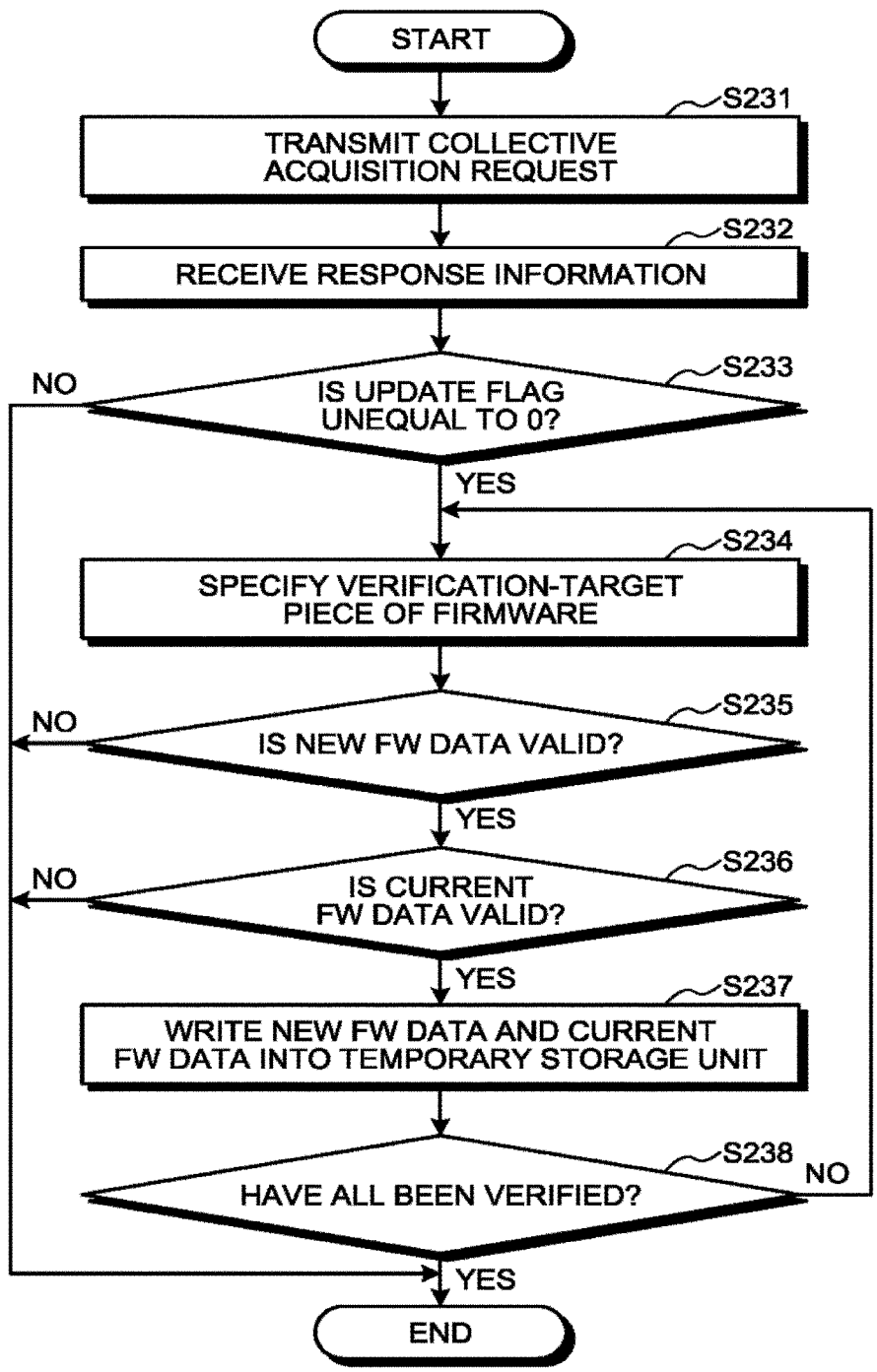
FIG. 34 is a flowchart illustrating a procedure for acquisition processing according to the sixth modification.

FIG. 34 is a flowchart illustrating a procedure for acquisition processing to be executed by the relay apparatus 26 according to the sixth modification. The acquisition unit 30 according to this modification executes acquisition processing illustrated in FIG. 34.

First, at Step S231, the acquisition unit 30 transmits the collective acquisition request to the provision apparatus 20 at a previously determined timing.

In response to the collective acquisition request, the provision apparatus 20 transmits the corresponding response information to the relay apparatus 26. When the system list the version of which is newer has not been provided, the provision apparatus 20 transmits the response information that contains the update flag set to a value of 0. When the system list the version of which is newer has been provided, the provision apparatus 20 transmits the response information that contains the update flag set to a value other than 0 and pieces of new FW data corresponding to pieces of firmware to be updated.

Subsequently, the acquisition unit 30 receives the response information at Step S232. Subsequently, at Step S233, the acquisition unit 30 determines whether the update flag contained in the response information is a value other than 0. If the update flag is 0 (No at S233), the acquisition unit 30 ends this procedure. If the update flag is a value other than 0 (Yes at S233), the processing is passed to Step S234.

At S234, the acquisition unit 30 specifies, as a verification-target piece of firmware, one of the pieces of firmware to be updated. Subsequently, at Step S235, the acquisition unit 30 determines whether the piece of new FW data is valid for the verification-target piece of firmware. The acquisition unit 30 passes the processing to Step S236 if the piece is valid (Yes at S235), and ends this procedure if the piece is invalid (No at S235).

At Step S236, the acquisition unit 30 determines whether the piece of current FW data stored in the current FW data storing unit 201 is valid for the verification-target piece of firmware. The acquisition unit 30 passes the processing to Step S237 if the piece is valid (Yes at S236), and ends this procedure if the piece is invalid (No at S236).

At Step S237, the acquisition unit 30 writes, into the temporary storage unit 38, the piece of new FW data received from the provision apparatus 20 for the verification-target piece of firmware. The acquisition unit 30 further writes, into the temporary storage unit 38, the piece of current FW data stored in the current FW data storing unit 201 for the verification-target piece of firmware.

Subsequently, at Step S238, the acquisition unit 30 determines whether all of the pieces of firmware to be updated have been verified. If there is any thereof that has not been verified (No at S238), the acquisition unit 30 returns the processing to S234, specifies another one of those pieces of firmware as a verification-target piece, and continues the processing. If all thereof have been verified (Yes at S238), the acquisition unit 30 ends this procedure.

Figure 35:
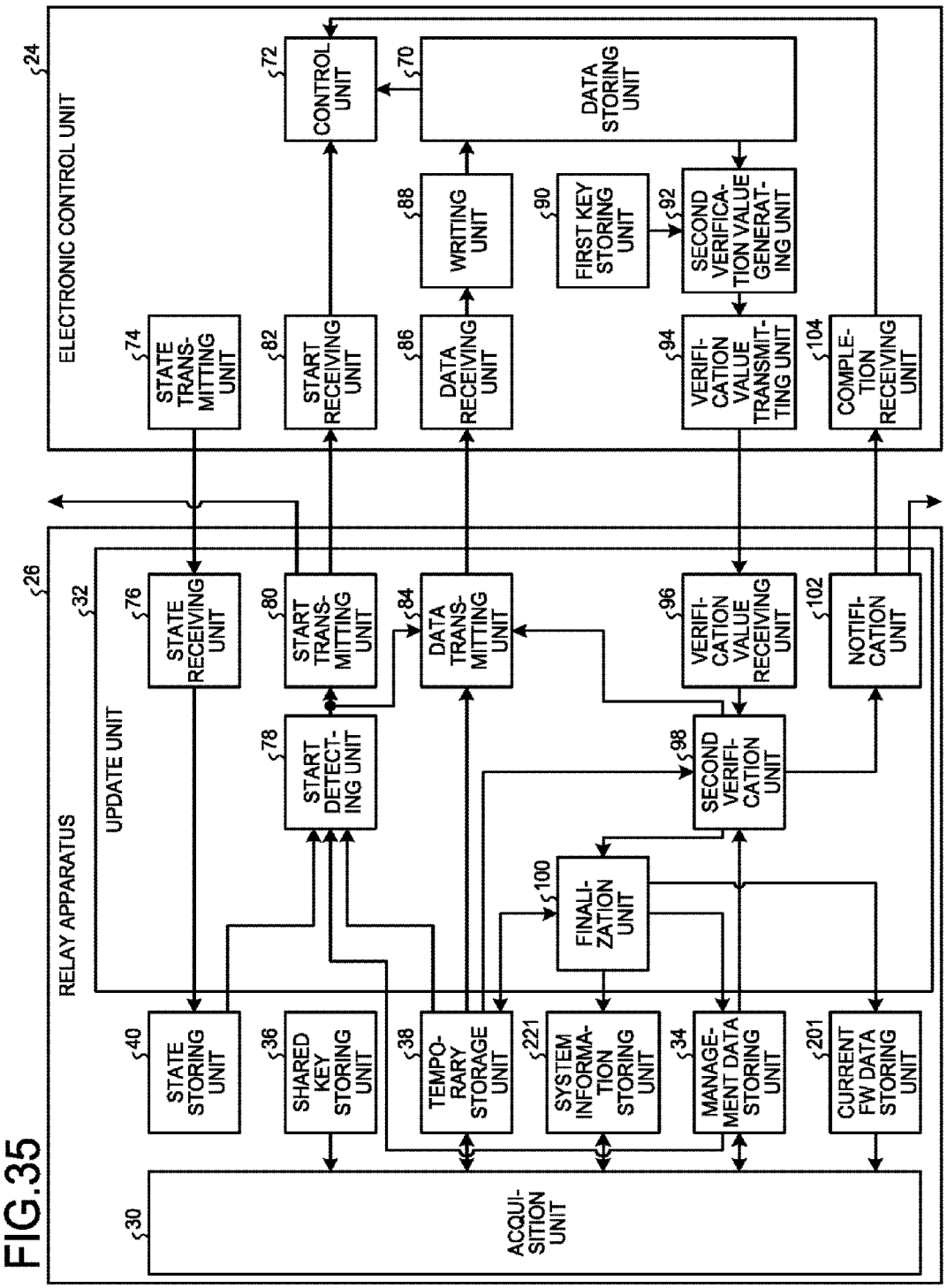
FIG. 35 is a configuration diagram illustrating the relay apparatus and an electronic control unit according to the sixth modification.

FIG. 35 is a diagram illustrating functional configurations of the relay apparatus 26 and each electronic control unit 24 according to the sixth modification.

The start detecting unit 78 determines whether the electronic control units 24 each storing therein a piece of firmware to be updated can execute the updating. When all of the electronic control units 24 each storing therein a piece of firmware to be updated can execute the updating, the start detecting unit 78 provides start instructions to the start transmitting unit 80 and the data transmitting unit 84.

Upon receiving the start instruction, the start transmitting unit 80 transmits, to the respective electronic control units 24 each storing therein a piece of firmware to be updated, information indicating that the updating is to be started.

Upon receiving the start instruction from the start detecting unit 78, the data transmitting unit 84 transmits, to the respective electronic control units 24 each storing therein a piece of firmware to be updated, corresponding pieces of new FW data received from the provision apparatus 20, thereby causing the electronic control units 24 to update pieces of current FW data currently stored therein with those pieces of new FW data.

The verification value receiving unit 96 receives, from the respective electronic control units 24 each storing therein a piece of firmware to be updated, MAC values with which to verify pieces of new FW data written into the data storing unit 70 in the update processing.

The second verification unit 98 verifies whether the pieces of new FW data written into the respective electronic control units 24 in the update processing are valid for the respective pieces of firmware to be updated. Upon determining that the piece of new FW data written into the corresponding electronic control unit 24 in the update processing for each of the pieces of firmware to be updated is valid, the second verification unit 98 notifies the finalization unit 100 and the notification unit 102.

Upon receiving notification that the pieces of new FW data written into the electronic control units 24 in the update processing are valid for the respective pieces of firmware to be updated, the finalization unit 100 reads out information stored in the temporary storage unit 38 and stores the information in the management data storing unit 34.

Upon receiving notification from the second verification unit 98 that all of the pieces of new FW data are valid for the respective pieces of firmware to be updated, the notification unit 102 transmits, to the other electronic control units 24 and to the electronic control units 24 to execute the updating, information indicating that updating the pieces of firmware has been completed.

On the other hand, upon determining that the piece of new FW data written into any one of the electronic control units 24 is invalid, the second verification unit 98 notifies the data transmitting unit 84 that the update processing has failed.

When the update processing has failed, the data transmitting unit 84 transmits, to the electronic control units 24, corresponding pieces of current FW data for the respective pieces of firmware to be updated, thereby causing the electronic control units 24 to restore the corresponding pieces of current FW data. Specifically, the data transmitting unit 84 transmits, to the electronic control units 24, the pieces of current FW data stored in the temporary storage unit 38 for the respective pieces of firmware to be updated, and transmits a restoration instruction thereto at the same time. With regards to the electronic control unit 24 that has not transmitted a piece of new FW data and has not yet started the updating, the data transmitting unit 84 does not need to cause that electronic control unit 24 to perform the restoration processing.

The verification value receiving unit 96 receives, from the respective electronic control units 24, MAC values with which to verify pieces of current FW data written into the data storing unit 70 in the restoration processing for respective pieces of firmware to be restored.

The second verification unit 98 verifies whether pieces of current FW data written into the electronic control units 24 in the restoration processing are valid for the respective pieces of firmware to be restored. Upon determining that the pieces of current FW data written into the electronic control units 24 in the restoration processing are valid for the respective pieces of firmware to be restored, the second verification unit 98 notifies the notification unit 102. Upon receiving notification from the second verification unit 98 that the pieces of current FW data are valid for all of the respective pieces of firmware to be restored, the notification unit 102 transmits, to the other electronic control units 24 and to the electronic control units 24 to execute the updating, information indicating that the processing has been completed.

Upon determining that a piece of current FW data written into the electronic control unit 24 in the restoration processing is invalid for any one of the respective pieces of firmware to be restored, the second verification unit 98 notifies the notification unit 102 that valid data has not been written into the electronic control unit 24. Upon receiving notification from the second verification unit 98 that valid data has not been written, the notification unit 102 transmits, to the other electronic control units 24 and to the electronic control units 24 to execute the updating, information indicating that valid data has not been written.

Upon receiving notification that the pieces of new FW data written into the electronic control units 24 in the update processing are valid for the respective pieces of firmware to be updated, the finalization unit 100 transfers, to the current FW data storing unit 201, the pieces of new FW data stored in the temporary storage unit 38, thereby writing those pieces of new FW data into the current FW data storing unit 201. Upon receiving notification that the pieces of current FW data written into the electronic control units 24 in the restoration processing are valid, the finalization unit 100 transfers, to the current FW data storing unit 201, the pieces of current FW data stored in the temporary storage unit 38, thereby writing those pieces of current FW data into the current FW data storing unit 201.

Figure 36:
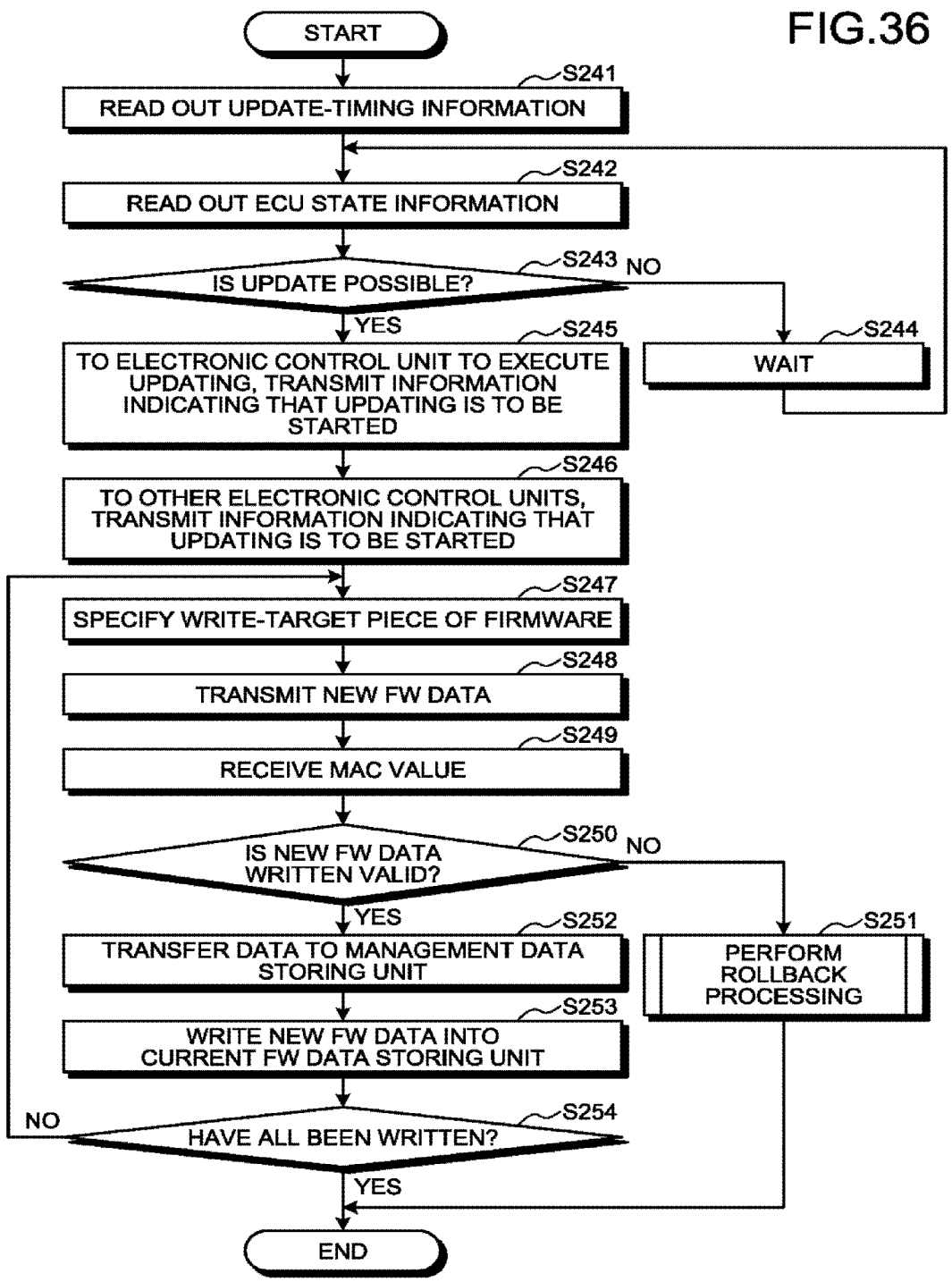
FIG. 36 is a flowchart illustrating a procedure for update processing according to the sixth modification.

FIG. 36 is a flowchart illustrating a procedure for update processing to be executed by the relay apparatus 26 according to the sixth modification. The update unit 32 executes the update processing illustrated in FIG. 36.

First, at Step S241, the update unit 32 reads out the update-timing information on the respective pieces of firmware to be updated, from the management data storing unit 34. Subsequently, at Step S242, the update unit 32 reads out, from the state storing unit 40, the ECU state information on the electronic control units 24 each storing therein a piece of firmware to be updated.

Subsequently, at Step S243, the update unit 32 determines based on the read-out ECU state information and the like whether updating in all of the electronic control units 24 each storing therein a piece of firmware to be updated is possible. If the updating is not possible (No at S243), the update unit 32 passes the processing to Step S244 and waits for a certain time period and then repeats the processing from Step S242. If the updating is possible (Yes at S243), the update unit 32 passes the processing to Step S245.

At Step S245, the update unit 32 transmits, to the respective electronic control units 24 each storing therein a piece of firmware to be updated, information indicating that the updating is to be started. Subsequently, at Step S246, the update unit 32 transmits, to the other electronic control units 24, information indicating that updating the firmware in the electronic control units 24 to execute the updating is to be started.

Subsequently, at Step S247, the update unit 32 specifies, as a write-target piece of firmware, one piece of firmware included among at least one piece of firmware to be updated.

Subsequently, at Step S248, the update unit 32 transmits, to the corresponding electronic control unit 24, a piece of new FW data received from the provision apparatus 20 for the write-target piece of firmware, thereby causing the electronic control unit 24 to update the current FW data currently stored therein with the new FW data.

Subsequently, at Step S249, the update unit 32 receives, from the electronic control unit 24 to execute the updating, a MAC value with which to verify the new FW data written.

Subsequently, at Step S250, the update unit 32 verifies whether the new FW data written into the electronic control unit 24 in the update processing is valid for the write-target piece of firmware. If the data is invalid (No at S250), the update unit 32 passes the processing to S251 and then execute rollback processing. The rollback processing at S251 is described later in detail with reference to FIG. 37.

If the data is valid (Yes at S250), the update unit 32 passes the processing to S252. At Step S252, the update unit 32 reads out the new-FW MAC value, the new-FW version number, and the new-FW developer ID for the write-target piece of firmware that have been stored in the temporary storage unit 38, and stores these pieces of data as the current-FW MAC value, the current-FW version number, and the current-FW developer ID in the management data storing unit 34.

Subsequently, at S253, the update unit 32 reads out the new FW data stored for the write-target piece of firmware in the temporary storage unit 38, and writes the read-out new FW data, as current FW data, into the current FW data storing unit 201. Upon completion of S253, the update unit 32 passes the processing to S254.

Subsequently, at Step S254, the update unit 32 determines whether pieces of new FW data have been written for all of the pieces of firmware to be updated. If there is any of those pieces that has not been written (No at S254), the update unit 32 returns the processing to S247, specifies another one of those pieces of firmware as a write-target piece, and continues the processing. If all of those pieces have been written (Yes at S254), the update unit 32 ends this procedure.

Figure 37:
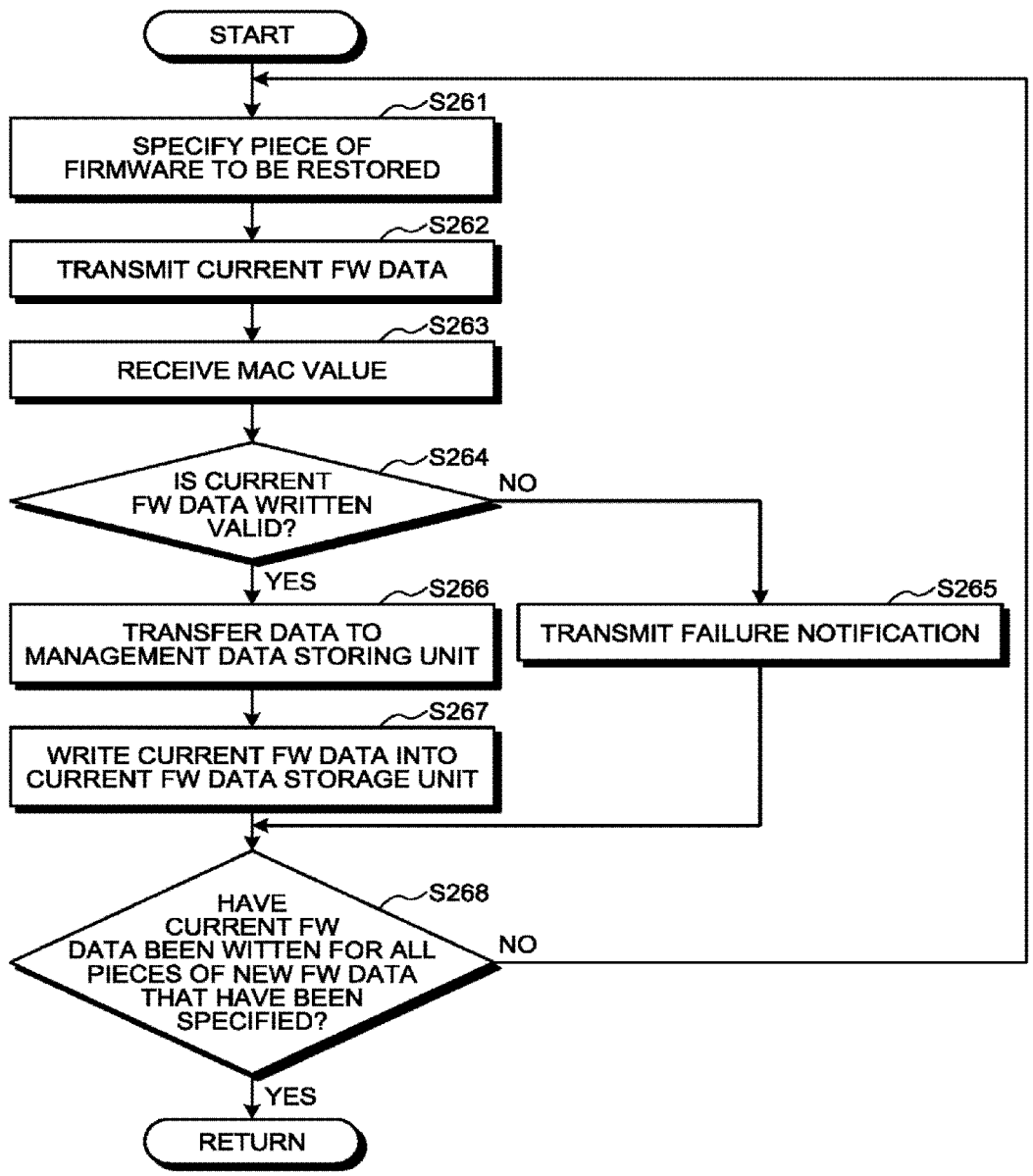
FIG. 37 is a flowchart illustrating a procedure for rollback processing according to the sixth modification.

FIG. 37 is a flowchart illustrating a procedure for rollback processing to be executed by the relay apparatus 26 according to the sixth modification. The update unit 32 executes the rollback processing illustrated in FIG. 37 at S251 illustrated in FIG. 36.

First, at Step S261, the update unit 32 specifies, as a piece of firmware to be restored, one of the pieces of firmware to be updated. The update unit 32 may exclude, as pieces of firmware to be restored, pieces of firmware that have not been transmitted to new FW data and that have not yet started to be updated.

Subsequently, at Step S262, the update unit 32 transmits, to the corresponding electronic control unit 24, current FW data stored in the temporary storage unit 38 for the piece of firmware to be restored, thereby causing the electronic control unit 24 to restore the current FW data.

Subsequently, at Step S263, the update unit 32 receives, from the electronic control unit 24 to execute the restoration, a MAC value with which to verify the current FW data written.

Subsequently, at Step S264, the update unit 32 verifies whether the current FW data written into the electronic control unit 24 in the restoration processing is valid. The update unit 32 passes the processing: to Step S265 if the data is invalid (No at S264); and to Step S266 if the data is valid (Yes at S264).

At Step S265, the update unit 32 transmits, to the electronic control unit 24 to execute the restoration and the other electronic control units 24, a failure notification indicating that valid data has not been written into the electronic control unit 24 to execute the restoration. Upon completion of Step S265, the update unit 32 passes the processing to Step S268.

At Step S266, the update unit 32 reads out the current-FW MAC value, the current-FW version number, and the current-FW developer ID for the write-target piece of firmware stored in the temporary storage unit 38, and stores these pieces of data in the management data storing unit 34.

Subsequently, at Step S267, the update unit 32 reads out the current FW data stored for the write-target piece of firmware in the temporary storage unit 38, and writes the read-out current FW data into the current FW data storing unit 201. Upon completion of Step S267, the update unit 32 passes the processing to S268.

Subsequently, at Step S268, the update unit 32 determines whether pieces of current FW data have been written for all of the pieces of firmware to be updated. If there is any thereof that has not been written (No at S268), the update unit 32 returns the processing to S261, specifies another one of those pieces of firmware as a piece to be updated, and continues the processing. If all thereof have been written (Yes at S268), the update unit 32 ends this procedure.

The relay apparatus 26 according to this modification as configured above is enabled to update pieces of firmware of a plurality of electronic control units 24 in a coordinated manner. The relay apparatus 26 is thus enabled to update pieces of firmware of the electronic control units 24 to a combination of versions that ensures stable operation thereof. The configuration according to the sixth modification may be applied to the network system 10 described with reference to FIG. 1 to FIG. 14.

Seventh Modification

Figure 38:
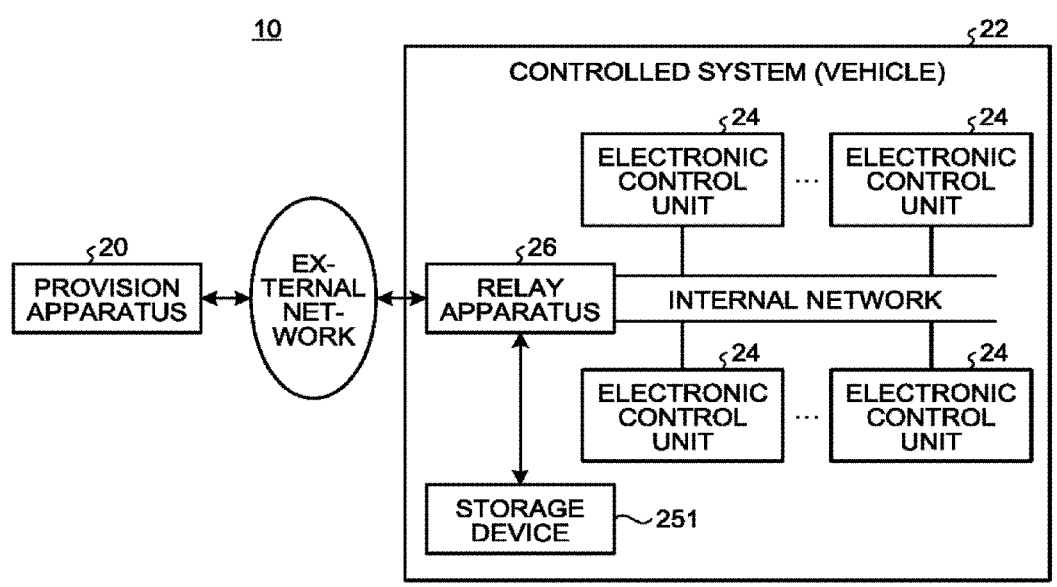
FIG. 38 is a diagram illustrating a network system according to a seventh modification.

FIG. 38 is a diagram illustrating the network system 10 according to a seventh modification. The seventh modification is a configuration obtained by further modifying the fourth modification, and may be applied to the fifth modification and the sixth modification.

The controlled system 22 further includes a storage device 251 outside of the relay apparatus 26. The storage device 251 may be connected to the relay apparatus 26 via the internal network or be connected to the relay apparatus 26 via a network different from the internal network. The relay apparatus 26 is capable of writing information into the storage device 251. The relay apparatus 26 is also capable of reading out the information stored in the storage device 251.

Figure 39:
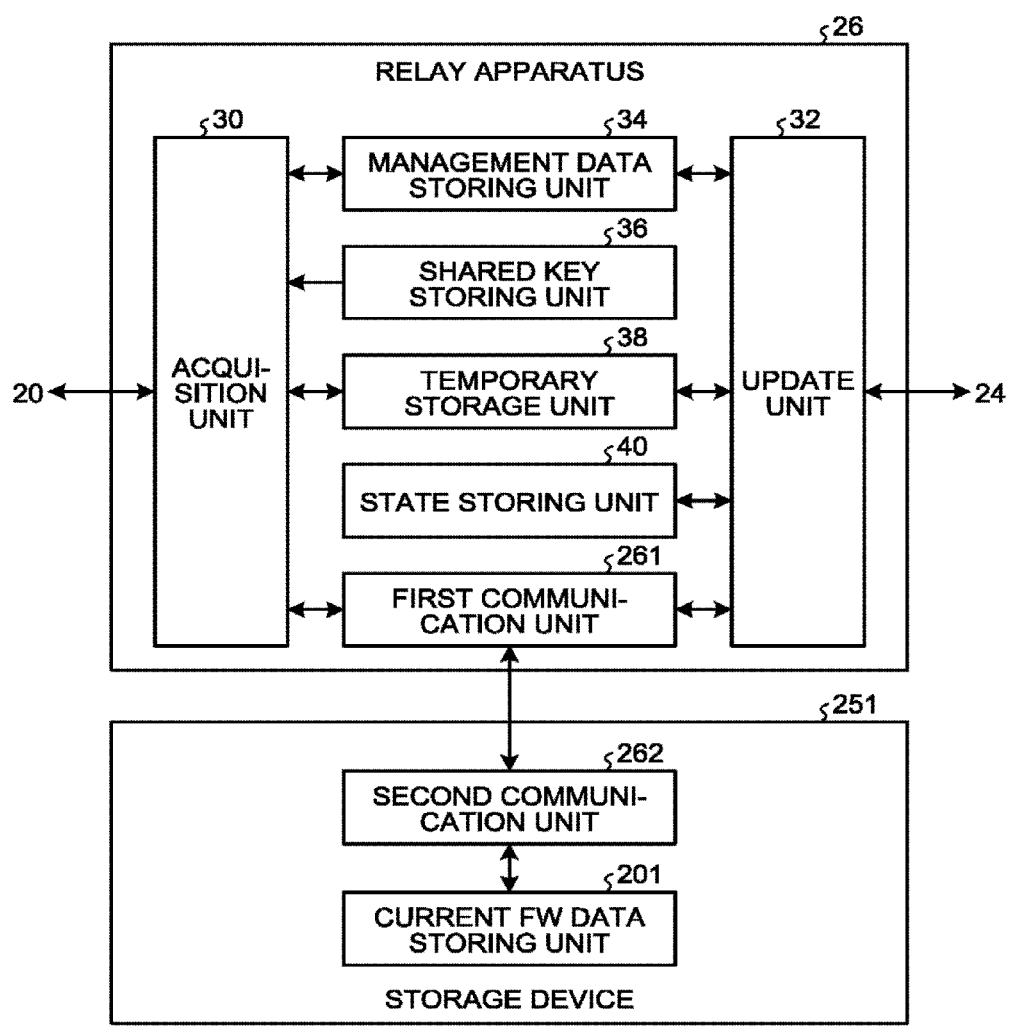
FIG. 39 is a configuration diagram illustrating a relay apparatus and a storage device according to the seventh modification.

FIG. 39 is a diagram illustrating functional configurations of the relay apparatus 26 and the storage device 251 according to the seventh modification. The relay apparatus 26 further includes a first communication unit 261. The storage device 251 includes a second communication unit 262 and the current FW data storing unit 201.

The first communication unit 261 and the second communication unit 262 transmit and receive information between each other. The current FW data storing unit 201 is accessed by the acquisition unit 30 and the update unit 32 in the relay apparatus 26 via the first communication unit 261 and the second communication unit 262. The acquisition unit 30 and the update unit 32 write current FW data into and read out current FW data from the external storage device 251.

The finalization unit 100 in the update unit 32 receives notification (update result notification) from the electronic control unit 24 that new FW data and current FW data that have been written are valid. The finalization unit 100 may transmit, to the external storage device 251, a combination of the update result notification transmitted from the electronic control unit 24 and the new FW data (current FW data) to store the combination therein. The controlled system 22 is thus enabled to ensure that the current FW data stored in the external storage device 251 has been written into the electronic control unit 24.

The controlled system 22 thus configured is capable of preventing unauthorized alteration and malfunctioning of current FW data stored in the current FW data storing unit 201 even when a computer program in the relay apparatus 26 malfunctions, for example. The relay apparatus 26 and the storage device 251 may calculate a MAC value for current FW data by using a shared key to verify the current FW data to be transmitted or received. The controlled system 22 is thus enabled to prevent unauthorized alteration of current FW data stored in the storage device 251.

The controlled system 22 may further include the storage device 251 with respect to each of the electronic control units 24. In addition, the controlled system 22 may provide the relay apparatus 26 and the storage device 251 with a shared key with respect to each of the electronic control units 24. The controlled system 22 is thus enabled to more securely prevent unauthorized alteration of current FW data.

Furthermore, the relay apparatus 26 may generate a MAC value for information obtained by adding, to the update result notification, a hash value of new FW data (or current FW data) written into the electronic control unit 24. The relay apparatus 26 then transmits the generated MAC value, the update result notification, and the new FW data (or the current FW data) to the storage device 251. In this case, the second communication unit 262 in the storage device 251 generates a hash value for the received new FW data (current FW data), generates a MAC value for information obtained by adding the hash value to the update result notification, and makes a comparison between them. The second communication unit 262 is thus enabled to ensure, even under a situation where malware has intruded into the relay apparatus 26, that the received new FW data (or current FW data) is definitely the data stored in the electronic control unit 24.

Here, the relay apparatus 26 and the storage device 251 may exchange the update result notification through a challenge response scheme using random numbers generated by the storage device 251. The relay apparatus 26 and the storage device 251 are thus enabled to block an attack utilizing the update result notification that has been effective so far and thereby provide higher security. The relay apparatus 26 and the storage device 251 may use a public-key based scheme, instead of a challenge-response scheme, to block an attack utilizing the update result notification that has been effective so far.

Figure 40:
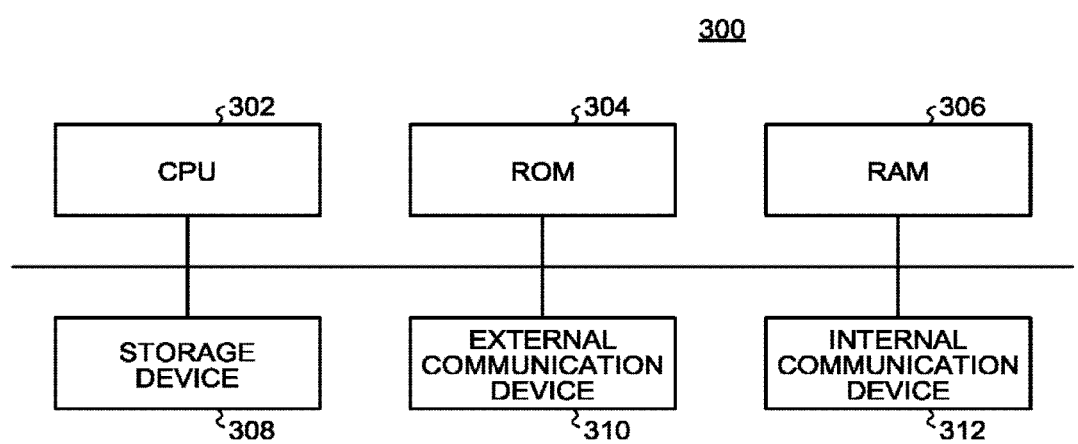
FIG. 40 is a diagram illustrating a hardware configuration of an information processing apparatus.

FIG. 40 is a diagram illustrating an exemplary hardware configuration of an information processing apparatus 300 according to the embodiment. The relay apparatus 26 described above can be implemented by, for example, the information processing apparatus 300 illustrated in FIG. 40.

The information processing apparatus 300 has the same configuration as a typical computer. That is, the information processing apparatus 300 includes a CPU 302, a ROM 304, a RAM 306, a storage device 308, an external communication device 310, and an internal communication device 312. The central processing unit (CPU) 302, the read only memory (ROM) 304, the random access memory (RAM) 306, the storage device 308, the external communication device 310, and the internal communication device 312 are connected to one another by a bus. The CPU 302, the ROM 304, and the RAM 306 may be included in one chip, and this chip, the storage device 308, the external communication device 310, and the internal communication device 312 may be connected to one another by a bus.

The CPU 302 loads a computer program stored in the storage device 308 onto the RAM 306 and executes the computer program, thereby controlling components to perform input/output operations and processing data, for example. The ROM 304 has a start program stored therein, which reads out an operating system (OS) start-up program from the storage device 308 onto the RAM 306. The RAM 306, serving as a work area for the CPU 302, stores data therein.

The storage device 308 is, for example, a hard disk drive, a flash memory, or the like. The storage device 308 has the OS, application programs, and data stored therein. Each of these computer programs is recorded as a file of an installable form or an executable form on a computer readable recording medium to be distributed. The computer program may be distributed by being downloaded from a server.

The external communication device 310 is an interface device for connection with an external network. The internal communication device 312 is an interface device for connection with an internal network.

A computer program to be executed on the information processing apparatus 300 according to the embodiment is recorded as a file of an installable form or an executable form on a computer readable recording medium, such as a compact disc read only memory (CD-ROM), a flexible disk (FD), a compact disc-recordable (CD-R), or a digital versatile disc (DVD), to be distributed.

A computer program to be executed on the information processing apparatus 300 according to the embodiment may be stored on a computer connected to a network such as the Internet to be distributed by being downloaded via the network. A computer program to be executed on the information processing apparatus 300 according to the embodiment may be provided or distributed via a network such as the Internet. A computer program according to the embodiment may be embedded in, for example, the ROM 304 to be provided.

A computer program that causes the information processing apparatus 300 to function as the relay apparatus 26 includes an acquisition module (including a request transmitting module, a response receiving module, a first verification value generating module, a first verification module, and a status updating module), an update module (including a state receiving module, a start detecting module, a start transmitting module, data transmitting module, a verification value receiving module, a second verification module, a finalization module, and a notification module). The hardware of the information processing apparatus 300 is physically configured to have a computer program read out from a storage medium (such as the storage device 308) and executed by a processor (the CPU 302) to load the above-described individual units onto a main memory (the RAM 306) and generate the acquisition unit 30 (including the request transmitting unit 52, the response receiving unit 60, the first verification value generating unit 62, the first verification unit 64, the status updating unit 66, and the like) and the update unit 32 (the state receiving unit 76, a start detecting unit 78, the start transmitting unit 80, the data transmitting unit 84, the verification value receiving unit 96, the second verification unit 98, the finalization unit 100, the notification unit 102, and the like) on the main memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A relay apparatus for updating first data stored in an electronic control unit with second data, comprising:
a processor that operates as:
a request transmitting unit that transmits an acquisition request to a provision apparatus;
a response receiving unit that receives the second data from the provision apparatus in response to the acquisition request; and
a data transmitting unit that
causes the electronic control unit to update the first data stored in the electronic control unit with the second data received from the provision apparatus by transmitting the second data to the electronic control unit, and,
when the updating has failed, causes the electronic control unit to restore the first data by transmitting the first data to the electronic control unit.

2. The relay apparatus according to claim 1, wherein
the response receiving unit receives the second data and the first data from the provision apparatus in response to the acquisition request, and,
when the updating has failed, the data transmitting unit causes the electronic control unit to restore the first data by transmitting, to the electronic control unit, the first data received from the provision apparatus.

3. The relay apparatus according to claim 2, wherein
the processor further operates as
a first verification unit that determines whether the first data and the second data that have been received from the provision apparatus are valid, and
the data transmitting unit transmits, to the electronic control unit, the first data and the second data that have been determined to be valid.

4. The relay apparatus according to claim 3, wherein, when a first verification value with which to verify the first data stored in the electronic control unit is equal to a second verification value with which to verify the first data received from the provision apparatus, the first verification unit determines that the first data received from the provision apparatus is valid.

5. The relay apparatus according to claim 3, wherein
the response receiving unit further receives, from the provision apparatus, a third verification value with which to verify the second data, and,
when the third verification value is equal to a fourth verification value calculated from shared-key data and the second data received from the provision apparatus, the first verification unit determines that the second data received from the provision apparatus is valid.

6. The relay apparatus according to claim 3, wherein
the processor further operates as
a second verification unit that verifies whether the second data written into the electronic control unit in the updating is valid, and,
when the second data written into the electronic control unit in the updating is invalid, the data transmitting unit causes the electronic control unit to restore the first data by transmitting, to the electronic control unit, the first data received from the provision apparatus.

7. The relay apparatus according to claim 6, wherein, when a fifth verification value with which to verify the second data written into the electronic control unit in the updating is not equal to a sixth verification value with which to verify the second data transmitted to the electronic control unit, the second verification unit determines that the second data written into the electronic control unit is invalid.

8. The relay apparatus according to claim 6, wherein
the second verification unit further determines whether the first data written into the electronic control unit in the restoration is valid, and
the relay apparatus further comprises a notification unit configured to, when the first data written into the electronic control unit is invalid, externally notify that the first data written into the electronic control unit is invalid.

9. The relay apparatus according to claim 8, wherein, when a seventh verification value with which to verify the first data written into the electronic control unit in the restoration is not equal to an eighth verification value with which to verify the first data transmitted to the electronic control unit, the second verification unit determines that the first data written into the electronic control unit is invalid.

10. The relay apparatus according to claim 3, wherein
the data transmitting unit causes the electronic control unit to update the first data stored in the electronic control unit with the second data by transmitting, to the electronic control unit, the second data transmitted from the provision apparatus and a sixth verification value with which to verify the second data, and,
the processor further operates as
a result receiving unit that receives a result of whether the second data written into the electronic control unit in the updating is valid from the electronic control unit, and,
upon receiving the result that indicates that the second data written into the electronic control unit in the updating is invalid, the data transmitting unit causes the electronic control unit to restore the piece of first data by transmitting, to the electronic control unit, the first data received from the provision apparatus and an eighth verification value with which to verify the first data.

11. The relay apparatus according to claim 1, wherein
the processor further operates as
a version receiving unit configured to receive information indicating a version of the second data that can be transmitted from the provision apparatus; and
a version determining unit configured to determine whether the version of the second data that can be transmitted from the provision apparatus is newer than the version of the first data stored in the electronic control unit, and,
the request transmitting unit transmits the acquisition request to the provision apparatus on condition that the version of the second data that can be transmitted from the provision apparatus is newer than the version of the first data stored in the electronic control unit.

12. The relay apparatus according to claim 1, further comprising:
a state storing unit configured to store therein verification executor information that indicates which of the relay apparatus and the electronic control unit is to execute verification as to whether the second data written into the electronic control unit is valid; wherein the processor further operates as
　a switch unit, that based on the verification executor information, switches between the electronic control unit and the relay apparatus as an executor of the verification.

13. The relay apparatus according to claim 1, further comprising:
　a first data storing unit configured to store the first data; wherein
the processor further operates as
　a finalization unit configured to write the second data transmitted to the electronic control unit, as the first data, into the first data storing unit upon successful completion of the updating,
the request transmitting unit transmits, to the provision apparatus, the acquisition request that requests transmission of the second data,
the response receiving unit receives the second data from the provision apparatus in response to the acquisition request that requests transmission of the second data, and,
when the updating has failed, the data transmitting unit causes the electronic control unit to restore the first data by transmitting, to the electronic control unit, the first data stored in the first data storing unit.

14. The relay apparatus according to claim 13, wherein the processor further operates as
　a first verification unit configured to determine whether the second data received from the provision apparatus and the first data stored in the first data storing unit are valid, and
the data transmitting unit transmits, to the electronic control unit, the first data and the second data that are valid.

15. The relay apparatus according to claim 14, wherein, when the first data stored in the first data storing unit has been determined to be invalid, the request transmitting unit transmits, to the provision apparatus, the acquisition request that requests transmission of the first data,
the response receiving unit receives the first data from the provision apparatus in response to the acquisition request that requests transmission of the first data, and,
when the updating has failed, the data transmitting unit causes the electronic control unit to restore the first data by transmitting, to the electronic control unit, the first data received from the provision apparatus.

16. The relay apparatus according to claim 13, wherein the processor further operates as
　a second data generating unit that generates the second data based on difference data and the first data stored in the first data storing unit, the difference data having been obtained by subtracting the first data from the second data,
the response receiving unit receives the difference data from the provision apparatus in response to the acquisition request that requests transmission of the second data,
the second data generating unit generates the second data based on the difference data received from the provision apparatus and the first data stored in the first data storing unit, and
the data transmitting unit causes the electronic control unit to update the first data stored in the electronic control unit with the second data by transmitting, to the electronic control unit, the second data generated by the second data generating unit.

17. The relay apparatus according to claim 1, wherein the request transmitting unit transmits, to the provision apparatus, the acquisition request that contains
　a system identifier that identifies a set of the electronic control units, and
　system version information indicating a version of a system list that represents a set of versions of the first data stored in the respective electronic control units,
in response to the acquisition request, the response receiving unit receives an individual pieces of the second data for each of at least one of the respective electronic control units that needs updating to the second data, and
the data transmitting unit
　causes, with respect to each individual piece of the second data received from the provision apparatus, the corresponding electronic control unit to update the first data stored in the corresponding electronic control unit with the individual piece of the second data by transmitting the individual piece of the second data to the corresponding electronic control unit, and,
　when any of the electronic control units has failed in the updating, causes the electronic control unit that has failed in the updating and each of the electronic control units that have successfully completed the updating to restore corresponding pieces of the first data by transmitting the corresponding pieces of the first data.

18. The relay apparatus according to claim 1, wherein the processor further operates as
　a finalization unit, upon successful completion of the updating, writes the second data transmitted to the electronic control unit, as the first data, into a first data storing unit that is externally provided,
the request transmitting unit transmits, to the provision apparatus, the acquisition request that requests transmission of the second data,
the response receiving unit receives the second data from the provision apparatus in response to the acquisition request that requests transmission of the second data, and,
when the updating has failed, the data transmitting unit causes the electronic control unit to restore the first data by transmitting, to the electronic control unit, the first data stored in the first data storing unit.

19. A relay method to be executed by a relay apparatus for updating first data stored in an electronic control unit with second data, the relay method comprising:
　transmitting, by a processor, an acquisition request to a provision apparatus;
　receiving, by the processor, the second data from the provision apparatus in response to the acquisition request; and
　causing, by the processor, the electronic control unit to update the first data stored in the electronic control unit with the second data received from the provision apparatus by transmitting the second data to the electronic control unit, and, when the updating has failed, causing, by the processor, the electronic control unit to restore the first data by transmitting the first data to the electronic control unit.

20. A computer program product for causing an information processing apparatus to function as a relay apparatus for updating first data stored in an electronic control unit with second data, the computer program product having a non-transitory computer readable medium including programmed instructions, wherein the instructions, when executed by the information processing apparatus, cause the information processing apparatus to function as:
- a request transmitting unit configured to transmit an acquisition request to a provision apparatus;
- a response receiving unit configured to receive the second data from the provision apparatus in response to the acquisition request; and
- a data transmitting unit configured to
  - cause the electronic control unit to update the first data stored in the electronic control unit with the second data received from the provision apparatus by transmitting the second data to the electronic control unit, and,
  - when the updating has failed, cause the electronic control unit to restore the first data by transmitting the first data to the electronic control unit.

21. The relay apparatus according to claim 1, wherein the processor further operates as:
- a start detecting unit that determines as updatable when a target device controlled by the electronic control unit becomes a predetermined state; and
- on the condition that the target device becomes the predetermined state, the data transmitting unit causes the electronic control unit to update the first data stored in the electronic control unit to the second data by transmitting the second data to the electronic control unit.

* * * * *